United States Patent
Chang et al.

(10) Patent No.: US 8,553,333 B2
(45) Date of Patent: Oct. 8, 2013

(54) NANOSTRUCTURED ANTI-REFLECTIVE COATINGS FOR SUBSTRATES

(75) Inventors: Chih-hung Chang, Corvallis, OR (US); Seung-Yeol Han, Corvallis, OR (US); Brian K. Paul, Corvallis, OR (US)

(73) Assignee: State of Oregon acting by and through the State Board of Higher Education on behalf of Oregon State University, Corvallis, OR (US)

( * ) Notice: Subject to any disclaimer, the term of this patent is extended or adjusted under 35 U.S.C. 154(b) by 76 days.

(21) Appl. No.: 13/189,411

(22) Filed: Jul. 22, 2011

(65) Prior Publication Data

US 2012/0176681 A1 Jul. 12, 2012

Related U.S. Application Data

(63) Continuation-in-part of application No. PCT/US2010/022010, filed on Jan. 25, 2010.

(60) Provisional application No. 61/205,766, filed on Jan. 23, 2009, provisional application No. 61/458,725, filed on Nov. 29, 2010.

(51) Int. Cl.
*G02B 27/10* (2006.01)
*B32B 5/16* (2006.01)

(52) U.S. Cl.
USPC .......................................... 359/619; 428/323

(58) Field of Classification Search
USPC .................. 359/619, 620; 428/323
See application file for complete search history.

(56) References Cited

U.S. PATENT DOCUMENTS

| 6,225,149 B1 | 5/2001 | Gan et al. |
| 6,343,865 B1 | 2/2002 | Suzuki |
| 7,507,380 B2 | 3/2009 | Chang et al. |
| 7,846,489 B2 | 12/2010 | Chang et al. |
| 2005/0220681 A1 | 10/2005 | Chang et al. |

(Continued)

FOREIGN PATENT DOCUMENTS

| JP | 2001-281411 | 10/2001 |
| KR | 10-2001-0006048 | 1/2001 |

OTHER PUBLICATIONS

Bökenkamp et al., "Microfabricated Silicon Mixers for Submillisecond Quench-Flow Analysis," *Anal. Chem.* 70:232-236 (1998).

(Continued)

*Primary Examiner* — William Choi
(74) *Attorney, Agent, or Firm* — Klarquist Sparkman, LLP

(57) ABSTRACT

Embodiments of the present system and method are useful for chemical deposition, particularly continuous deposition of anti-reflective films. Disclosed systems typically comprise a micromixer and a microchannel applicator. A deposition material or materials is applied to a substrate to form a nanostructured, anti-reflective coating. Uniform and highly oriented surface morphologies of films deposited using disclosed embodiments are clearly improved compared to films deposited by a conventional batch process. In some embodiments, a scratch-resistant, anti-reflective coating is applied to a polycarbonate substrate, such as a lens. In certain embodiments, an anti-reflective coating is applied to a surface of a solar catalytic microreactor suitable for performing endothermic reactions, where energy is provided to the reactor by absorption of solar radiation. The composition and morphology of the material deposited on a substrate can be tailored. The process can be used at low temperatures as a post-deposition, high-temperature annealing step is obviated.

40 Claims, 39 Drawing Sheets

(a)  (b)

(56) References Cited

U.S. PATENT DOCUMENTS

| | | | |
|---|---|---|---|
| 2007/0020400 A1 | 1/2007 | Chang et al. | |
| 2007/0184576 A1 | 8/2007 | Chang et al. | |
| 2008/0108122 A1 | 5/2008 | Paul et al. | |
| 2008/0171192 A1* | 7/2008 | Gadomsky | 428/323 |
| 2010/0165276 A1* | 7/2010 | David et al. | 349/122 |
| 2010/0261304 A1 | 10/2010 | Chang et al. | |

OTHER PUBLICATIONS

Hessell et al., "Micromixers—A Review on Passive and Active Mixing Principles," *Chem. Eng. Sci.* 60:2479-2501 (2005).

International Search Report and Written Opinion for corresponding PCT/US2010/022010, issued Sep. 17, 2010, by the Korean Intellectual Property Office, 7 pp.

Kostoglou et al., "Modeling Thin Film CdS Development in a Chemical Bath Deposition Process," *Ind. Eng. Chem. Res.* 39:3272-3283 (2000).

Kuo et al., "Realization of a Near-Perfect Antireflection Coating for Silicon Solar Energy Utilization," *Optics Letters* 33(21), 2527-2529 (2008).

Nair, et al., "Semiconductor thin films by chemical bath deposition for solar energy related applications," *Solar Energy Materials and Solar Cells*, 52 (1998), pp. 313-344.

Savadogo, "Chemically and electrochemically deposited thin films for solar energy materials," *Solar Energy Materials and Solar Cells*, 52 (1998), pp. 361-388.

Nair, et al., "High thin-film yield achieved at small substrate separation in chemical bath deposition of semiconductor thin films," *Semiconductor Science and Technology*, 16 (2001), pp. 855-863.

* cited by examiner

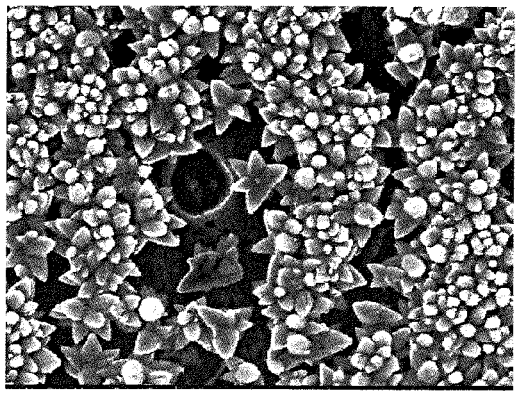 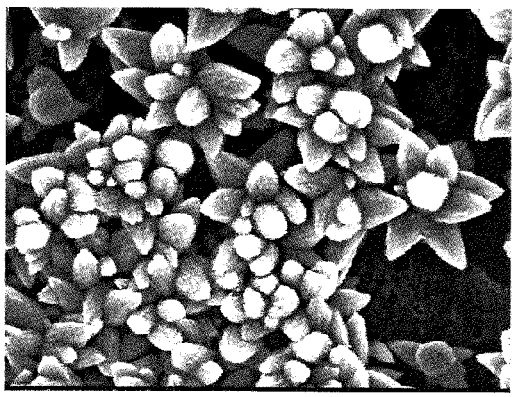
FIG. 23A  FIG. 23B
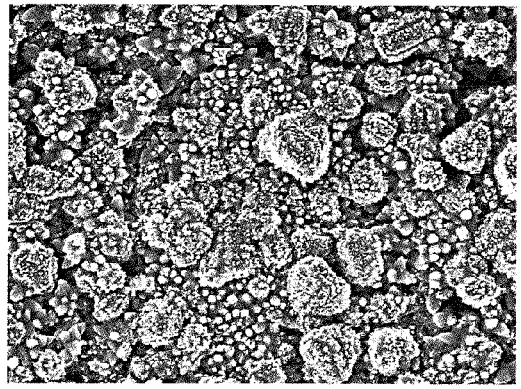 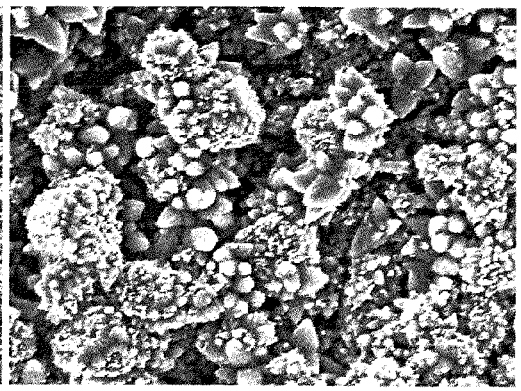
FIG. 24A  FIG. 24B
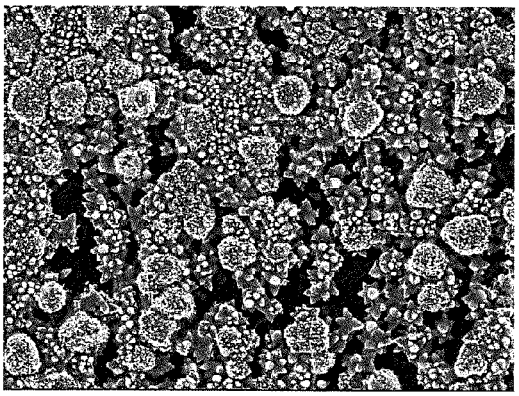 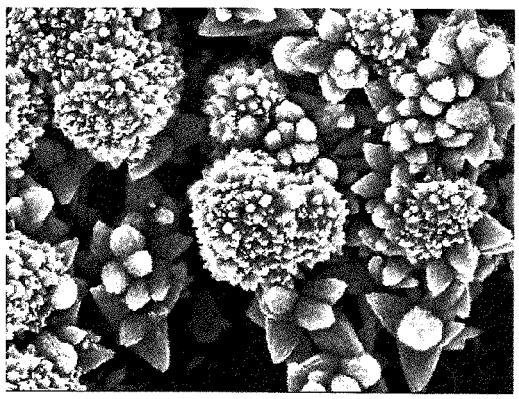
FIG. 25A  FIG. 25B

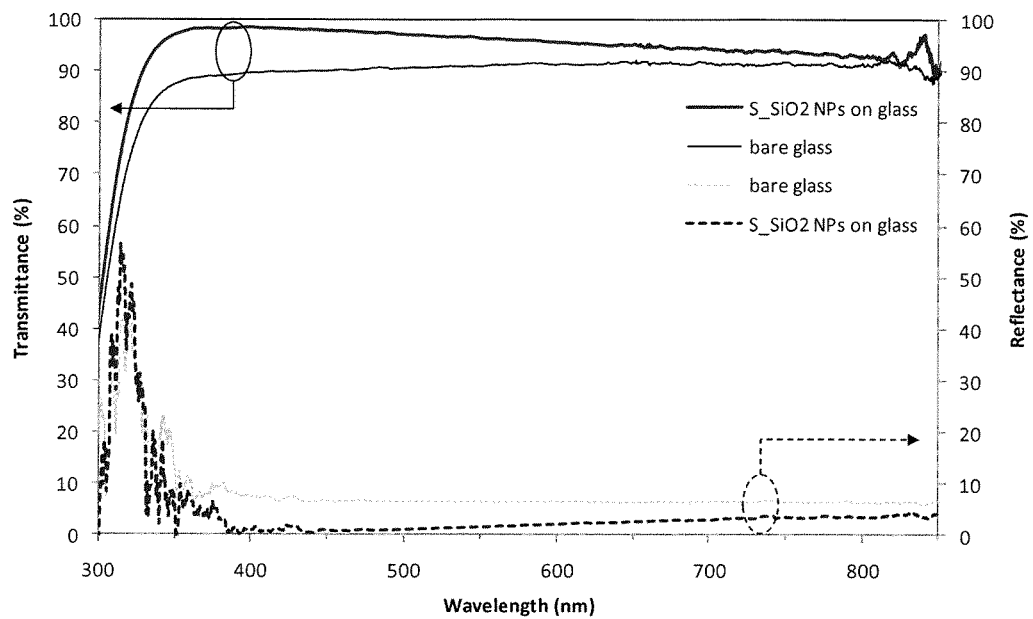
FIG. 45
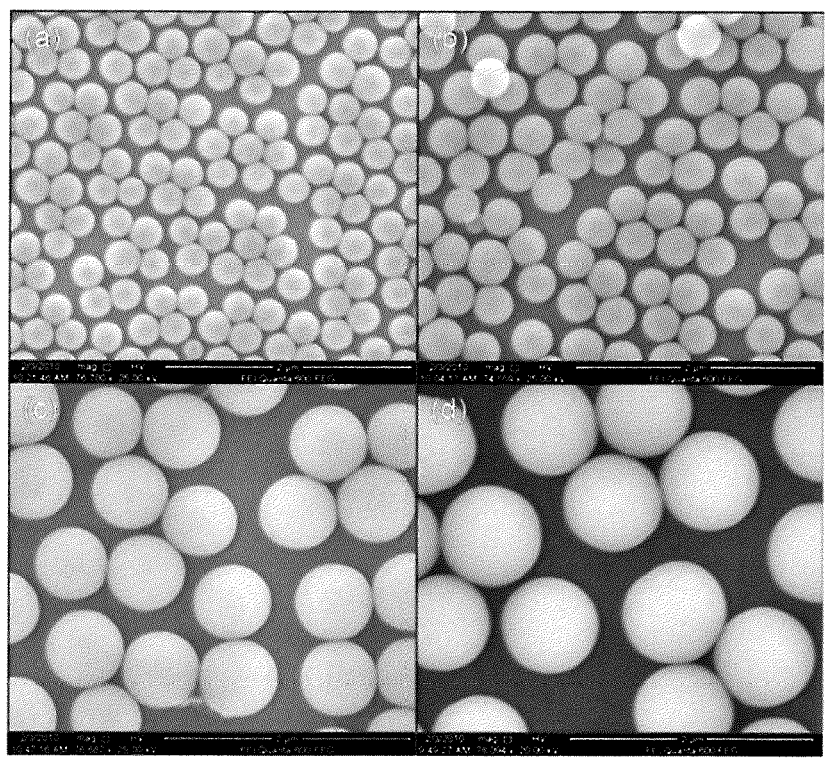
FIGS. 46A-D

NANOSTRUCTURED ANTI-REFLECTIVE COATINGS FOR SUBSTRATES

CROSS REFERENCE TO RELATED APPLICATIONS

The present application is a continuation-in-part of PCT/US2010/022010, filed on Jan. 25, 2010, which claims priority to U.S. Provisional Application No. 61/205,766, filed on Jan. 23, 2009. The present application also claims priority to U.S. Provisional Application No. 61/458,725, filed on Nov. 29, 2010. The entire disclosures of the prior applications are hereby incorporated by reference herein.

ACKNOWLEDGMENT OF GOVERNMENT SUPPORT

The present invention was developed, at least in part, using funds from the National Science Foundation's Process and Reaction Engineering program under CAREER grant No. CTS-0348723, and funds from the National Science Foundation's Process and Reaction Engineering program under grant No. CBET-0654434. The government has certain rights in the invention.

FIELD

The present disclosure concerns a process for depositing materials, generally as thin films, on substrates, particularly a chemical bath deposition process that uses a microchemical system comprising a micromixer, a microchannel fluid applicator, or both, and articles made according to the process, including nanostructured, anti-reflective coatings for transparent and absorbing surfaces.

BACKGROUND

Chemical bath deposition (CBD), the aqueous analog of chemical vapor deposition with the constituent ions dissolved in a water solution, can be used to deposit epitaxial layers at low temperatures. For example, CBD has been successfully used as a batch process to deposit many semiconductor compounds, including $Ag_2S$, CdS, CdSe, CoS, $Cu_2S$, PbS, SnS, SnO, $MoS_2$, SbS, $TiO_2$, ZnO, SnSe, CdSnS, $CuInSe_2$, and PbHgS. Batch CBD processes also have been used to make thin film transistors. Gan et al., U.S. Pat. No. 6,225,149, for example, entitled "Method to Fabricate Thin Film Transistors and Circuits," describes forming thin film transistors by preparing a chemical deposition bath and depositing a semiconductor layer using the chemical bath. Other methods for depositing thin films are disclosed in U.S. Publication No. 2007/0184576, which is incorporated herein by reference.

Though CBD has many advantages, it also has drawbacks. One major drawback is the formation of particles, as well as the unwanted deposition that occurs with such processes, which generates waste and causes device defects. For batch CBD processes, the heat needed for chemical reaction may be supplied from the solution bath to the sample surface. With reference to CdS as an example, this results in both heterogeneous CdS nucleation at the surface as well as homogeneous CdS formation in the bath. Hence, with thermal jacket baths (glass beaker etc.) or water baths, significant CdS deposition also occurs on the walls of the vessels. The bath must be stirred continuously to ensure uniform thermal and chemical mixing and to minimize adhesion of homogeneously nucleated CdS particles to the growing film surface. Moreover, the unequal bath volumes used to form desired CdS films generates substantial waste and also creates device defects. Batch CBD processes also typically require that the deposited material be subjected to relatively high-temperature annealing processes. These high temperatures generally are not compatible with substrates, such as polymeric materials, that are used to make flexible electronic devices, such as flexible transistors, or plastic (e.g., polycarbonate) eyeglass lenses.

Batch CBD processes are quite useful. However, a low-temperature process that combines large area deposition with high utilization and growth rate for high conversion efficiencies and precise control over particle formation and deposition has not yet been demonstrated.

SUMMARY

Embodiments of the present system for chemical deposition, particularly continuous deposition of anti-reflective films, typically comprise: a micromixer, such as an interdigital micromixer or other type of micromixer [such as disclosed in V. Hessel et al., Chem. Eng. Sci. 60, 2479 (2005), which is incorporated herein by reference]; a microchannel applicator; or both. Additional examples of micromixers and microchannel devices are disclosed in U.S. Publication No. 2005/0220681, which is incorporated herein by reference. The present system and process provide a substantially constant flux of reactant solution that allows control over the homogeneous reaction of the chemical bath solution before the solution impinges on the substrate.

Working embodiments of the system typically include at least a first fluid source, more typically at least a first and second fluid source, operably coupled to a micromixer. The mixer effectively mixes fluids to initiate formation of the deposition material. A microchannel applicator may then be used to apply the deposition fluid to a substrate, such as an aluminum, glass, polymer, or silicon substrate. Some embodiments may use flexible substrates, such as polymeric materials.

A person of ordinary skill in the art will appreciate that the system can include other components, such as components that facilitate chemical deposition. For example, the deposition system may comprise one or more heat exchangers to heat the deposition fluid(s) and a heater operably coupled to the substrate for heating the substrate. Furthermore, the system may comprise at least one pump for pumping the first and/or second fluids, or at least two pumps for pumping the first and second fluids through the system, such as to the micromixer.

Uniform and highly oriented materials, such as nanocrystalline, anti-reflective metal oxide thin films, exemplified by zinc oxide films and silicon dioxide films, were successfully deposited on substrates using the system. The surface morphologies of the deposited materials were characterized by scanning electron microscopy (SEM). Reflectance and transmittance were measured with UV-Visible spectroscopy. The analyses demonstrated a marked decrease in surface reflectivity.

A process for chemical deposition, particularly of thin films, also is described. One embodiment of the process comprises providing a first reactant, providing a second reactant, and flowing the first and second reactants to a micromixer to mix the first and second reactants, thereby initiating formation of a deposition material. A person of ordinary skill in the art will appreciate that formation of some deposition materials may require more than two reactant streams. The deposition material is then applied to a substrate, such as by using a microchannel applicator.

Particular embodiments exemplify the invention by reference to the production and/or application to a substrate of a ZnO or $SiO_2$ anti-reflective film. For ZnO deposition, the first reactant typically was zinc acetate, and the second reactant comprised sodium hydroxide. For $SiO_2$ deposition, the first reactant typically was tetraethylorthosilicate and the second reactant was ammonium hydroxide/water. Other compounds suitable for producing anti-reflective coatings include, but are not limited to, $CeO_2$, $MgF_2$, and ZnS. Additional examples are disclosed in U.S. Publication Nos. 2007/0020400 and 2008/0108122, which are incorporated herein by reference.

A person of ordinary skill in the art also will appreciate that the first reactant, the second reactant, or both may comprise additional materials suitable for various functions, such as to facilitate the deposition process. For example, such compositions may include a complexing agent or agents, such as a nitrogen-bearing compound, with ammonia being one example of a suitable nitrogen-bearing complexing agent.

The process can be used to tailor the composition and morphology of the material as deposited on a substrate. For example, where a thin film is deposited on a substrate, the film may be an epitaxial nanostructured thin film, a nanoparticle film, a nanocrystalline thin film, an epitaxial thin film comprising embedded nanocrystals, a superlattice thin film, a composition gradient thin film, a composite thin film comprising core-shell nanoparticles, and combinations thereof. Desired particles can be produced by a chemical bath deposition process by controlling the residence time of the mixed reacting solution, by using a combined chemical bath deposition and solution-based nanoparticle synthesis process, or by using a nanoparticle solution directly.

One advantage of the present process is that it can be used at low temperatures as a post-deposition, high-temperature annealing step is obviated. Because a micromixer is used, reagent volumes are decreased compared to conventional processes with resulting decreases in waste material generated. The present process also can be used to synthesize nanomaterials in the required volumes at the point of application, reducing human exposure to potentially hazardous materials as well as reducing the need to transport and store such potentially hazardous materials. These advantages allow process flexibility and reduce costs relative to known processes. For example, because high-temperature annealing processes are avoided, candidate substrate materials are significantly increased, and include flexible substrate materials, such as polymeric materials, that cannot be used for known, high-temperature chemical bath deposition processes.

In some embodiments, anti-reflective coatings are prepared by depositing a first polymer solution onto a substrate surface, drying or curing the first polymer solution to form a first polymer layer, depositing a nanoparticle solution comprising nanoparticles having an average diameter smaller than some wavelengths of light onto the first polymer layer to provide a nanoparticle layer, and drying or curing the nanoparticle layer to provide an anti-reflective coating on the substrate. In certain embodiments, a second polymer solution is deposited onto the nanoparticle layer and dried or cured to provide a second polymer layer. The second polymer layer may increase the scratch resistance and/or durability of the anti-reflective coating.

Embodiments of the disclosed processes can be used to produce particular products including, without limitation, anti-reflective coated lenses, scratch-resistant, anti-reflective coated lenses, fuel cell electrode membranes, photovoltaic films, solar cells, flexible solar cells, solar catalytic microreactors, wearable electronics, biomedical films, etc. The process for making devices comprises at least one step comprising flowing at least a first, and typically plural, reactants to a micromixer to mix the first and second reactant and initiate formation of a deposition material. The deposition material may then be applied to a substrate using a microchannel applicator. In particular embodiments, the deposition material comprises nanoparticles. In certain embodiments, an anti-reflective coating is a 2-layer construct comprising a first inorganic-organic hybrid polymer layer (e.g., polymer comprising metal alkoxides, metalloid alkoxides, or a combination thereof), and a nanoparticle layer. In particular embodiments, an anti-reflective coating is a 3-layer construct comprising a first inorganic-organic hybrid polymer layer (e.g., polymer comprising metal alkoxides, metalloid alkoxides, or a combination thereof), a nanoparticle layer, and a second inorganic-organic hybrid polymer layer. Working embodiments of the process were used to make nanostructured, anti-reflective coatings.

The foregoing and other objects, features, and advantages of the invention will become more apparent from the following detailed description, which proceeds with reference to the accompanying figures.

BRIEF DESCRIPTION OF THE DRAWINGS

FIGS. 23A and 23B are SEM micrographs of a ZnO film with "white" morphology.

FIGS. 24A and 24B are SEM micrographs of a ZnO film with "black" morphology.

FIGS. 25A and 25B are SEM micrographs of a mixture of white and black ZnO morphologies.

FIG. 45 is a graph of wavelength versus transmittance (T) and reflectance (R) of bare glass and $SiO_2$ nanoparticles thin film deposited on double side glass substrate: -(T), ---- (R), thicker line ($SiO_2$ nanoparticles thin film), thinner line (bare glass).

FIGS. 46A-D are SEM images of $SiO_2$ nanoparticles synthesized with varying amounts of ammonium hydroxide.

DETAILED DESCRIPTION

Figure 1:
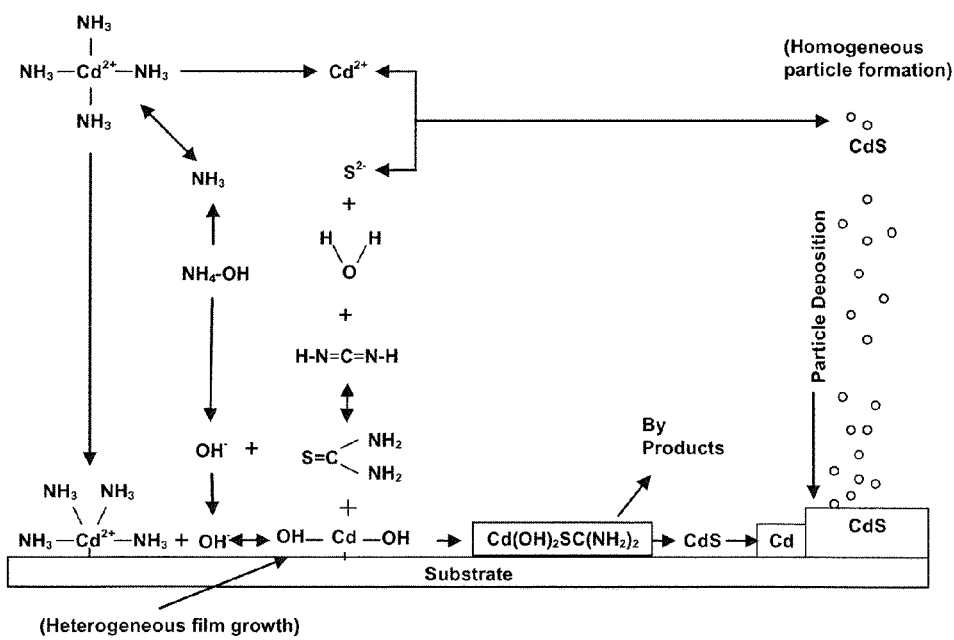
FIG. 1 is a schematic diagram illustrating CBD-CdS growth mechanisms.

Unless otherwise indicated, all numbers expressing quantities of ingredients, molecular weights, sizes, percentages, temperatures, times, and so forth, as used in the specification or claims are to be understood as being modified by the term "about." Unless otherwise indicated, non-numerical properties such as amorphous, crystalline, homogeneous, and so forth as used in the specification or claims are to be understood as being modified by the term "substantially," meaning to a great extent or degree. Accordingly, unless otherwise indicated, implicitly or explicitly, the numerical parameters and/or non-numerical properties set forth are approximations that may depend on the desired properties sought, limits of detection under standard test conditions/methods, limitations of the processing method, and/or the nature of the parameter or property. When directly and explicitly distinguishing embodiments from discussed prior art, the embodiment numbers are not approximates unless the word "about" is recited.

I. CBD

A. CBD Generally

The fundamental aspects of CBD are similar to that of a CVD process. Without being limited to a theory of operation, CBD generally involves mass transport of reactants, adsorption, surface diffusion, reaction, desorption, nucleation, and growth. Earlier studies suggested a colloidal-by-colloidal growth model. I. Kaur, D. K. Pandya, K. L. Chopra, *J. Electrochem. Soc.*, 1980, 140, 943. However, more recent investigations by Ortega-Borges & Lincot, based on initial rate studies using a Quartz Crystal Microbalance (QCM), suggested that different growth kinetics are involved. R. Ortega-Borges, D. Loncot, *J. Electrochem. Soc.*, 1993, 140, 3464. Ortega-Borges et al. identified three growth regimes: an induction period with no growth observed; a linear growth period; and finally a colloidal growth period, followed by the depletion of reactants. Ortega-Borges et al. proposed a molecular level heterogeneous reaction mechanism for CdS deposition according to the equations provided below.

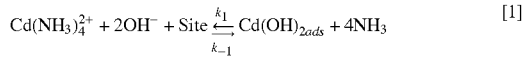

[1]

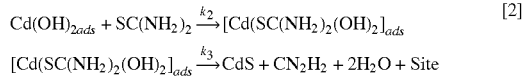

[2]

This model has provided a good understanding of CBD processes at the molecular level. Particle formation plays an important role in CBD processes. Kostoglou et al. reported a detailed and comprehensive model for a CBD process for depositing CdS. M. Kostoglou, N. Andritsos, A. J. Karabelas, *Ind. Eng. Chem. Res.*, 2000, 39, 3272. This model includes particle nucleation, growth, and deposition in addition to molecule-by-molecule film growth.

Disclosed embodiments of the present invention provide many benefits relative to batch CBD processes. For example, thin films deposited using embodiments of the present methods and systems are substantially more continuous, and generally have a higher crystallinity, than do thin films deposited by batch processes. Post annealing steps required with batch processes, which are obviated with the present invention, may reduce the porosity of the deposited materials and increase the crystallinity. However, films deposited using the present invention typically are less porous, and often have higher crystallinity, relative to batch processes even without a post deposition annealing step.

Moreover, the present invention provides a more reliable and reproducible deposition result. For batch processes, it is not unusual to make plural deposition attempts to obtain a suitable deposited layer. The occurrence of unsuitable deposition layers is significantly reduced using disclosed embodiments of the present method and system.

The present invention also provides a higher deposition rate than batch processes at the same deposition material concentration. To obtain a deposited layer having a suitable thickness, batch CBD processes often will use plural deposition baths to deposit a single layer. The longer a substrate is immersed in a deposition bath, the more likely it is that deleterious particle formation and deposition will occur on the substrate. This unwanted particle formation and deposition can be minimized in batch processes by moving the substrate from deposition bath to deposition bath, and immersing the substrate in a particular deposition bath for a time selected to minimize particle formation. However, the longer the substrate remains in the deposition bath, the slower the deposition rate is since the reactant concentrations are decreasing. All of these process deficiencies are addressed by using disclosed embodiments of the present invention.

FIG. 1 is a schematic diagram of CBD-CdS growth mechanisms that illustrates the results associated with both homogeneous and heterogeneous reactions. Small particles form and grow even at the beginning of the process as observed by dynamic light scattering and TEM measurements. C. Voss, Y. J. Chang, S. Subramanian, S. O. Ryu, T.-J. Lee, C.-H. Chang, *J. Electrochem. Soc.*, 2004, 151(10), C655, incorporated herein by reference. These experimental results indicated the importance of particle formation even in the linear growth regime. It is desirable to develop a process that de-couples homogeneous particle formation and deposition from the molecular level heterogeneous surface reaction for a better understanding and optimization of CBD processes.

B. Deposition Materials

A person of ordinary skill in the art will appreciate that the present CBD process can be used to deposit a variety of different materials. Disclosed embodiments are exemplified with reference to particular materials, such as metal oxides, one example of which is zinc oxide (ZnO), and using such materials to form anti-reflective coatings. Many different materials can be deposited using the present system, and many devices can be produced using the system and process. The appropriate selection of a deposition material, and hence reactants potentially useful for forming the desired deposition material, will depend on several factors, including the end use of the device constructed. For example, the composition of the material to be deposited can be selected to provide a desired result in a product made using the material. Once the deposition material is identified, the reactants used to form in the deposition material can be varied to maximize reaction efficiency, reduce production costs, decrease or minimize toxicity, waste, etc., and combinations thereof. Other variables also can be manipulated, such as: varying the concentration of the material to be deposited; using complexing agents, such as nitrogen-bearing compounds, including ammonia, to facilitate the process; varying the temperature of the reactant solutions and/or the substrate; potentially varying the solvent or suspending liquid to be other than water; and combinations of such variables.

Solely by way of example and without limitation, useful materials that may be formed and deposited by the present CBD process include Au, Ag, Cu, Co, Cr, Ge, Ni, Pt, Pd, Rh, Se, Si, Ru, $Ag_2S$, $Ag_2Se$, AgO, $Ag_2O$, $Al_2O_3$, $As_2S_3$, BaO, $Bi_2S_3$, $Bi_2Se_3$, CdO, CdS, CdSe, CdSnO, CdTe, CdZnS, $CeO_2$, CoS, CoSe, CoO, $CrO_2$, $CuBiS_2$, $CuGaSe_2$, $Cu(In,Ga)Se_2$, $CuInSe_2$, $CuInS_2$, $Cu_{2-x}S$, $Cu_{2-x}Se$, $Cu_2O$, FeO(OH), $Fe_2O_3$, $Fe_3O_4$, GaAs, GaN, $Ga_2O_3$, GaP, Ge, $GeO_2$, $HfO_2$, HgS, HgSe, InGaAs, InAs, $In_2O_3$, InP, $In_2S_3$, $In_2Se_3$, $La_2O_3$, MgO, MnS, $MnO_2$, $MoO_2$, $MoS_2$, $MoSe_2$, $NbO_2$, NiS, NiSe, NiO, PbHgS, PbS, PbSe, PbTe, $PbO_2$, $ReO_3$, $RhO_2$, $RuO_2$, $Sb_2S_3$, $Sb_2Se_3$, SiGe, $SiO_2$, SnS, $SnS_2$, SnSe, $SnO_2$, $Sb_2S_3$, $TiO_2$, TlS, TlSe, $Tl_2O_3$, $VO_2$, $WO_2$, $Y_2O_3$, ZnO, ZnS, ZnSe, $ZrO_2$, etc., and combinations thereof.

Zinc oxide films have been produced in working embodiments of the present apparatus and system. For ZnO, the continuous deposition reactor included a microprocessor-controlled dispensing pump (ISMATEC® pumps), a T-mixer, and a substrate heater. The ZnO thin films were prepared from source solutions I, comprising aqueous zinc acetate and ammonium acetate, and II, comprising aqueous sodium hydroxide. The source solutions were mixed through a T-mixer by a peristaltic pump and entered a micro-tube, which kept at about 70-80° C. with a water circulation system. Over a period of four minutes, the mixed solution was impinged on a substrate that was maintained at about 70-80° C. by a heater. The substrate was spun at about 1500 rpm during deposition. Coatings were prepared on aluminum having a smooth, mirror-like surface, micro glass slide substrates, and textured silicon substrates.

Silicon dioxide films also have been produced in working embodiments of the present apparatus and system. The $SiO_2$ thin films were produced from source solutions I, comprising tetraethylorthosilicate in ethanol, and II, comprising ammonium hydroxide and deionized water in ethanol. The source solutions were mixed through a T-mixer by a peristaltic pump and entered a micro-tube at ambient temperature. The mixed solution was impinged on a substrate that was spun at 2000 rpm at ambient temperature. Coatings were prepared on glass and polycarbonate substrates.

As will be apparent to a person of ordinary skill in the art, many of the metals, alloys, semiconductors, etc., that are desirably deposited using the present invention are produced by mixing precursor materials that react to form the desired deposition material. Any effective metal precursor material can be used with the present invention. Solely by way of example, and without limitation, particular examples of metal precursors include halides, acetates, nitrates, sulfates and carbonates. Mixtures of such precursors also can be used.

The reactant sources can be formulated with other materials that facilitate the process. For example, the metal source, such as the zinc (II) source, can be formulated with other materials, such as complexing agents. Many of the useful complexing agents are nitrogen-bearing compounds, including by way of example, and without limitation, ammonia, aliphatic amines, and aliphatic amides, with particular examples including ammonia, triethanolamine, ethanolamine, diethylenetriamine, ethylenediaminetetracetate, hydrazine, nitrilotriacetate and triethylenetriamine. Plural different complexing agents also can be used in combination. The reactant sources also can be formulated in different solvents, such as water and/or organic solvent(s), to form a first fluid mixture and a second fluid mixture. The deposition material, such as zinc oxide, is then formed by combining the first mixture with the second mixture.

The reactants also can include chalcogens, and hence chalcogenide precursors are compounds potentially useful for practicing the present invention. Examples of chalcogenide precursors include, by way of example and without limitation, thiourea, thioacetamide, thiocarbazide, thiosemicarbazide, ethylthiourea, allylthiourea, selenourea, N,N dimethyl selenourea, thiosulfate, selenosulfate, water, peroxide, persulfate, sodium hydroxide, urea, dimethylamineborane, trimethylamineborane, acetamide, hexamethyleneteramine, and combinations of such materials.

II. CONTINUOUS FLOW CBD SYSTEMS

A. Working Embodiments

Figure 2:
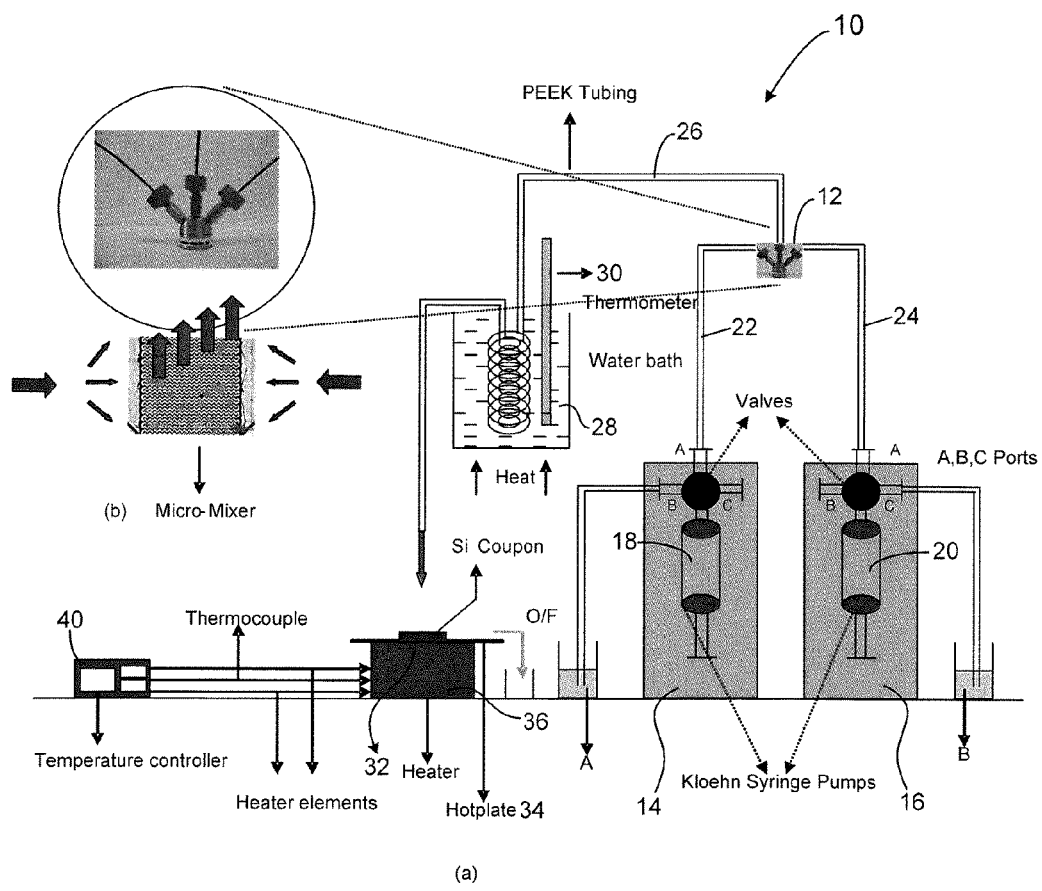
FIG. 2 is a schematic diagram of one embodiment of a continuous flow microreactor system.

Embodiments of a continuous flow microreactor system have been developed for performing CBD. FIG. 2 is a schematic diagram of one embodiment of a continuous flow microreactor CBD system 10. System 10 includes a mixer 12, particularly a micromixer, such as an interdigital micromixer. A detailed schematic diagram of one embodiment of a micromixer is shown in the FIG. 2 inset. Micromixers offer features that cannot be easily achieved using macroscopic devices, such as ultrafast mixing on the microscale. D. Bökenkamp, A. Desai, X. Yang, Y.-C. Tai, E. M. Marzluff, S. L. Mayo., *Anal. Chem.*, 1998, 70, 232. As illustrated in FIG. 2, two fluids A and B to be mixed are introduced into the mixer 12, often as two counter-flowing fluid streams. For an interdigital micromixer 12, the two fluids A and B enter interdigital channels (30 μm in a working embodiment) and form plural interpenetrated substreams. The substreams exit the interdigital channels perpendicular to the direction of the feed flows, initially with a multilayered structure. Fast mixing through diffusion soon follows due to the small thickness of individual layers.

The continuous flow microreactor system 10 includes a reactant source, typically plural reactant sources, such as reactant sources 14, 16, that are combined to form the deposition material or materials. Again, as discussed above, the composition of the reactant sources 14 and 16 may vary, such as to provide desired deposition materials, reduce cost, reduce toxicity, provide flexibility in the selection of appropriate reactants, etc. The illustrated embodiment of system 10 includes two syringe pumps 18, 20 that pump desired quantities of reactants A and B at desired flow rates to the mixer 12. In working embodiments, two syringe pumps (V6 module from Kloehn Ltd.) of 25 milliliters each were used for reactant streams A and B. Each pump 18, 20 had three ports (A, B, C). One port of each pump aspirated the reactant streams and one port was used for dispensing the same. Syringe pumps 18, 20 were fluidly coupled to mixer 12 using polyetheretherketone (PEEK) conduits 22, 24 (1/16" OD, 0.03" ID from Upchurch Scientific).

For the illustrated embodiment, a commercial interdigital micromixer (SSIMM from Institut für Mikrotechnik Mainz, Germany) was used. This interdigital micromixer included a stainless steel (SS 316Ti) housing with inlaid, thermally oxidized silicon to form 30 µm×100 µm microchannels. Reactant streams A and B were pumped through PEEK conduits 22 and 24, respectively, for mixing in mixer 12.

The fluid mixture flowing from mixer 12 comprises the chemical species useful for deposition. In the embodiment 10 illustrated in FIG. 2, conduit 26 was a 5-foot-long coil of PEEK. PEEK conduit 26 was immersed in a water bath 28 to provide temperature control. Water bath 28 generally was maintained at an effective temperature for processing, such as a temperature of from about 60° C. to about 80° C. (using a VWR hot plate stirrer) when forming ZnO films. A person of ordinary skill in the art will appreciate that the effective temperature may vary depending on, for example, the composition of the deposition material. In some embodiments, the temperature may be ambient temperature, e.g., 15-30° C. In other embodiments, the temperature may be 15-100° C., 15-30° C., 20-25° C., 50-90° C., 60-80° C., or 65-75° C.

Moreover, the homogeneous chemistry of the impinging flux can be controlled by selecting various factors, such as the length of the channel 26, the flow rate through channel 26, residence time in channel 26, etc., and combinations thereof. In some embodiments, the residence time ranges from one second to several minutes. For example, the residence time may be one second to 10 minutes, 30 seconds to 8 minutes, 10 seconds to 2 minutes, 5-30 seconds, or 2-10 seconds.

The fluid mixture formed by mixing fluids A and B was applied to substrate 32. In the illustrated embodiment, the substrate 32 was coupled to a metal plate 34. Certain embodiments of CBD are facilitated by heating. In the embodiment illustrated in FIG. 2, system 10 includes a hotplate 36 (2" dia.×0.75" thick SS disk from Watlow). For certain working embodiments employing ZnO as a deposition material, the hot plate was maintained at a temperature of from about 70° C. to about 80° C. The temperature controller 40 was effectively coupled to the hot plate 36 to control the temperature thereof. Once the process was completed, the substrate 32 was removed from the plate 34, washed with Millipore DI water and dried under a stream of nitrogen gas. In certain working embodiments employing SiO$_2$ as a deposition material, the substrate is maintained at ambient temperature, e.g., 15-30° C. The substrate temperature during deposition depends on the particular substrate and deposition material and, in some instances, the desired morphology of the anti-reflective film. Thus, the substrate may be maintained at a temperature from about 15-200° C., 15-30° C., 20-25° C., 50-90° C., 60-80° C., or 65-75° C.

Figure 3:
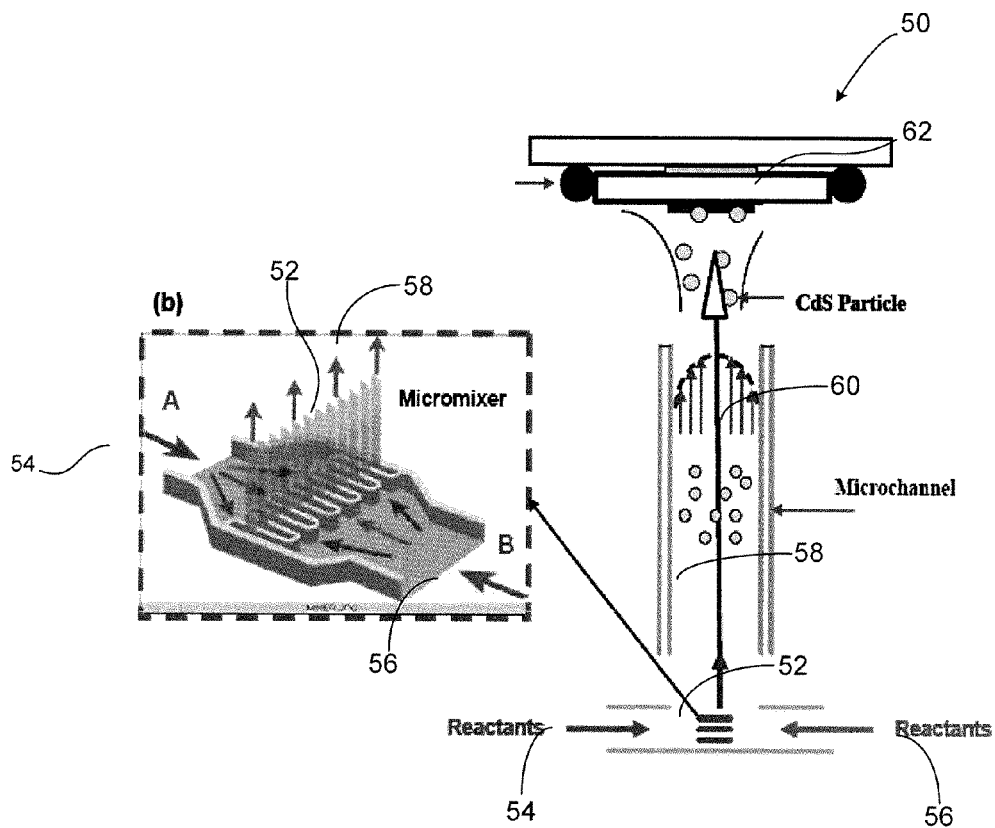
FIG. 3 is a schematic diagram of one embodiment of an impinging flow bath deposition reactor, with the inset illustrating one embodiment of an interdigital micromixer.

FIG. 3 is a schematic cross sectional drawing illustrating an impinging flow chemical bath deposition reactor 50. The inset to FIG. 3 is an enlarged view of the micromixer 52 illustrated schematically in FIG. 3. FIG. 3 shows that a first reactant stream 54 and a second reactant stream 56 flow into micromixer 52, thereby forming a third stream 58 comprising the desired chemical species for substrate deposition. Third stream 58 flows through a channel 60, particularly a microchannel, for direct impingement on to the substrate 62.

B. Commercial Implementation

Figure 4:
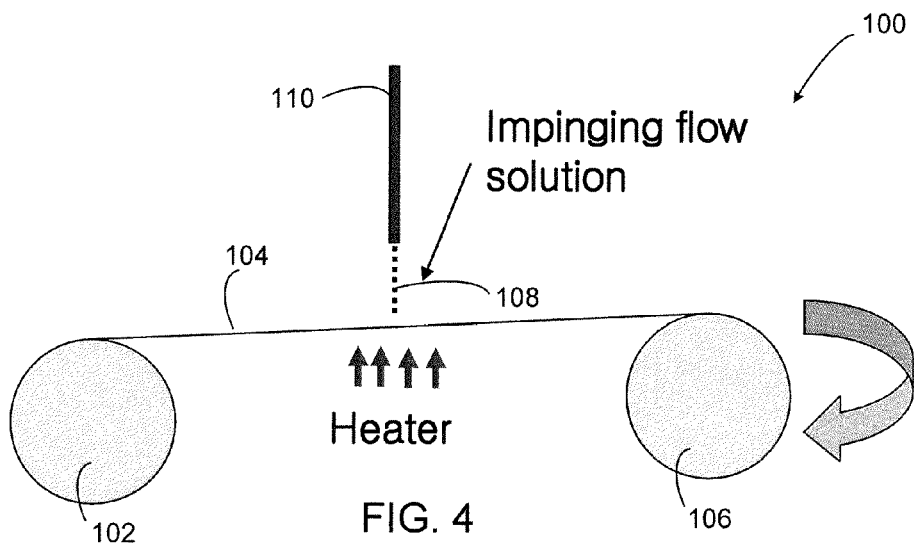
FIG. 4 is a schematic diagram illustrating one embodiment of a process using a roll-to-roll substrate susceptor or a substrate roll.

System 10 may be modified to provide various CBD systems. A commercial system 10 might include, for example, a continuous susceptor. FIG. 4 illustrates one embodiment of a continuous roll-to-roll susceptor 100. The illustrated embodiment includes a first roller 102 comprising a feed roll of a substrate or susceptor material 104. Material 104 is fed to a second roller 106. Rollers 102 and 106 move material 104 into a position effective to receive an impinging solution flow of a deposition material 108 from channel 110.

Figure 5:
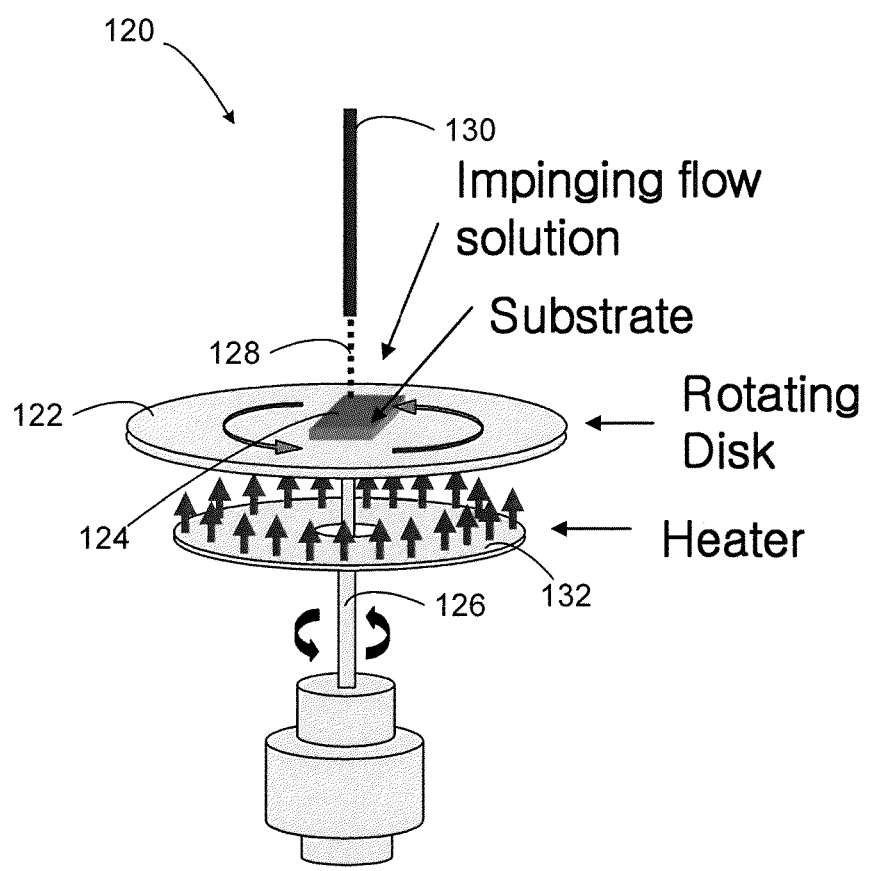
FIG. 5 is a schematic diagram of one embodiment of a rotating disk substrate susceptor.

Alternatively, system 10 may include a rotating disk substrate susceptor system 120, such as illustrated in FIG. 5. System 120 includes a rotating disk 122. While the illustrated disk is substantially circular, a person of ordinary skill in the art will realize that the disk 122 need not be circular, and can have any geometric shape reasonably suited for use as a rotating disk susceptor. Substrate 124 is coupled to the disk 122 to allow rotation of the substrate 124. Disk 122 is effectively coupled to a rotator, such as a motor, via shaft 126.

An impinging solution flow of deposition material 128 is directed to substrate 124 via channel 130. As with other disclosed embodiments, heat may facilitate the deposition process. As a result, a heater 132 also optionally may be included in a manner effective to transfer heat to the substrate 124.

Figure 6:
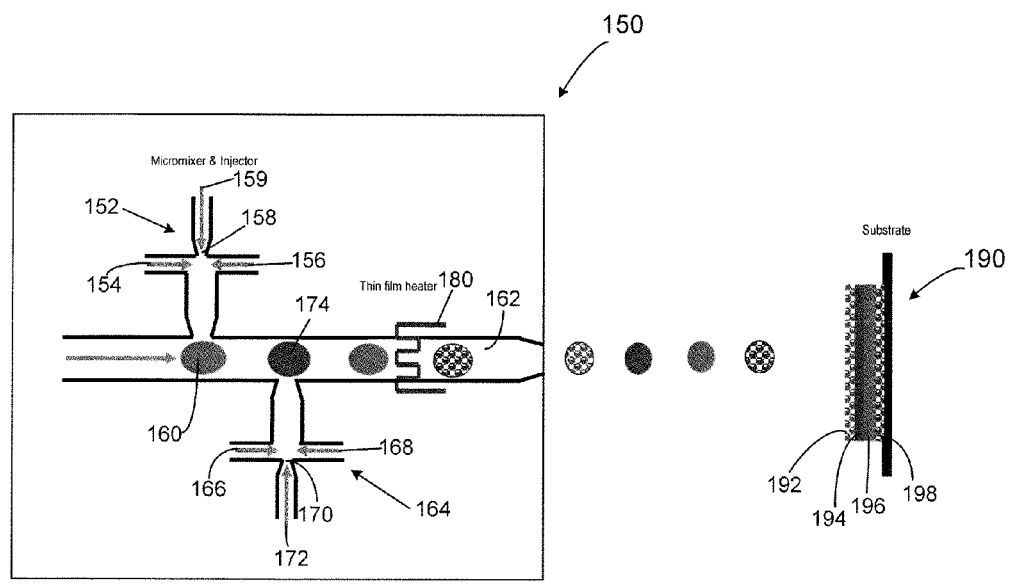
FIG. 6 is a schematic diagram of one embodiment of chip-based chemical mixing and deposition system.

System 10 also can be provided as a chip-based system. A schematic drawing of a chip-based system 150 is illustrated in FIG. 6. System 150 includes a first micromixer section 152. For embodiments comprising plural fluid reactants, at least a first fluid 154 and a second fluid 156 are flowed into the mixer 152. A third port, such as port 158, can be provided to aspirate fluids in mixer 152. Alternatively, at least a third fluid stream 159 can be flowed into micromixer system 152. The number and composition of the fluid streams will vary as determined by the chemical system in use. Impinging fluid streams 154, 156 and/or 159 are thoroughly mixed in mixer 152 to form a deposition material 160 that is flowed to the substrate via a fluid channel 162.

Many devices, such as electrical devices including transistors, may require deposition of a more than one material onto a substrate. Furthermore, such material(s) typically must be applied in a particular order to produce a working device. The possibility of depositing more than one material is contemplated by the chip-based system 150. In this embodiment, at least a second micromixer 164 optionally is provided. As with micromixer 152, at least a first fluid 166 and a second fluid 168 are flowed into the mixer 164. A third port 170 can be provided to aspirate fluids in mixer 164. Alternatively, at least a third fluid stream 172 can be flowed into micromixer 164. The fluid streams 166, 168 and/or 172 are mixed in mixer 164 to form a deposition material 174. Deposition material 174 may be the same as deposition material 160, or can be a different deposition material. Thus, by using plural different deposition materials, a deposited layer may have a composition gradient throughout its cross section.

System 150 can include a heat transfer section. One example of a device useful for heat transfer is a heater, such as a thin film heater 180.

Once formed, the deposition materials 160, 174, etc. are flowed through channel 162 to impinge on a substrate 190. Again, in the illustrated embodiment, the device formed includes plural layers 192, 194, 196 and 198, all of which layers may be different in composition or morphology, all of which layers may be the same in composition and morphology, and all possible combinations thereof.

Figure 7:
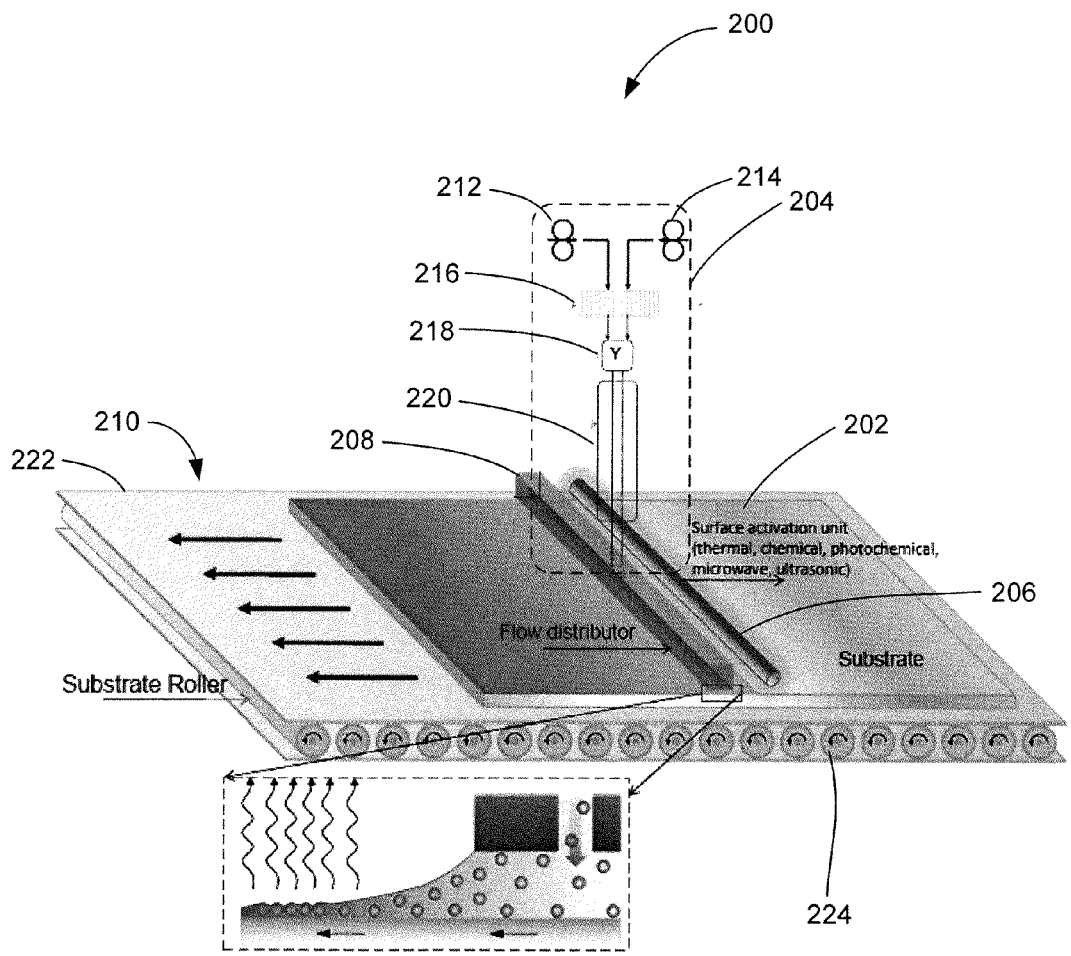
FIG. 7 is a schematic diagram of one embodiment of a system for depositing nanostructured thin films onto a substrate in a continuous manner.

FIG. 7 illustrates a deposition system 200 suitable for depositing nanostructured thin films on a substrate 202 in a substantially continuous manner. The deposition system 200 includes a continuous flow reactor system 204, a surface activation unit 206, a flow distributor 208, and substrate support means 210 for supporting and moving the substrate 202. In some embodiments, system 200 also includes a waste solution collector and waste vapor filter (not shown).

The continuous flow reactor system 204 includes two or more pumps 212, 214, one or more heat exchangers 216, one or more mixers 218, and one or more activation and residence time channels 220. First and second fluid streams are pumped through pumps 212 and 214, respectively. The fluid streams pass through one or more heat exchangers 216, which add or remove heat from the fluid streams to achieve a desired temperature. The fluid streams pass through a mixer 218 and are combined to form a deposition material, which flows into an activation and residence time channel 220. In certain embodiments, the residence time channel 220 has a length of 3-15 m and an inner diameter of 0.2-5 mm. The activation and residence time channel 220 may include one or more activation sources (not shown). Suitable activation sources may include thermal, chemical, photochemical, electrochemical, microwave, and/or ultrasonic activation means. The activation sources provide energy to the deposition material and generate reactive species (e.g., molecules, clusters, particles, and/or macromolecules) within the deposition material. The deposition material flows from the activation and residence time channel 220 onto the substrate 202.

The substrate 202 is supported by suitable substrate support means 210. In the illustrated embodiment, means 210 includes a support surface 222 and a plurality of rollers 224. Rotation of the rollers 224 moves the substrate 202 in a substantially continuous fashion as the deposition material flows onto the substrate 202. In another embodiment (not shown), the support surface 222 is absent and the substrate 202 is placed directly on the plurality of rollers 224. Other suitable substrate support means 210 may include, for example, a conveyor. A surface activation unit 206 is positioned proximate the substrate 202 and upstream from the activation and residence time channel 220. The surface activation unit 206 typically extends across a width of the substrate 202 and is operable to provide energy (e.g., thermal, chemical, photochemical, microwave, and/or ultrasonic energy) to the substrate 202. For example, the surface activation unit 206 may provide thermal energy to heat the substrate 202 to a desired temperature. As the heated substrate 202 passes beneath the activation and residence time channel 220, deposition material flows from the activation and residence time channel 220 onto the substrate 202. A flow distributor 208 is positioned proximate the substrate 202 and downstream from the activation and residence time channel 220. The flow distributor 208 typically extends across the width of the substrate 202 and functions to distribute the deposition material uniformly across the substrate 202.

The inset to FIG. 7 is an enlarged view of the deposition material flowing onto the substrate 202 between the surface activation unit 206 and the flow distributor 208. The deposition material is spread on the substrate 202 by the flow distributor 208. Molecules or particles within the deposition material adsorb to the substrate surface, diffuse across the surface and react, promoting nucleation and growth of a nanostructured thin film.

Figure 8:
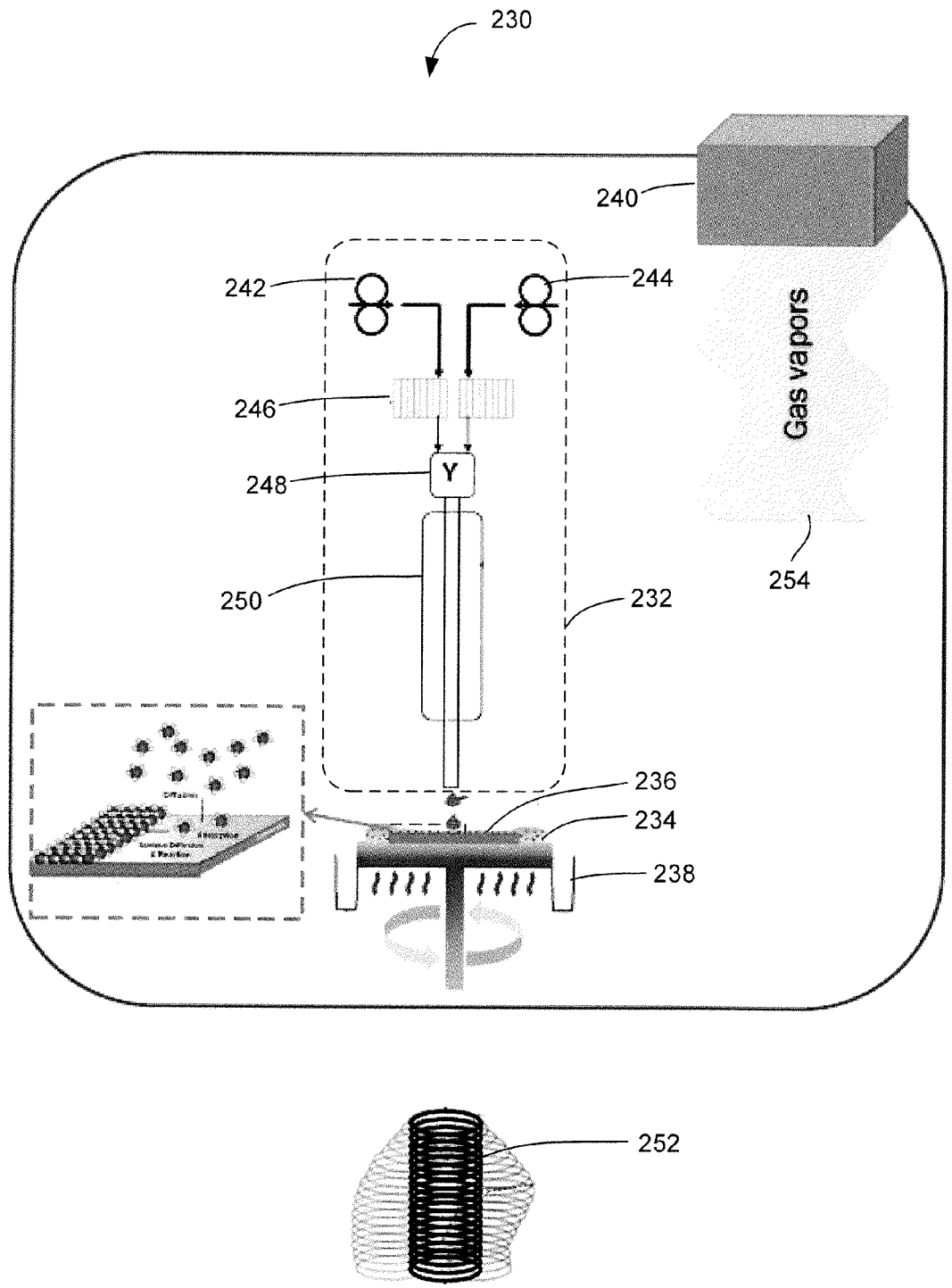
FIG. 8 is a schematic diagram of one embodiment of a table-top system for depositing nanostructured thin films onto a substrate.

One embodiment of a table-top deposition system 230 is illustrated in FIG. 8. The table-top deposition system 230 includes a continuous flow reactor system 232, a rotating disk 234 for supporting and moving a substrate 236, a waste solution collector 238, and a waste vapor filter 240.

The continuous flow reactor system 232 includes two or more pumps 242, 244, one or more heat exchangers 246, a mixer 248, and an activation and residence time channel 250. First and second fluid streams are pumped through pumps 242 and 244, respectively. The fluid streams pass through one or more heat exchangers 246, which add or remove heat from the fluid streams to achieve a desired temperature. The fluid streams pass through a mixer 248 and are combined to form a deposition material, which flows into an activation and residence time channel 250. In some embodiments, the activation and residence time channel 250 may be a coil of microchannel tubing 252. In certain embodiments, the residence time channel 250 has a length of 3-15 m and an inner diameter of 0.2-5 mm. In particular embodiments, the microchannel tubing coil 252 is flexible, as illustrated by the flexed coils on either side of coil 252. The activation and residence time channel 250 may include one or more activation sources (not shown). Suitable activation sources may include thermal, chemical, photochemical, electrochemical, microwave, and/or ultrasonic activation means. The activation sources provide energy to the deposition material and generate reactive species (e.g., molecules, clusters, particles, and/or macromolecules) within the deposition material. The deposition material flows from the activation and residence time channel 250 onto the substrate 236.

The substrate 236 is supported by a rotating disk 234. A surface activation unit (not shown) is positioned proximate the rotating disk 234. In some embodiments, the surface activation unit is positioned beneath the rotating disk 234. The surface activation unit is operable to provide energy (e.g., thermal, chemical, photochemical, microwave, and/or ultrasonic energy) to the substrate 236 and/or the deposition material. For example, the surface activation unit may provide thermal energy to heat the rotating disk 234 and the substrate 236 atop the rotating disk to a desired temperature. Deposition material flows from the activation and residence time channel 250 onto the substrate 236 atop the rotating disk 234. The deposition material flows across the substrate 236. Excess deposition material flows from the substrate 236 into a waste solution collector 238. In some embodiments, as the deposition material is heated by contact with the substrate 236, gas vapors 252 are produced and are removed via a waste vapor filter 240.

The inset to FIG. 8 is an enlarged view of the deposition material flowing onto the substrate 236. Molecules or particles within the deposition material adsorb to the substrate surface, diffuse across the surface and react, promoting nucleation and growth of a nanostructured thin film on a surface of the substrate 236.

Figure 9:
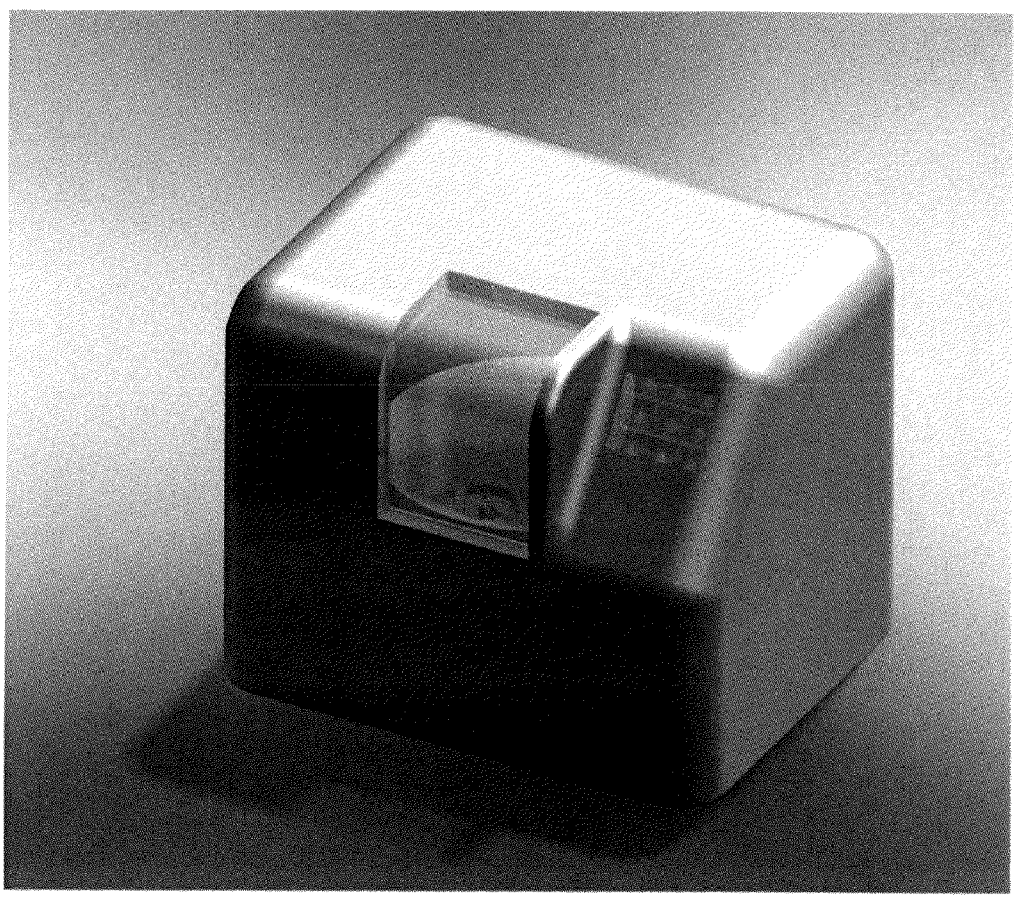
FIG. 9 is a photograph of one embodiment of a table-top system for depositing nanostructured thin films onto a substrate.

FIG. 9 is an exterior photograph of a working embodiment of a table-top deposition system as described in FIG. 8.

Figure 10:
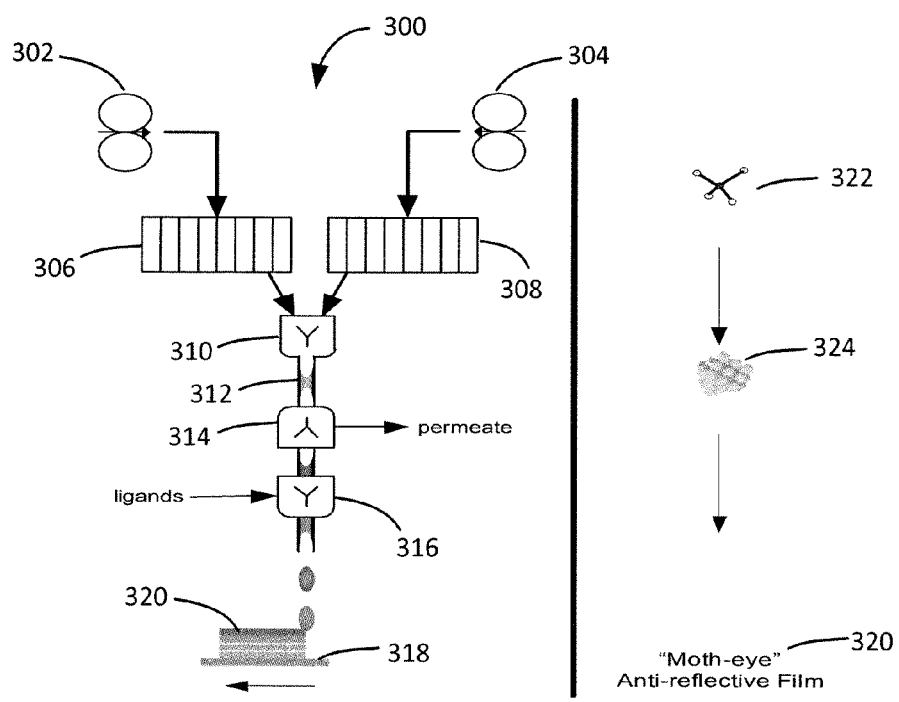
FIG. 10 is a schematic diagram of one embodiment of a system for depositing nanostructured thin films onto a substrate.

One embodiment of a continuous-flow reactor system 300 is illustrated in FIG. 10. The continuous flow reactor system 300 includes two or more pumps 302, 304, one or more heat exchangers 306, 308, a first mixer 310, a microchannel extractor 314, and a second mixer 316. Reactants flow into the first mixer 310 via the pumps 302, 304 and the heat exchangers 306, 308. The reactants are rapidly mixed inside mixer 310 by suitable means (e.g., T-mixing, interdigital mixing, injection mixing, etc.). Rapid mixing allows supersaturation of reactants (for precipitation reactions), leading to molecule 322 formation and burst nucleation of nanoparticles 324 (i.e., seed crystals). As the mixed reactants exit the mixer 310, inert gas bubbles are injected into the liquid stream to provide segmented flow 312. Segmentation facilitates more uniform residence time during nanoparticle growth. The nanoparticles 324 flow into the microchannel extractor 314. Microchannel extractor 314 may include a permeable membrane, allowing separation of larger (retentate) and smaller (permeate) particles. Larger nanoparticles 324 flow into the second mixer 316. In some embodiments, ligands are introduced into second mixer 316, allowing nanoparticle functionalization, such as by coating the nanoparticles with a ligand shell to provide core-shell nanoparticles. Finally, nanoparticles 324 exit the microreactor 300, and are deposited onto a substrate 318 to form an anti-reflective film 320. In some embodiments, substrate 318 may be on a movable substrate support, e.g., a conveyor.

Figure 11:
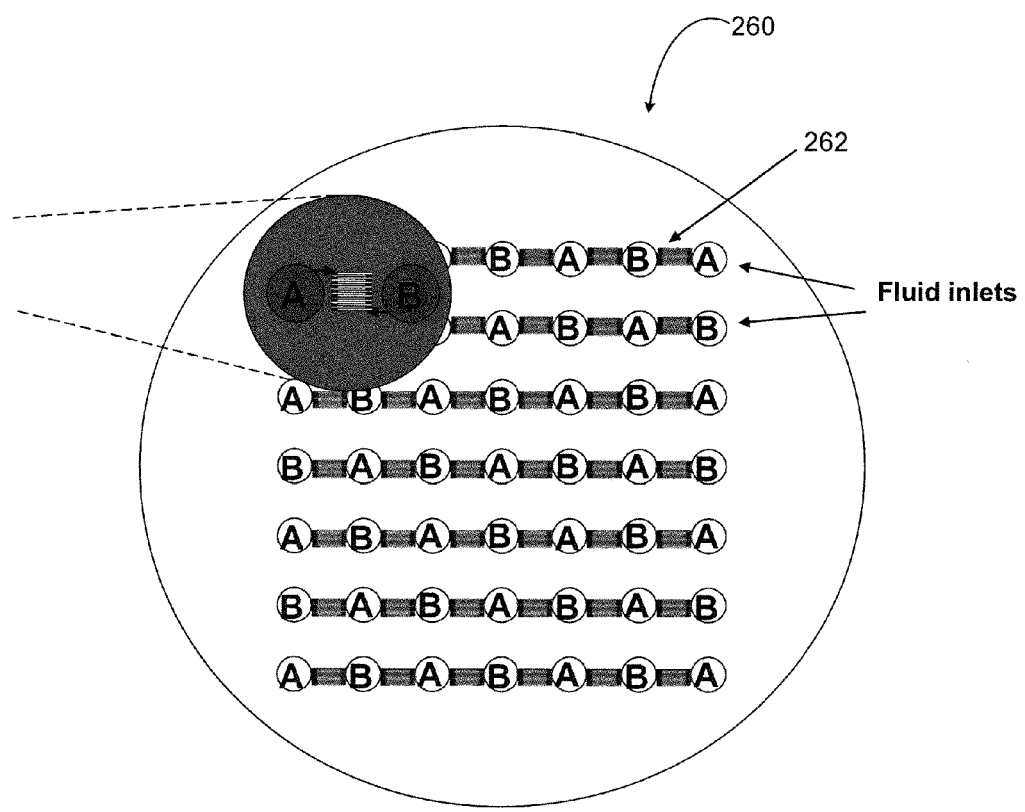
FIG. 11 is a schematic diagram of one embodiment of a micromixer array.

Micromixers are used effectively with certain embodiments of the present invention. Micromixers can be provided as unitary devices that can be used singularly, or plural such micromixers can be used. With chip-based systems, micromixer arrays, such as the array 260 shown in FIG. 11 comprising plural micromixers 262, can be used. One arrangement of plural micromixers to form an array is illustrated in FIG. 11. A person of ordinary skill in the art will appreciate that other micromixer arrangements can be used, such as a linear array of micromixers.

C. Thin Film Structures

Figure 12:
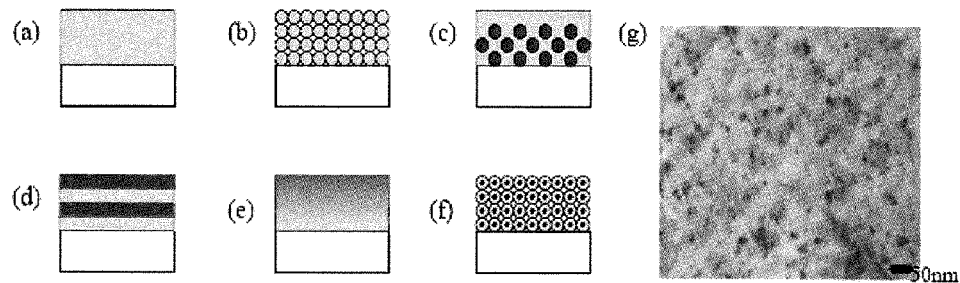
FIG. 12 is a schematic cross sectional drawing illustrating thin film morphologies that can be formed using embodiments of the present invention.

The present invention provides embodiments of a process and apparatus useful for depositing thin films on substrates. The process and apparatus can be used to deposit various films with tailored micro- and nanostructures. FIG. 12 is a schematic cross sectional representation providing examples of thin films that can be formed according to embodiments of the present invention. FIG. 12A is a schematic representation of an epitaxial nanostructured thin film; FIG. 12B is a schematic representation of a nanocrystalline thin film; FIG. 12C is a schematic representation of nanocrystals embedded in an epitaxial thin film; FIG. 12D is a schematic representation of a superlattice thin film; FIG. 12E is a schematic representation of a composition gradient thin film; and FIG. 12F is a composite film comprising core-shell nanoparticles.

In some embodiments, an anti-reflective thin film comprising nanoparticles is applied to a substrate surface. In certain embodiments, a substantially continuous polymer layer is applied to the substrate surface before applying the anti-reflective thin film. In some embodiments, the anti-reflective thing film has a substantially uniform thickness, i.e., the number of nanoparticle layers is substantially the same in any cross-section across the substrate surface. The minimum number of nanoparticle layers is one. In certain embodiments, the anti-reflective thin film also has a substantially uniform concentration of nanoparticles throughout the film, i.e., in any given area of the film, the nanoparticle concentration is substantially the same as in any other area. In some embodiments, the anti-reflective film has a substantially uniform particle density throughout its depth such that the concentration of nanoparticles remains substantially constant throughout the depth of the film. In other words, each nanoparticle layer has substantially the same nanoparticle concentration as any other nanoparticle layer in the film.

In contrast to other known anti-reflective films, embodiments of the disclosed anti-reflective films derive their anti-reflective properties from the surface morphology of the individual nanoparticles. Thus, while the anti-reflective film itself is uniform in nature, the morphology of individual nanoparticles provides the desired anti-reflective characteristics. Other known anti-reflective films derive their anti-reflective properties from the arrangement or configuration of a plurality of particles. For example, they may have a heterogeneous arrangement of particles, a heterogeneous number of particle layers across the substrate surface, and/or a heterogeneous concentration of particles throughout the film.

III. APPLICATIONS

The present system can be used to fabricate high-performance, anti-reflective films, such as "moth-eye" anti-reflective films, that are useful for a variety of applications, including anti-reflective coated lenses, fuel cell membranes, chemical/biological sensor sorbents, wearable electronics, and photonic, thermoelectric, photovoltaic and biomedical films, among others. For example, the films may be used to coat flat panel displays and solar cells.

Reflection occurs when there is a sudden change in the index of refraction of the material that light is traveling through. In the case of air the index is 1.0, while most glass is about 1.47. When light traveling through the air contacts the glass, the sudden change in refractive index causes reflection to occur. This happens again when the light leaves the glass and returns to the air. The surfaces of the materials the light travels through are known as interfaces, so that reflection occurs at each interface light passes through. The amount of light reflected from untreated glass is roughly 4% at each interface. Thus, when light passes through a pane of glass, about 8% of the light is reflected and 92% passes through the glass pane.

In optical devices involving multi-component optical trains or high wattage applications, anti-reflective coatings significantly enhance performance. Consider an optical device with four optical components each having two air-quartz interfaces. Optical interfaces reflect light according to Maxwellian physics:

$$R=[(n_1-n_2)/(n_1+n_2)]^2$$

where R is the Fresnel reflection coefficient and $n_1$ and $n_2$ are the indices of refraction of the respective media. Accordingly, each air-quartz interface would be expected to have approximately 4% reflection. Over four components, almost 30% of the source light is lost due to internal reflection, which can have adverse effects on device performance, e.g., poor contrast.

One way to reduce reflection is to insert a material between the two original materials, where the inserted material has an index between the two starting media. As an example, the reflection between ZnO (n=2.04 at 550 nm) and air (n=1.0 at 550 nm) alone is about 11.7%. This reflection can be reduced by inserting a material film between the two original materials that has an index between the two starting media. For instance, placing silica ($SiO_2$; n=1.46) between the air and ZnO reduces the overall reflection to about 7.5%. Reflection can further be reduced by taking advantage of destructive interference if the thickness of the film is made to be quarter wavelength (QW) and the index is optimized to be: $n_i=\sqrt{n_1 \cdot n_2}$. Based on this formula, glass/air interfaces (R≈4%) would need indices as low as 1.2 which are difficult to find. Typically $MgF_2$ films are used with an index of about 1.35, yielding QW air/glass reflectivities around 2% at normal incidence. The quarter-wavelength (QW) effect can be amplified by depositing multiple QW films. Reflectivities as low as 0.5% for air/glass are routinely reported by multi-layer anti-reflective coating (ARC) vendors. However, QW films should be precise to produce the desired advantages, and typically are fabricated using physical vapor deposition under high vacuum conditions.

For high wattage applications such as photovoltaics, problems with conventional ARCs include thermal expansion mismatch, thin film processing costs and the inability to coat large, highly contoured or textured surfaces. Processing costs have begun to be addressed by wet deposition methods, which are not as precise and therefore do not perform as well (>1.0%), but are significantly less expensive. Other issues include the using harsh chemical solvents that pose environmental hazards and damage to sensitive optical components. More recently, polymer coatings have been demonstrated with optimized refractive indices using either subwavelength bubbles or nanoparticles. Reflectivities below 0.5% have been reported for these films at certain wavelengths. However, these films provide variable performance across a wide spectrum of wavelengths and are sensitive to incidence angles making them not ideally suited to a "broadband" application such as photovoltaics requiring anti-reflection across a broad spectrum at oblique incidence. Also, these polymer films are not mechanically tenacious particularly for glass surfaces.

Figure 13:
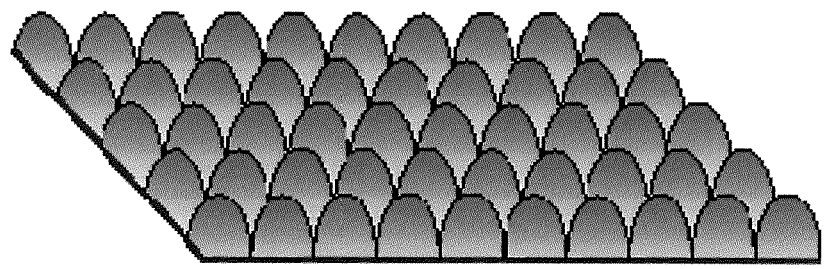
FIG. 13 is a schematic drawing illustrating an array of tapered, subwavelength protuberances.

Alternatively, if an interface between two media (e.g., air/glass) is made gradual, such as a continuous gradient index of refraction over some finite thickness, such as on the order of a few hundred nanometers, the interface can be made to reflect even less light than QW films. These gradient surfaces can be thought to have a low net reflectance based on the destructive interference of an infinite series of reflections at each incremental change in refractive index. One means for producing this gradient is an array of tapered, subwavelength protuberances as shown in FIG. 13. This structure was first reported based on the electron microscopy of the corneas of nocturnal moths by Bernhard (*Endeavour*, 26:79, 1967) who hypothesized that the resultant index gradients were responsible for the reduced eye reflection at night which the moths needed for camouflage. The gradient surfaces are thought to have a low net reflectance based on the destructive interference of an infinite series of reflections at each incremental change in refractive index. Subsequently, the term "moth-eye" anti-reflective surface (ARS) has been adopted as describing a tapered array of subwavelength proturbances.

More recently, researchers have found that the structures do not need to be periodic, only that the features on the whole are smaller than the wavelengths of visible light. (Bökenkamp et al., *Anal. Chem.*, 70:232-236, 1998.) Visible light typically is considered to encompass wavelengths from about 400 nm to about 700 nm. Thus, if the surface structures are smaller than 400 nm, reflection of all visible light is reduced.

Figure 14:
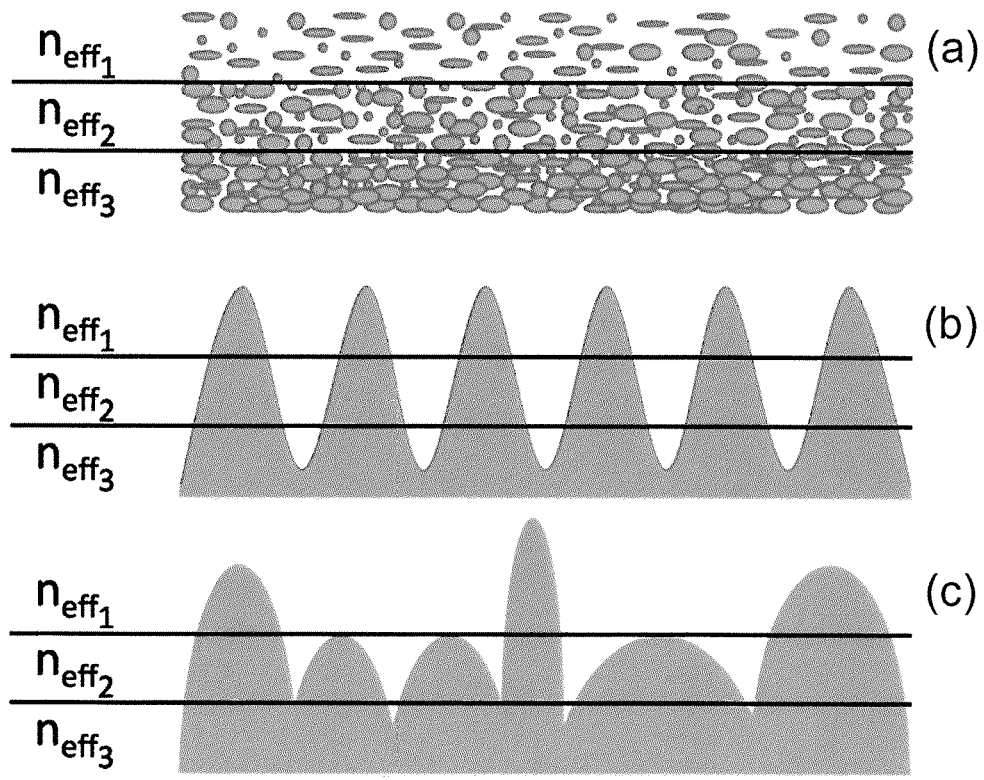
FIG. 14 is a schematic drawing illustrating three configurations of nanostructured anti-reflective surfaces.

A number of configurations can produce a subwavelength, nanostructured, anti-reflective surface with a gradient index of refraction. FIG. 14 illustrates three types of nanostructured anti-reflective surfaces: a) a porous coating, b) a period tapered coating, and c) a stochastic tapered coating. Effective refractive indices ($n_{eff}$) are formed based on the volume fraction of the subwavelength nanostructured materials and air.

Currently, the most commonly used manufacturing practice for single crystal silicon (sc-Si) is an anisotropic etch to create a textured surface and reduce reflection. This does not work well on multi-crystal silicon (mc-Si), however, because the grains have random orientation. For both materials a common practice is to use a single layer of quarter-wave ARC material to reduce reflection. This practice is effective only for a small wavelength range on either side of the targeted wavelength, thus limiting the cell's ultimate efficiency. For high performance cells such as those using multi-junction structures, broad-spectrum conversion materials, or down-conversion/up-conversion technology, simple quarter-wave ARCs will severely limit cell performance. Double layer quarter-wave films expand the wavelength range absorbed. However, to date, single and dual layer silicon nitride film ARCs still have weighted reflectance of ~8% (Jayakrishnan et al., *BP Solar*, 2005, 29-30). Strategies to decrease reflectance by improving the silicon nitride layers face disadvantages in manufacturing line throughput. Improved anti-reflection (<1% reflection per glass-air interface) is possible in QW ARCs consisting of up to seven layers. However, vapor deposition methods are used to meet thickness tolerances in QW films.

The common issues with these and other current ARC technologies are several. Manufacturing costs of these approaches are high due to expensive materials, poor material utilization, complex and expensive manufacturing equipment due to vacuum and thermal requirements, inherently high energy consumption, and inherently high environmental abatement costs due to the nature of materials, material waste and chamber cleaning requirements. In addition, these technologies typically require thick and/or multiple layers of material to reduce transmittance and, as a last process step, the thermal deposition technology is frequently incompatible with desirable cell structures and materials.

Moth-eye structures have some advantages. The behavior of the surface is tied both to the surface geometry and the material properties of the surface. As long as a method can be found to produce the desired geometry on a surface, the technique can be applied to all materials. Moth-eye structures are suitable across a wide spectrum of wavelengths and incidence angles with a greater tolerance to the angle of incidence than quarter-wavelength structures.

Microreactor-assisted nanoparticle deposition (MAND™) is capable of producing high-performance anti-reflective films with moth-eye type structures. MAND™ involves mixing very small amounts of reactant solutions under controlled temperature conditions and then depositing the mixed solution onto a substrate. As the solutions are mixed and deposited, nanoparticles form and produce a film on the substrate.

In some embodiments, a microreactor-assisted, continuous-flow system is used to produce the anti-reflective film. The system allows precise control of chemical and physical reactions. As reagents pass through the continuous-flow reactor, reactive species are generated using activation schemes. For example, reactive species may be generated by addition of energy to the system, including thermal, chemical, microwave, photochemical, electrochemical and plasma activation. Reactive species are mixed in the reactor and deposited onto a substrate surface, where they adsorb to the surface, diffuse across the surface, and react with one another, promoting nucleation and growth of a nanostructured thin film.

The concentration and temperature of the reagents within the reactor and the residence time of the mixed reagents within the reactor are controlled to either allow or minimize formation of nanoparticles within the continuous-flow reactor. For example, $SiO_2$ nanoparticles were synthesized by controlling reactive species and residence time. Two stock solutions (tetraethylorthosilicate (TEOS) in ethanol and deionized water/ammonium hydroxide in ethanol) were prepared. The solutions were mixed in the microreactor-assisted, continuous-flow system and deposited onto chemically activated substrates (e.g., glass, polycarbonate eyeglass lenses) on a rotating substrate holder (see, e.g., FIG. 8). Nanoparticles ranging in size from tens to several hundred nanometers were produced by varying the reagent concentrations and residence times.

In some embodiments, substrate surface activation also is performed by addition of energy to the substrate. For example, a substrate may be heated to a particular temperature to promote desired heterogeneous growth and/or morphology of nanoparticles. In some working embodiments, the morphology and optical characteristics of ZnO films were varied by changing the substrate surface temperature.

In contrast to commercial multilayered anti-reflective films formed from layers having different chemical compositions, embodiments of the disclosed anti-reflective films have a substantially homogeneous chemical composition (e.g., ZnO, $SiO_2$) throughout a cross-section of the film. However, while the chemical composition is substantially homogeneous, the film typically has heterogeneous physical attributes. For example, the disclosed anti-reflective films typically include nanoparticles or nanoparticle clusters of different sizes or different morphologies. Additionally, the particle density (i.e., the number of particles per unit volume of the film) of the nanoparticles or nanoparticle clusters may vary within the film.

In particular embodiments, the nanoparticle structures are, on average, smaller than 400 nm and are capable of reducing reflectivity of visible light and longer wavelengths such as infrared light. In some embodiments, the structures form a size gradient throughout the thickness of the anti-reflective film, with larger nanoparticles deposited in the lower portion of the film and smaller particles deposited in the upper portion of the film. Without being bound to any particular theory of operation, such a size gradient may form as a result of increased time for particle growth in portions of the film deposited earlier in the deposition process as compared to portions of the film deposited later in the process.

Desirable properties for such anti-reflective films include low reflectivity (0.1%), anti-abrasion, thermal compatibility, and good adhesion. Other advantages of MAND™ compared to batch synthesis include uniform heating and mixing, shorter cycle times, improved size distribution control, production of substantially agglomerate-free films, reduced use and cost of reactants, including lower solvent usage, higher conversion of reactants, purer products, and/or the possibility of synthesizing nanomaterials in the required volumes at the point of application, which minimizes the need to store and transport potentially hazardous materials while providing opportunities for tailoring novel, functionally-gradient structures.

Nanostructured anti-reflective coatings produced by MAND™ techniques have several advantages compared to current ARC technologies, including wide wavelength range performance, low transmission losses, low-cost manufacturing, low material consumption, low-temperature and non-vacuum technology, environmentally benign materials, ability to recover and re-use the carrier solvent, low-cost capital equipment, and/or compatibility with advanced materials (e.g., polymeric substrates) because the deposition process is low temperature and can be performed without post-deposition annealing.

In some embodiments, nanoparticles can be functionalized as they flow through the microreactor, facilitating functionalized nanoparticle deposition and preventing or minimizing nanoparticle agglomeration. Using MAND™, colloidal streams of functionalized particles can be deposited directly onto moving or stationary substrates, yielding dense functional films with strong adhesion and no post processing. Certain embodiments of the disclosed anti-reflective coatings demonstrate superior mechanical strength—as determined by scratch resistance—than existing state-of-the-art, vapor-deposited, multilayered QW anti-reflective coatings used within the eyeglass industry (e.g., Avance™).

A. ZnO Anti-Reflective Coatings

The film's morphology can be varied by varying the conditions under which the film is formed and deposited. For example, the morphology of ZnO films depends, at least in part, upon the pH of the reactants and the temperature. ZnO films are prepared by mixing a zinc acetate solution with a sodium hydroxide solution, and depositing the mixture onto a heated substrate. The substrate typically is heated to about 70-80° C. By varying the concentration of NaOH, two different flower-like structures can be formed. A series of ZnO films were produced using the continuous flow microreactor. In each case, 0.05 M zinc acetate dihydrate and 0.25 M ammonium acetate were mixed with different concentrations of NaOH. The solutions were deposited on a silicon substrate.

Figure 15:
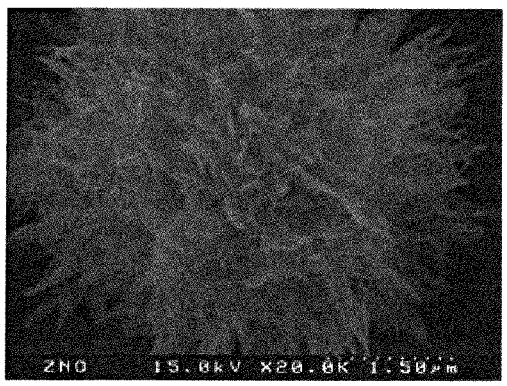
FIG. 15 is an SEM micrograph of a ZnO structure generated with 0.005 M NaOH.
Figure 16:
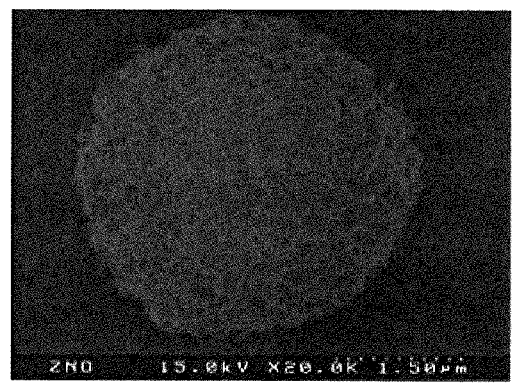
FIG. 16 is an SEM micrograph of a ZnO structure generated with 0.01 M NaOH.
Figure 17:
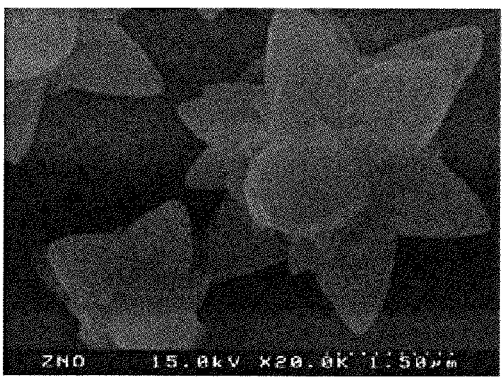
FIG. 17 is an SEM micrograph of a ZnO structure generated with 0.1 M NaOH.
Figure 18:
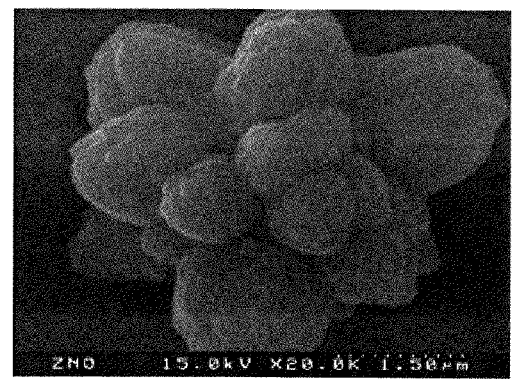
FIG. 18 is an SEM micrograph of a ZnO structure generated with 0.15 M NaOH.

FIGS. 15-18 illustrate the different morphologies of ZnO films that have resulted by varying concentrations of NaOH in working embodiments. The films were formed in the presence of 0.005 M NaOH, 0.01 M NaOH, 0.1 M NaOH, and 0.15 M NaOH, respectively. A flower-like ZnO morphology with broad "petals" was formed preferentially at higher concentrations of NaOH, i.e., greater than 0.05 M. This morphology is also termed "white" ZnO because the films appear white when deposited on an opaque substrate. As the NaOH concentration decreases, the petals become narrower in width, smaller in size, sharper at the tip, and simpler in shape. At lower concentrations of NaOH, a chrysanthemum-like structure formed with many narrow, small petals that had sharp tips and were simpler in shape than the structures formed at high concentrations of NaOH. This morphology is termed "black" ZnO because the films appear black when deposited on an opaque substrate. At 0.005 M NaOH, the petals are narrow and nano-sized, as shown in FIG. 15. At intermediate concentrations of NaOH (e.g. at about 0.05 M), a mixture of the two structures forms. Both black and white ZnO films are substantially transparent when coated onto transparent substrates such as clear glass.

Temperature also affects whether the white or black morphology is produced. At temperatures below 70° C., only white ZnO forms irrespective of the NaOH concentration. At temperatures above 70° C., black ZnO begins to form and predominates at higher temperatures. A mixed state including both white ZnO and black ZnO may occur when the temperature is about 70° C. or if the temperature fluctuates during film deposition.

Suitable substrates for ZnO film deposition include metals and alloys, including aluminum and copper, silica-based materials, such as glass, silicon wafers, and polymeric materials, including polycarbonate, among others. Many other materials are suitable for use as anti-reflective coatings, including but not limited to $TiO_2$, $CeO_2$, $MgX_2$ where X is a halogen such as fluoride, $SiO_2$, and ZnS. For example, $SiO_2$ can be deposited as an anti-reflective coating on polycarbonate eyeglass lenses.

B. Anti-Reflective Coatings for Lenses

The amount of light reflected from untreated glass is roughly 4% at each interface. Thus, a typical glass lens reflects about 8% of the total light. There are several ways that this reflection can be reduced, including quarter-wavelength films, multi-layer films, and sub-wavelength gradients.

Quarter-wavelength films are uniform films with a thickness that is one-quarter of an incident wavelength. For example, to reduce reflection of light having a wavelength of 600 nm, a 150-nm coating will be applied. Typically, quarter-wavelength films are made of magnesium fluoride, a material with an index of reflection between those of glass and air to attempt to reduce reflection further by easing the transition from air to glass. This technique has some disadvantages, however, including using very stringent environmental controls during film application. It is also a narrow band anti-reflective treatment due to the single layer. Anti-reflective films of the present disclosure employ sub-wavelength gradients and can reduce the amount of total reflected light from 8% to well under 0.5%.

Multi-layer films are similar to quarter-wavelength films in that sub-wavelength films are applied. In this case, however, the goal is to create a gradient in the index of refraction by applying multiple film layers of varying composition. For example, with three layers, materials with index values of 1.10, 1.20 and 1.30 may be used. The resulting gradient makes the transition from air to glass less abrupt than a single layer and reduces reflection. However, with the addition of multiple new interfaces, reflection will occur at each interface. While the overall reflection is reduced over a moderate breadth of wavelengths, there are diminishing returns as each additional layer creates its own reflections.

The gradients that can be partially created through varying materials used in multi-layer film are achieved more fully using sub-wavelength gradients. This method is accomplished in different ways depending on the substrate. For example, with a polymeric substrate, it is possible to press a sub-wavelength pattern into the material while it is malleable, imprinting the pattern into the surface. When treating glass, plasma etching is commonly used. This is a very slow, precise, and expensive process. The goal is to create cone or pyramid shaped structures, having a diameter less than the wavelength of the incident light, on the surface of the glass. When done correctly this creates a near perfect gradient in the index of refraction between the air and glass or polymer.

Certain embodiments of the present disclosure are suitable for creating sub-wavelength gradients through nanoparticle deposition, thus producing an anti-reflective coating suitable for eyeglass lenses. Creating and preparing nanoparticles of varying sizes and shapes allows for precise control of the coating composition and/or morphology. In some embodiments, the particles are applied more densely at the beginning. In other embodiments, the particles formed at the beginning of the deposition process are larger than particles formed later in the process. By varying the size, shape, and density of the particles as they are applied, it is possible to create structures similar to those with plasma etching.

To provide a uniform coating, the glass being treated typically is spun as particles are applied. In the case of smaller pieces of glass, such as eyeglass lenses, the glass is spun at about 1000-2000 rotations per minute (rpm). The glass is heated to between 100° C. and 300° C. to adhere the nanoparticle film to the glass substrate by creating a chemical bond between the nanoparticles and glass surface.

All incident light with a longer wavelength than the size of the structures will pass through the applied film. If the structures are 400 nm or smaller, reflection of all visible light and longer wavelength light will be reduced.

Some materials, e.g., cerium oxide, present some UV absorption properties as well and will reduce the amount of UV light passing through the glass lens. $CeO_2$ films can be prepared, for example, by reacting $Ce(NO_3)_2$ and $NH_4OH$ solutions, as described in U.S. Publication No. 2008/0108122, which is incorporated herein by reference. An additional advantage to $CeO_2$ films is that they can be deposited at ambient temperature onto the desired substrate.

The anti-reflective coating typically comprises nanoparticles having an average diameter small than at least some wavelengths of incident light. In certain embodiments, nanoparticle composition and size are selected to provide a sub-wavelength gradient. The nanoparticle composition is selected based at least in part upon the substrate material. It generally is desirable to select a nanoparticle composition having an index of reflection between those of the substrate and air.

Suitable anti-reflective coatings for polycarbonate lenses include $SiO_2$, ZnO, $CeO_2$, $MgF_2$, and ZnS, among others, and combinations thereof. For example, $SiO_2$ films can be deposited onto polycarbonate lenses from an aqueous solution of dispersed $SiO_2$ nanoparticles or via hydrolysis of $Si(OC_2H_5)_4$ (tetraethyl orthosilicate, TEOS) or $SiCl_4$. The disclosed anti-reflective coatings also are suitable for coating lenses made of glass (including borosilicate crown glasses and fluorite crown glasses), CR-39 (allyl diglycol carbonate), TRIVEX® plastic, and polyurethane. Embodiments of the disclosed anti-reflective coatings are suitable for coating flat or curved lenses, as well as lenses having a smooth or textured surface.

It may be advantageous to include an anti-scratch coating on lenses, particularly polycarbonate lenses. For example, commercial polycarbonate lenses often include a hard coat to increase durability. Thus, in some embodiments, a glass or polycarbonate substrate is coated with an anti-reflective coating and one or more hard coat layers. For example, an anti-reflective coating may be applied to the lens followed by a hard coat layer. Alternatively, a 3-layer sandwich construct may be utilized in which a first hard coat layer followed by an anti-reflective coating layer, and a second hard coat layer are applied to the lens.

In certain embodiments, a hard coat layer comprises an organic-inorganic hybrid polymer, such as a metal (or metalloid) alkoxide polymer (e.g., $RSiO_x$ where R is an organic functional group) or a derivative thereof. In some embodiments, the organic-inorganic polymer may be tetraethyl orthosilicate, tetramethyl orthosilicate, polysiloxane, or a combination thereof. In particular embodiments, a hard coat was prepared using a solution of 1-5% Rhino-Q (Quest Optical, Boca Raton, Fla.) diluted in methanol.

In some embodiments, application of a first hard coat layer to the substrate may increase adhesion of the anti-reflective coating to the substrate surface. Increasing the adhesive bond between the anti-reflective coating and the substrate improves the coating's mechanical properties, e.g., durability. In certain embodiments, the first hard coat layer is continuous or substantially continuous across the substrate surface.

The anti-reflective coating comprises nanoparticles having a composition and size selected to provide the desired anti-reflective properties. The composition and size are selected at least in part based upon the substrate composition. The anti-reflective coating has a thickness corresponding to one or more layers of nanoparticles, such as 1-15 layers, 1-10 layers, 1-5 layers, 1-3 layers, or 1-2 layers. For example, the anti-reflective coating may comprise a monolayer of nanoparticles, 2-3 layers of nanoparticles, or 5-10 layers. In some embodiments comprising 3 or more layers of nanoparticles, the inner layers (i.e., layers other than the top-most or bottom-most nanoparticle layers) consist essentially of nanoparticles. For example, if silica nanoparticles are used, the inner layers consist essentially of silica nanoparticles, and do not comprise significant amounts of other materials such as fillers or binders. The inner layers may comprise less than 5%, less than 2%, less than 1%, or less than 0.5% fillers or binders.

In some embodiments, the anti-reflective coating layer comprises silica nanoparticles. Silica nanoparticles are well-suited for coating polycarbonate lenses. In some embodiments, the silica NPs have an average diameter of 10-50 nm, such as 20-40 nm, 25-35 nm, or about 30 nm. In some embodiments, the anti-reflective coating layer is continuous or substantially continuous. In certain embodiments, the anti-reflective coating layer has a uniform particle density and is substantially non-porous.

Desirably, the outer hard coat layer is thinner than the anti-reflective coating layer since a thicker outermost layer will dominate the overall reflective effects. For example, the hard coat layer may have a thickness that is less than 30% of the average nanoparticle diameter. In some embodiments, the hard coat thickness is less than 35%, less than 25%, less than 20%, less than 15%, less than 10%, less than 5%, 5-30%, 5-20%, or 5-10% as thick as the average nanoparticle diameter. In certain embodiments, the nanoparticles have an average diameter of 25-35 nm, and the hard coat has a thickness of 2-10 nm, such as 5-10 nm. In some embodiments, the outer hard coat layer consists essentially of the organic-inorganic polymer. In some embodiments, the outer hard coat layer is continuous or substantially continuous.

The thickness of the nanostructured ARCs can be tailored by adjusting silica nanoparticle size, the concentration of the organic-inorganic polymer, the ratio of silica NPs to the organic-inorganic polymer, and/or deposition conditions. In some embodiments, a 3-layer anti-reflective film (polymer-nanoparticle-polymer) has an overall thickness of 40-300 nm, such as 50-250 nm, 50-200 nm, 50-150 nm, 50-100 nm, or 60-75 nm.

In some embodiments, the hard coat layer is sufficiently thin that the root mean square surface roughness of the nanoparticle anti-reflective layer, as measured by atomic force microscopy, is reduced by less than 30%, less than 25%, less than 20%, less than 15%, or less than 10%. In a working embodiment (see Example 10), the root mean square surface roughness of the nanoparticle layer was reduced by 16% after the hard coat layer was applied. In certain embodiments, depositing a hard coat layer onto a nanoparticle layer increases the film's reflectance by less than 30%, less than 25%, less than 20%, less than 15%, or less than 10% compared to the reflectance before the hard coat layer was deposited.

Key mechanical properties affecting the scratch resistance of the polymer-silica nanoparticle-polymer ARCs were identified as the substrate hardness, the film's elastic modulus, and the adhesive bond strength between the film and the substrate. Without being bound by any particular theory, it is believed that the increased hardness of the substrate concentrates additional energy within the film leading to higher shear stresses along the film/substrate interface. Increases in the elastic modulus, thickness and adhesive bond strength of the film are expected to increase the scratch resistance and mechanical properties of the film. The film modulus may be increased by creating a higher nanoparticle packing density. Thicker films can be achieved by varying deposition parameters. Adhesion can be improved through modified chemistry.

In some embodiments, a 3-layer sandwich construct including a first hard coat layer, a silica nanoparticle layer, and a second hard coat layer (a polymer-silica nanoparticle-polymer (PSP) nanoARC) has an indentation hardness of at least 400 MPa, such as 400-600 MPa, 450-575 MPa or 475-560 MPa (see, e.g., Example 13). In certain embodiments, the 3-layer sandwich construct has an elastic modulus of at least 10 GPa, such as 10-14 GPa, 11-13 GPa or 11.4-12.8 GPa (see, e.g., Example 13). In certain embodiments, the product can withstand a scratch load force of at least 400 mN, at least 425 mN, at least 450 mN, or at least 475 mN without delamination of the coating from the substrate.

Currently when a consumer purchases eyeglasses with an anti-reflective coating, the optical retailer must order AR-coated lenses from the manufacturer's labs and/or independent labs, or send the uncoated lenses to a central lab, which requires anywhere from a few days to a week to get the lenses back to the retailers. The eyeglass retailers order uncut coated lenses from manufacturers and use an edging machine to cut the lenses into the shape that fits the selected eyeglass frames. The disclosed technology, however, offers significant advantages. The coating machines utilizing the disclosed microreactors are small and can be placed in the retailer's lab next to the edging machine without interrupting work flow since the size of the coating machine is about the size of the edging machines. Thus, the retailer can apply an anti-reflective coating to lens in-house before the edging process, eliminating any need to send the lens out for coating, and thereby eliminating the associated delay and costs involved. Additionally, the consumer receives the eyeglasses sooner because they are prepared on site.

C. High-Temperature Solar Catalytic Microreactor

Among various renewable energy sources, the conversion of sunlight directly into electricity and fuels is a very promising alternative energy source. A catalytic microreactor can be utilized for solar thermal fuels production where solar energy is used to provide heat for catalytic reactions that produce fuels. In certain embodiments, an anti-reflective film is applied to a solar catalytic microreactor to minimize reflectance of solar radiation.

Figure 19:
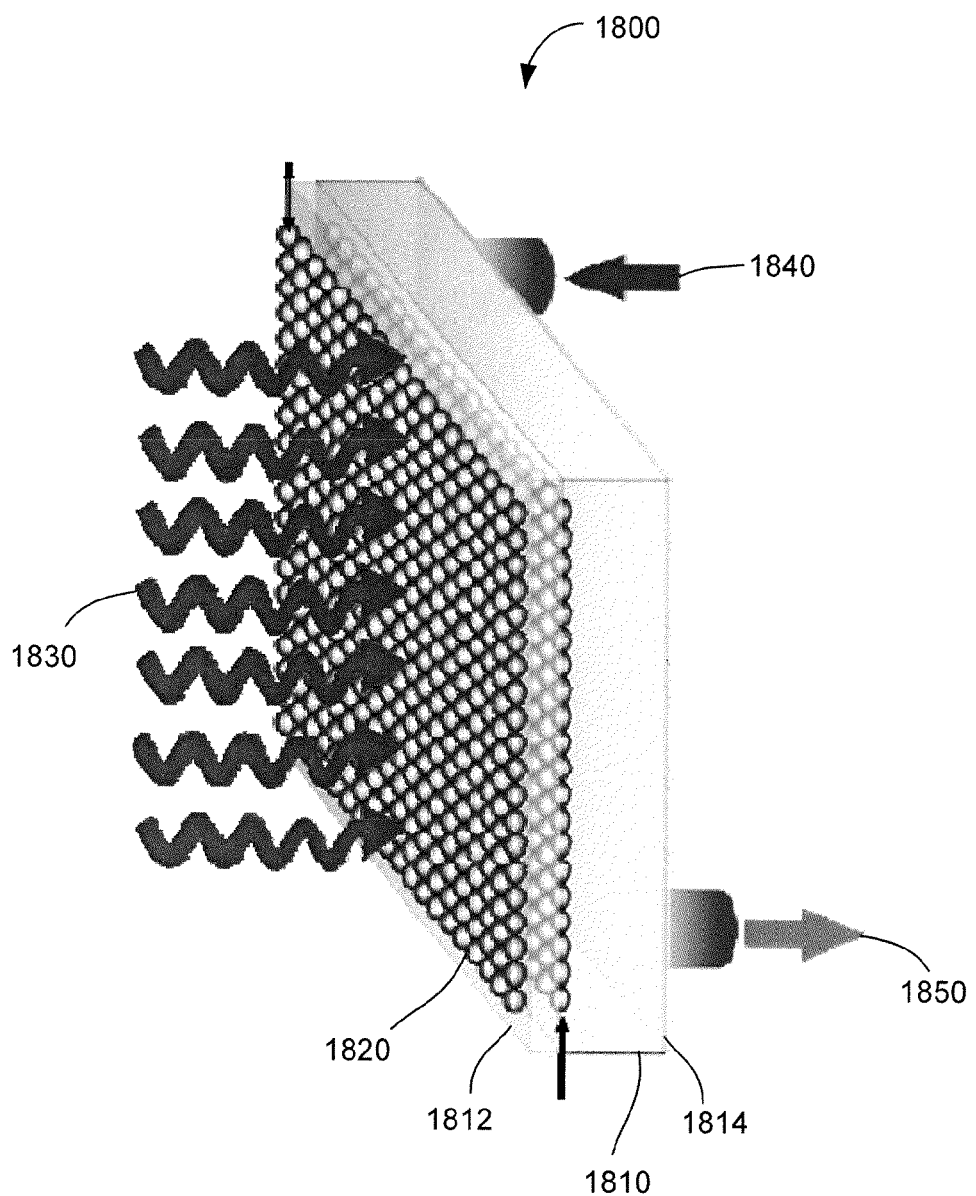
FIG. 19 is a schematic diagram of one embodiment of a solar catalytic microreactor.

FIG. 19 is a schematic diagram of one embodiment of a solar microchannel reactor 1800. The reactor 1800 includes a substrate 1810 having a first major planar surface 1812 and a second major planar surface 1814. The first major planar surface 1812 is coated with a nanostructured absorber layer 1820. The absorber layer 1820 is an anti-reflective film applied to the substrate 1810 to minimize reflectance of solar radiation 1830. The absorber layer 1820 contains nanoparticles that are sub-wavelength in size. In some embodiments, the nanoparticles are smaller than about 400 nm. Solar radiation 1830 is captured to provide energy for endothermic catalytic reactions. A microchannel reactor coated with nanostructured catalysts (not shown) is disposed on the second major planar surface 1814.

A feedstock 1840 is provided to the microchannel reactor. Absorbed solar radiation 1830 provides energy to convert the feedstock 1840 to fuel 1850. For example, propane may be converted to hydrogen through a steam-reforming reaction: $C_3H_8 + 3H_2O + \text{heat} \rightarrow 3CO + 7H_2$. In particular embodiments, a renewable biological feedstock may be used to produce clean fuels. The design of microreactor 1800 allows scalable fabrication of different size reactors as desired based upon the intended use.

Efficient conversion of solar energy to heat requires that a solar absorbing surface is in thermal contact with the fluids, and that thermal losses to the surrounding environment are minimized. In exemplary embodiments, the solar microreactor maximizes absorption of solar energy, $A_{sol}$, while minimizing radiation heat losses, $E_{therm}$. A nanostructured anti-reflective coating as shown in FIG. 12 produces a reflectivity of less than 0.5%. In some embodiments, a compositional gradient film is utilized to obtain a desired thermal expansion coefficient and extend the reactor lifetime.

D. Photovoltaic (Solar) Cells

With respect to photovoltaic (PV) cover glasses and cells, embodiments of the disclosed nanoparticle anti-reflective coatings (nanoARCs) will increase the photon density available to PV modules while reducing the deposition cost through the use of microreactor-assisted nanomaterial deposition as disclosed herein, thereby decreasing the cost per watt for PV power. Embodiments of the disclosed nanoARCs have much higher transmission at large incidence angles than bare cover glass, which for stationary modules will translate to power boosts during peak loads in the morning and late afternoon. In some solar cell configurations, nanoARCs may be applied to two or more surfaces for pre-cell photon management with significant compounding effects and energy gains of greater than 10% for stationary modules over the course of a day.

Most quarter-wavelength (QW) ARCs currently used for crystalline Si, CIS and CIGS (copper indium gallium selenide) solar cells have higher reflectance on the edge of the solar spectrum and at large angles of incidence. Spectral effects result because traditional single-layer QW ARCs are designed to destructively interfere with light waves in the middle of the spectrum. Incidence angle effects are caused by the waves experiencing a greater total phase shift in the film at high incidence angles, leading to less destructive interference at the interface. These behaviors are typical of current silicon nitride ARCs on silicon and porous silica ARCs on cover glass.

More recently, gradient-index films have shown promise to reduce the spectral and angular reflectances on solar cells and glass. For example, Kuo et al. recently created a seven-layer high performance anti-reflective coatings using oblique-angle deposition and achieved a wavelength-averaged total reflectance of 3.79% on silicon solar cells (*Optics Letters*, 33(21), 2008, 2527-2529). However, these efforts have resorted to the use of vapor deposition approaches (e.g. oblique-angle deposition by e-beam evaporation) requiring high capital equipment and long cycles.

Embodiments of the microreactor-assisted nanomaterial deposition techniques disclosed herein enable continuous, low-temperature synthesis and deposition of silica nanoparticles into high-performance, single-layer, gradient-index coatings having subwavelength features. Uniform size-controlled silica nanoparticles can be synthesized using microreactors as disclosed herein. In some embodiments, silica NPs are synthesized by a sol-gel process using ethanol, ammonium hydroxide, deionized water, and tetraethylorthosilicate. The synthesized silica NPs have a spherical shape and are amorphous in structure. Well-defined silica NPs at various sizes can be synthesized by carefully controlling the reaction conditions. For example, uniform silica NPs of different sizes can be obtained by varying the amount of $NH_4OH$ in reaction (see, e.g., Example 8). Embodiments of the disclosed microreactor systems facilitate better control over the homogenous reaction to produce precisely sized nanoparticles, easy scalability for use with large-area applications and/or low-temperature processing. Additionally, the reaction time can be significantly reduced. In some embodiments, the reaction time was reduced to 0.5 h from 3-6 h by using a continuous-flow microreactor.

Figure 20:
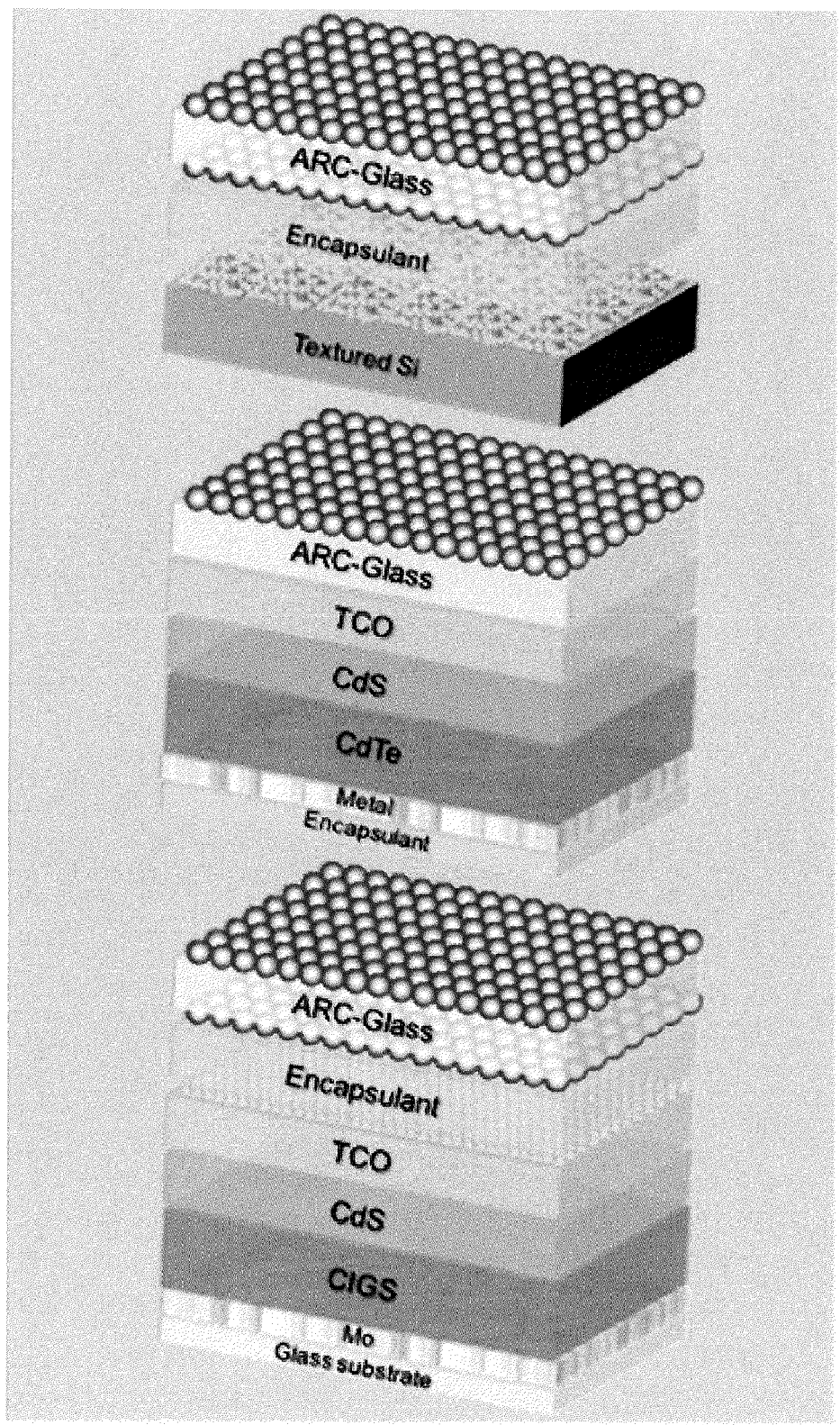
FIG. 20 is a diagram illustrating photon management schemes for Si, CdTe, and CIGS modules.

Some embodiments of the silica nanoparticle ARCs are suitable for use in a pre-cell photon management scheme for photovoltaic cells. FIG. 20 is a schematic diagram showing photon management schemes for Si, CdTe and CIGS modules (TCO=transparent conductive oxide). NanoARCs can be used on the cover glass and cell surfaces to reduce reflectance and greatly increase photon density within the cells. The cells shown in FIG. 21 are laminated modules including cover glass, encapsulation and solar cells.

Figure 21:
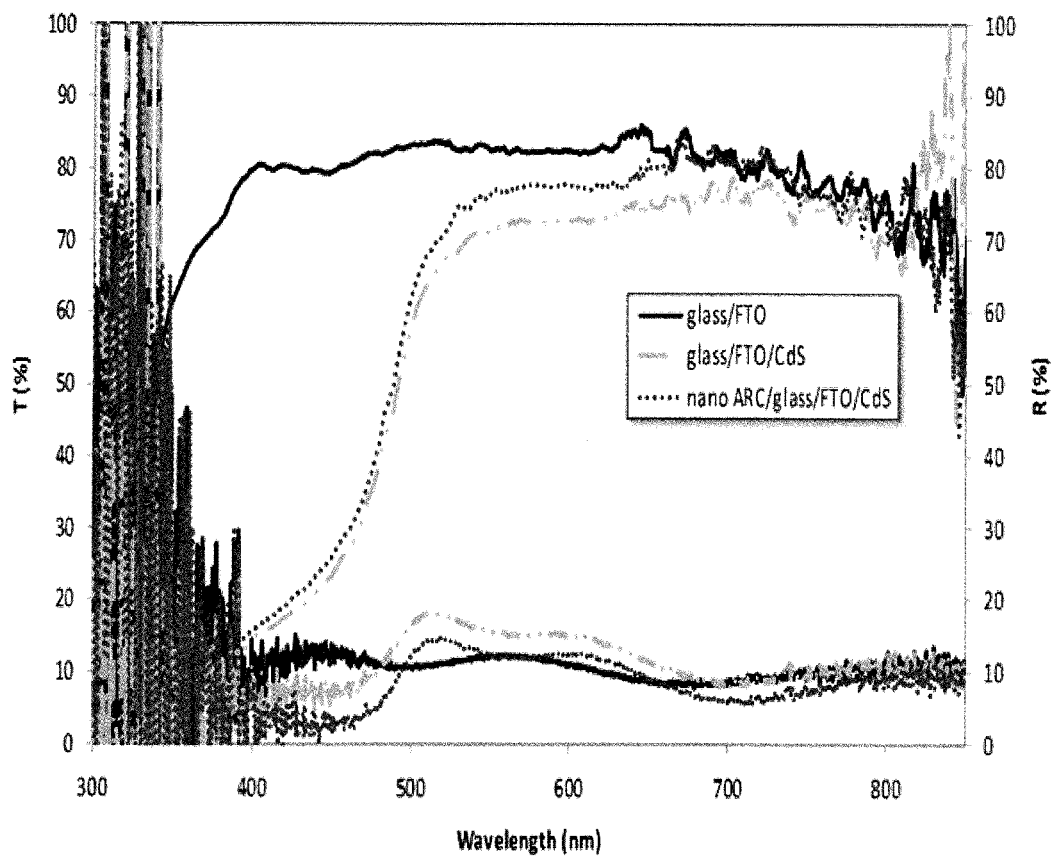
FIG. 21 is a graph of percent transmittance and percent reflectance versus wavelength for glass/fluorinated tin oxide (FTO), glass/FTO/CdS, and nanoparticle anti-reflective coating/glass/FTO/CdS constructs.

FIG. 21 is a graph of percent transmittance and percent reflectance versus wavelength for glass/fluorinated tin oxide (FTO), glass/FTO/CdS, and nanoARC/glass/FTO/CdS constructs. FIG. 21 demonstrates that application of a nanoARC to glass significantly increases transmittance and reduces reflectance compared to a module without the nanoARC coating.

In certain embodiments, bare glass covered with a silica nanoparticle anti-reflective coating transmitted at least 95% of light, such as 95-97%, over a wavelength range of 300-1100 nm, and more than 97.5% of light, such as 98-99%, over a wavelength range of 400-750 nm. In contrast, bare glass transmitted about 91% of light over a wavelength range of 300-1100 nm, and about 92.6% of light over a wavelength range of 400-750 nm. In one embodiment, cover glasses covered with silica nanoARCs transmitted 6% more light than bare flat glass. In certain embodiments, multicrystalline photovoltaic cells including cover glasses covered with silica nanoARCs produced a repeatable increase in quantum efficiency of 4.5-6.5% across a 300 nm to 1100 nm spectrum. Monocrystalline photovoltaic cells including cover glasses covered with silica nanoARCs increased output power by 3.5-5.4% compared to bare glass.

IV. EXAMPLES

Working examples are provided to illustrate particular features of the disclosed embodiments. The scope of the present invention should not be limited to the features exemplified by these working embodiments.

Example 1

Anti-Reflective ZnO Films on Aluminum and Glass Substrates

Figure 22:
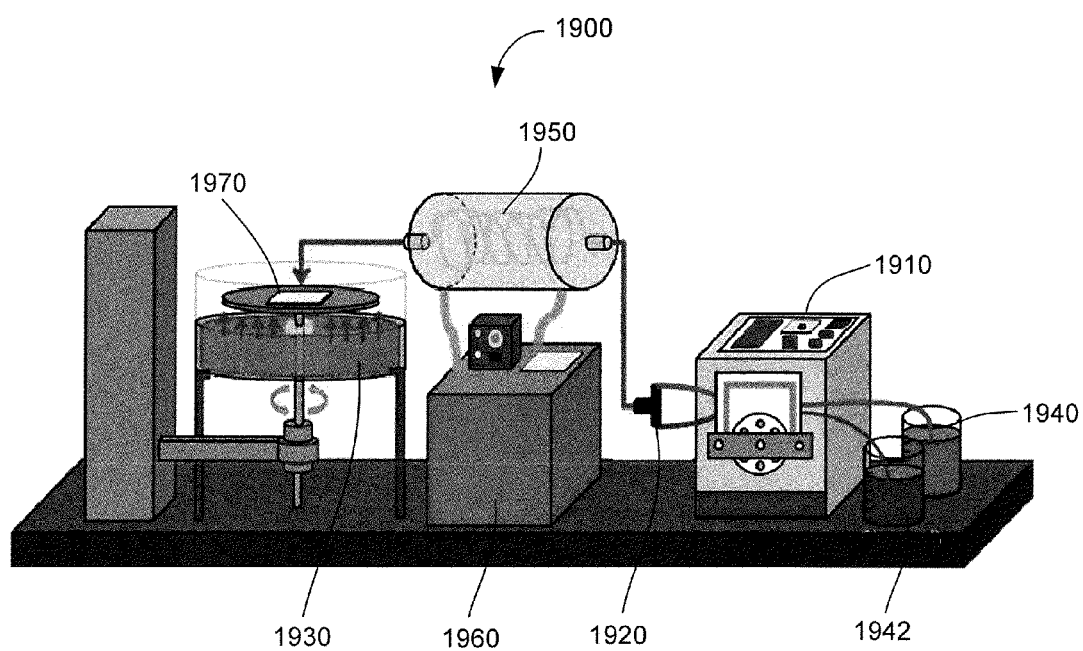
FIG. 22 is a schematic diagram of one embodiment of a continuous flow microreactor system.

Aluminum and glass substrates were cleaned according to a standard AMD (acetone, methanol, deionized water) procedure. ZnO thin films were prepared from source solutions of A, comprising 200 milliliters of 0.005 M zinc acetate, and 10 milliliters of 0.25 M ammonium acetate; and B, comprising 200 milliliters of 0.1 M sodium hydroxide. As shown in FIG. 22, the continuous deposition reactor 1900 included a microprocessor-controlled dispensing pump 1910 (IS-MATEC® pumps), a T-mixer 1920, and a substrate heater 1930. The source solutions 1940, 1942 were mixed through the T-mixer 1920 by the peristaltic pump 1910 and entered a micro-tube 1950, which was kept at about 70° C. with a water circulation system 1960. Over a period of four minutes, the solution was applied to a substrate 1970 that was maintained at about 70° C. by the heater 1930. The substrate was spun at 1500 rpm during deposition. Coatings were prepared on aluminum having a smooth, mirror-like surface and micro glass slide substrates. Following deposition, the coated substrates were rinsed with deionized water and dried at room temperature under a stream of nitrogen gas. In one embodiment, a ZnO film deposited on an aluminum substrate was annealed at 600° C. for 30 minutes. Reflectance was measured with an Ocean Optics (Dunedin, Fla.) HR2000+ high-resolution spectrometer having a DH-2000 UV-VIS-NIR light source with a halogen bulb and reflection probes with SpectraSuite software.

FIGS. 23A-25B illustrate the effect of temperature on the film morphology. The formation of flower-like structures with broad "petals" (FIGS. 23A-B) occurred in areas where the temperature was lower, i.e., below 70° C. This morphology is termed "white" ZnO because the film appears white on the opaque aluminum substrate. A chrysanthemum-like morphology with many smaller, narrower, sharper-tipped petals (FIGS. 24A-B) formed in areas where the temperature of the solution and/or substrate was higher, i.e., greater than 70° C. This morphology is termed "black" ZnO because the films appears black on the opaque aluminum substrate. FIGS. 25A-B show a mixture of white and black ZnO morphologies. Such a mixture can occur if the temperature is very near 70° C. or if the temperature varies as the film is produced.

Figure 26:
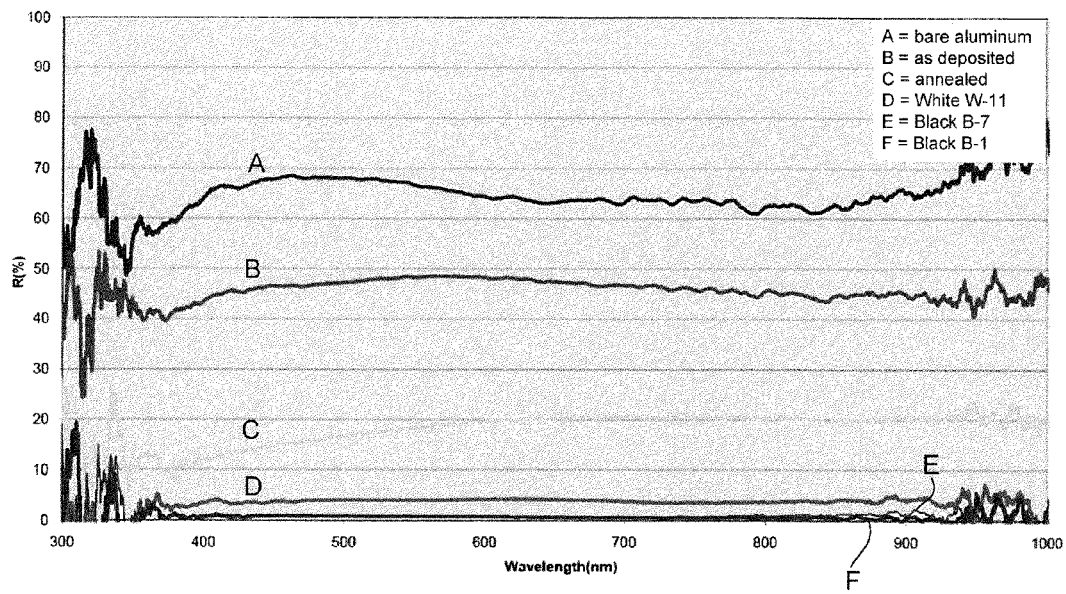
FIG. 26 is a graph of percent reflectance versus wavelength for ZnO films on aluminum.
Figure 27:
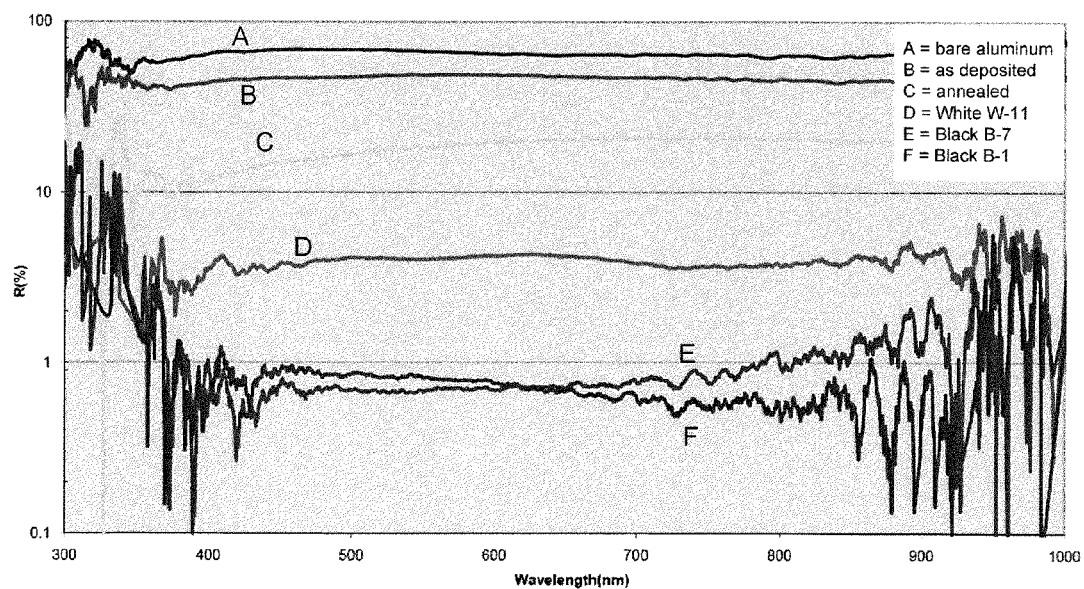
FIG. 27 is a logarithmic-scale graph of percent reflectance versus wavelength for ZnO films on aluminum.

FIGS. 26 and 27 illustrate the reflectivity of several ZnO films deposited on aluminum. Aluminum without an anti-reflective coating had a reflectivity of about 60-70% over a range of wavelengths from about 400 nm to about 900 nm. A ZnO film (A) deposited on aluminum had a reduced reflectivity of about 40-50% over the same wavelength range. In one embodiment, the ZnO film (B) was annealed at 600° C. for 30 minutes. The annealed ZnO film had a reflectivity of about 10-20%. A ZnO film (C) with a "white" morphology had a markedly reduced reflectivity of about 3-5% over a range of wavelengths from about 400 nm to about 900 nm.

Two ZnO films (D-E) with a "black" morphology had extremely low reflectivity, i.e., less than about 1%, over the same wavelength range. The improved reduction in reflectivity is attributed to the smaller particle size of black ZnO. Compared to white ZnO, black ZnO has a larger percentage of particles that are sub-wavelength in size, i.e. smaller than about 400 nm.

Figure 28:
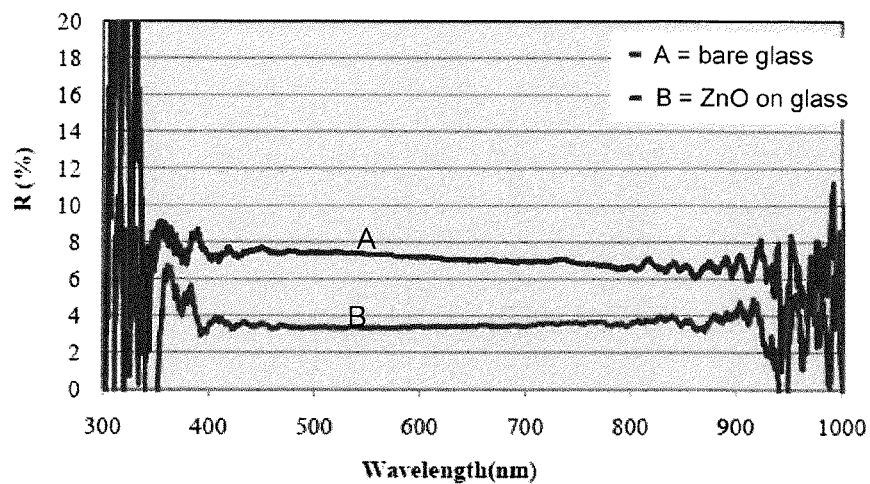
FIG. 28 is a graph of percent reflectance versus wavelength for ZnO films on glass.
Figure 29:
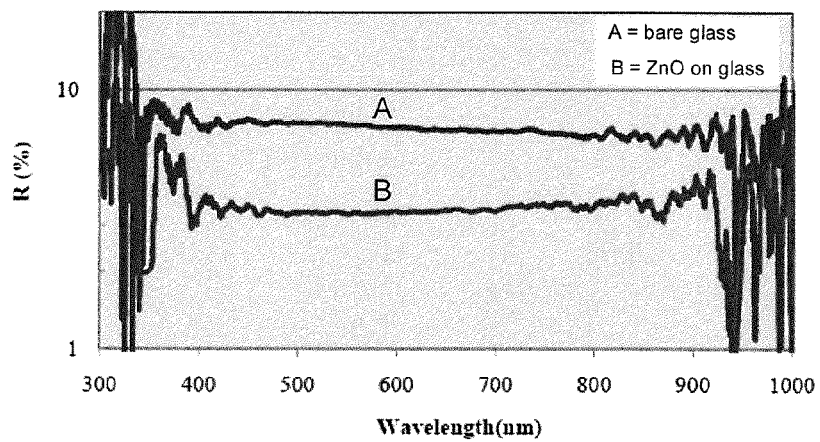
FIG. 29 is a logarithmic-scale graph of percent reflectance versus wavelength for ZnO films on glass.

FIGS. 28 and 29 illustrate the reflectivity of a ZnO film deposited on glass. Glass without an anti-reflective coating had a reflectivity of about 6-8% over a range of wavelengths from about 400 nm to about 900 nm. A ZnO film deposited on the glass had a reduced reflectivity of less than about 4% over the same wavelength range, such as a reflectivity of about 3-4%.

Figure 30:
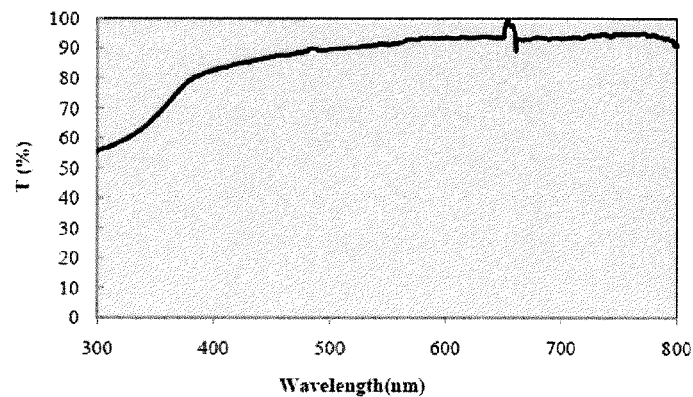
FIG. 30 is a graph of percent transmittance versus wavelength for a ZnO film on glass.
Figure 31:
FIG. 31 is a photograph of a ZnO film on a glass substrate laid on top of an image.

Despite its reduced reflectivity, the ZnO film on glass was substantially transparent with a percent transmittance of greater than about 80%, such as about 80-95%, over a broad spectrum from 400-800 nm, as shown in FIG. 30. FIG. 31 also illustrates the transparency of a ZnO film deposited onto a glass substrate. A ZnO film (indicated by the dotted line) deposited onto a glass substrate allows a clear view of an Oregon State University logo below the glass substrate.

Example 2

Anti-Reflective ZnO Films on Textured Silicon Substrates

ZnO films were also formed on textured silicon. Polished silicon wafers were etched in 2 vol. % of isopropyl alcohol (IPA) in 0.5 M sodium hydroxide (NaOH) at 80° C. for 30 minutes. During the etching process, the solution was stirred at 400 rpm to facilitate consistent etching quality over the large surface area. The textured silicon was rinsed with DI water, followed by diluted HCl, and then DI water. Finally, it was dried by a stream of dry nitrogen gas.

Two stock solutions were prepared: 200 ml aqueous solution of 5 mM zinc acetate and 10 ml aqueous solution of 0.25 M ammonium acetate were well mixed and prepared as solution I; solution II was composed of 200 ml aqueous solution of 0.1 M sodium hydroxide (NaOH). The two stock solutions containing the reactive species were pumped up by a compact REGLO peristaltic tubing pump (ISMATEC®) and mixed through a T-mixer. The mixed solution flowed through a 1-meter length of 1.22 mm ID Tygon tubing, which was maintained at a temperature of 70° C. by water circulation. The residence time of this flow was 6.2 sec. The textured silicon substrate was placed on rotating holder and was maintained at a constant temperature of 70° C. controlled by a heating coil and thermal couple. First, a seed layer of prepared Ag nanoparticles with an average diameter of approximately 20 nm was deposited onto the textured silicon surface and spun at 2400 rpm for a few seconds. Subsequently, the mixture of reactive species was impinged on the Ag seed layer on the textured silicon substrate. The rotating speed for the deposition of nanostructured ZnO on textured silicon was reduced and maintained at 300 rpm. The deposition time for highly dense and crystalline nanostructured ZnO was 5 min. The deposited ZnO film was dried on a hot plate at 100° C. for a few minutes.

Figure 32:
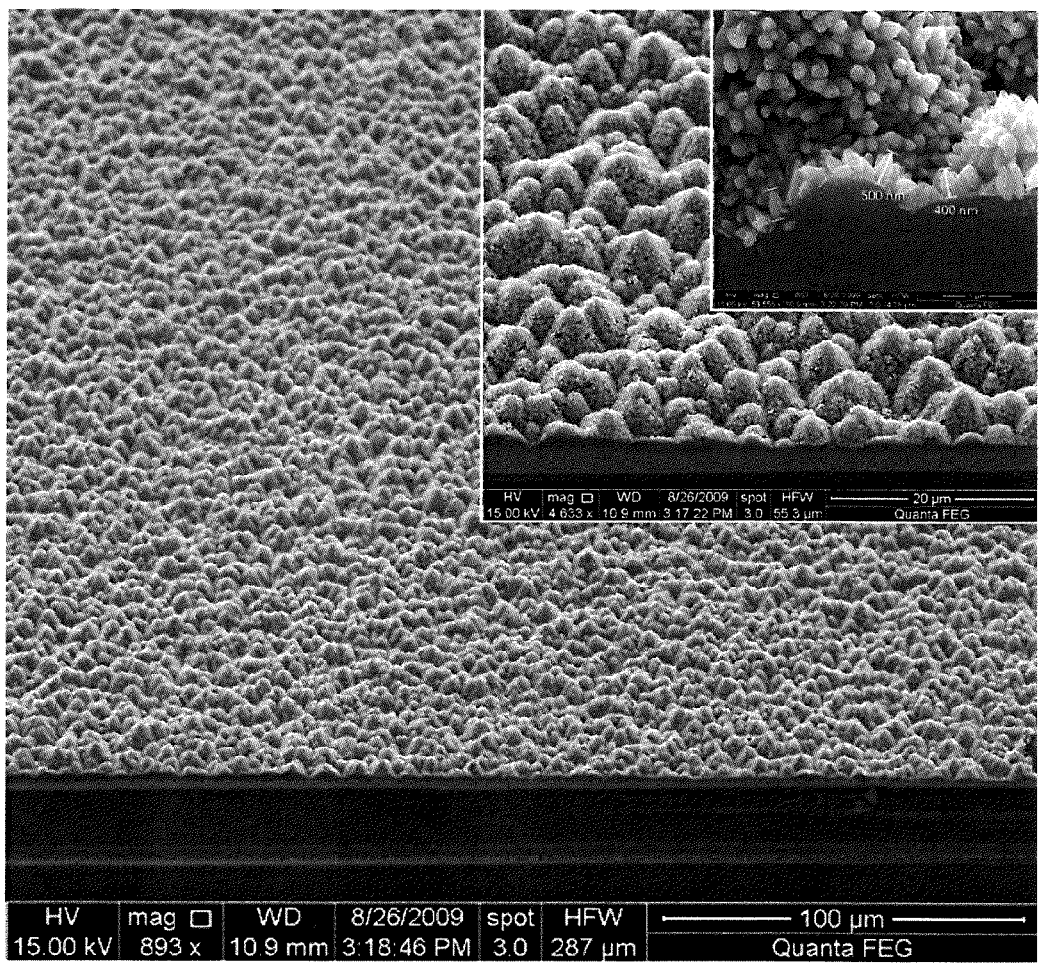
FIG. 32 is an SEM image of a ZnO film on a textured silicon substrate.
Figure 33:
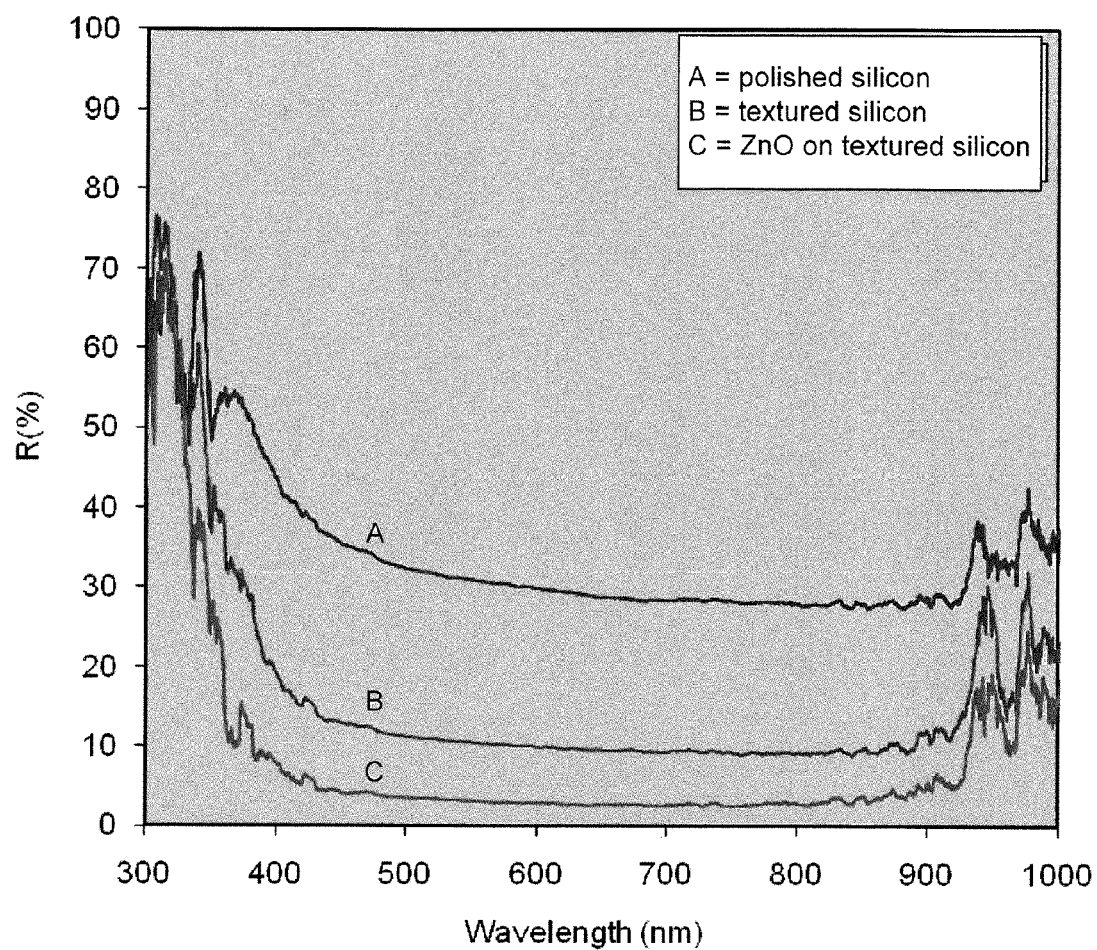
FIG. 33 is a graph of percent reflectance versus wavelength for a ZnO film on textured silicon.

FIG. 32 is an SEM image of a ZnO film on textured silicon at 893× magnification, with inset images at 4,633× and 53,555×. FIG. 33 illustrates the reflectivity of a ZnO film on textured silicon. Polished silicon has a reflectance of about 30% over the visible region. Texturing silicon, e.g., by etching, reduces reflectance to about 10%. A ZnO film deposited on the textured silicon reduces reflectance about 3-fold (i.e., to about 3%) compared to the reflectance of the textured silicon surface.

Example 3

Anti-Reflective $SiO_2$ Films on Glass and Polycarbonate Substrates

Nanostructured $SiO_2$ films were prepared and deposited onto glass substrates and polycarbonate eyeglass lenses. Before depositing the synthesized $SiO_2$ nanoparticles (NPs) onto the glass slide and polycarbonate (PC) eye glass lens substrates, each substrate was cleaned to produce the desired hydrophilic surface properties. The glass slide was treated with 1 M NaOH aqueous solution for ~5 min in an ultrasonicator and rinsed with deionized (DI) water. The glass slide then was dried by a stream of dry nitrogen gas. The PC eye glass lens was treated with 5 vol. % of 3-(aminopropyl) triethoxysilane (APTS) in isopropanol for 2 hours. It then was rinsed with isopropanol, followed by DI water. Finally, it was dried by a stream of dry nitrogen gas.

Solution I was prepared by dissolving 2.23 ml of tetraethylorthosilicate (TEOS) in 25 ml of ethanol. Solution II was prepared by mixing 1 ml of $NH_4OH$ (28.0-30.0%) and 1-10 ml of DI water into 25 ml of ethanol. Each solution was well mixed prior to use. A compact REGLO peristaltic tubing pump (ISMATEC®) was used to pump each stock solution. A 10 ft. length of PEEK tubing with I.D. 0.010" as a flexible microchannel and a T-mixer were used for this unit. Residence times in the range of 0.5 minute to 8 minutes were used to control nanoparticle formation and size within the microchannel. The synthesis of $SiO_2$ NPs was carried out at atmospheric temperature and pressure.

An anti-reflective coating of $SiO_2$ NPs was deposited onto the surface-treated substrates (the glass slide and PC eyeglass lens). During the deposition process, the substrates were spun at 2000 rpm at room temperature. The deposited films were dried at a temperature in the range of 100-135° C.

Figure 34:
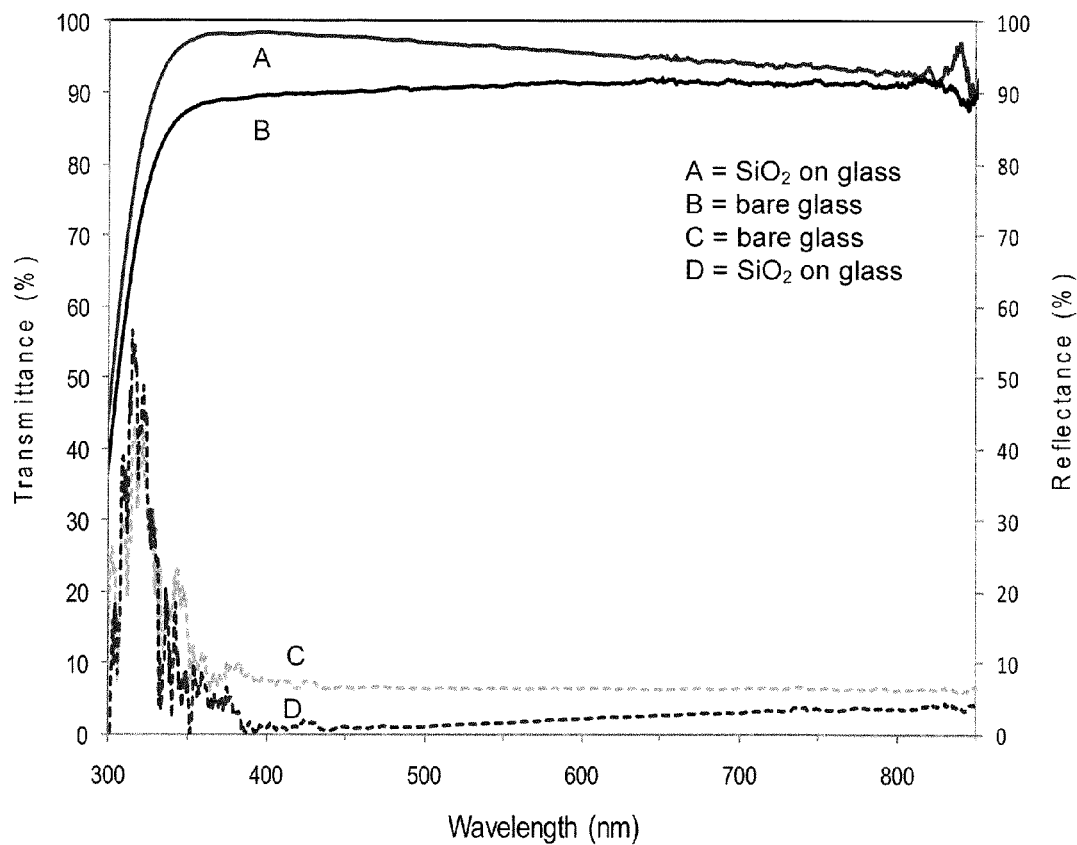
FIG. 34 is a graph of percent transmittance and percent reflectance versus wavelength for a $SiO_2$ film on a glass substrate.
Figure 35:
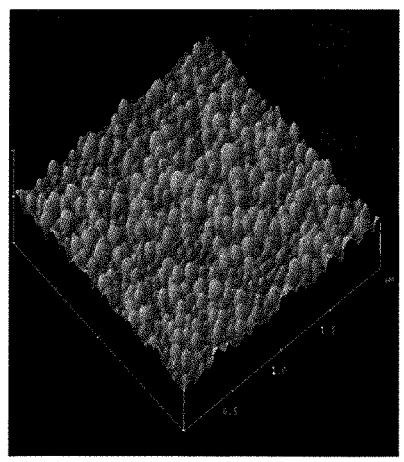
FIG. 35 is an atomic force microscopy (AFM) image of a $SiO_2$ film on a glass substrate.
Figure 36:
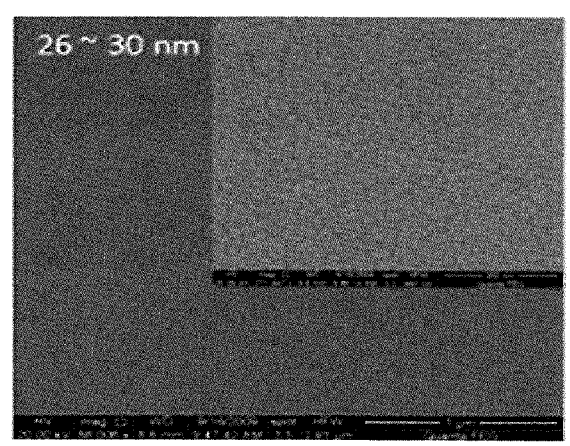
FIG. 36 is an SEM image of a $SiO_2$ film on a glass substrate.

FIG. 34 is a graph of percent transmittance versus wavelength for a glass substrate with a nanostructured $SiO_2$ film deposited on both upper and lower surfaces of the substrate (A) and a bare glass substrate (B). The glass substrate with the nanostructured $SiO_2$ film demonstrated up to 98.5% transmittance. FIG. 34 also shows percent reflectance versus wavelength for the glass substrate with the nanostructured $SiO_2$ film (D) and the bare glass substrate (C). The presence of the nanostructured film reduced percent reflectance to a minimum of about 1% at 400-500 nm, and reflectance remained reduced by more than 50% compared to bare glass from 500 nm to about 700 nm. FIG. 35 is an AFM image of a nanostructured $SiO_2$ film on a glass substrate. FIG. 36 is an SEM photograph of a nanostructured $SiO_2$ film on a glass substrate at two magnifications (scale bars=1 μm and 300 nm). The $SiO_2$ nanoparticles had an average size of 26-30 nm.

Figure 37:
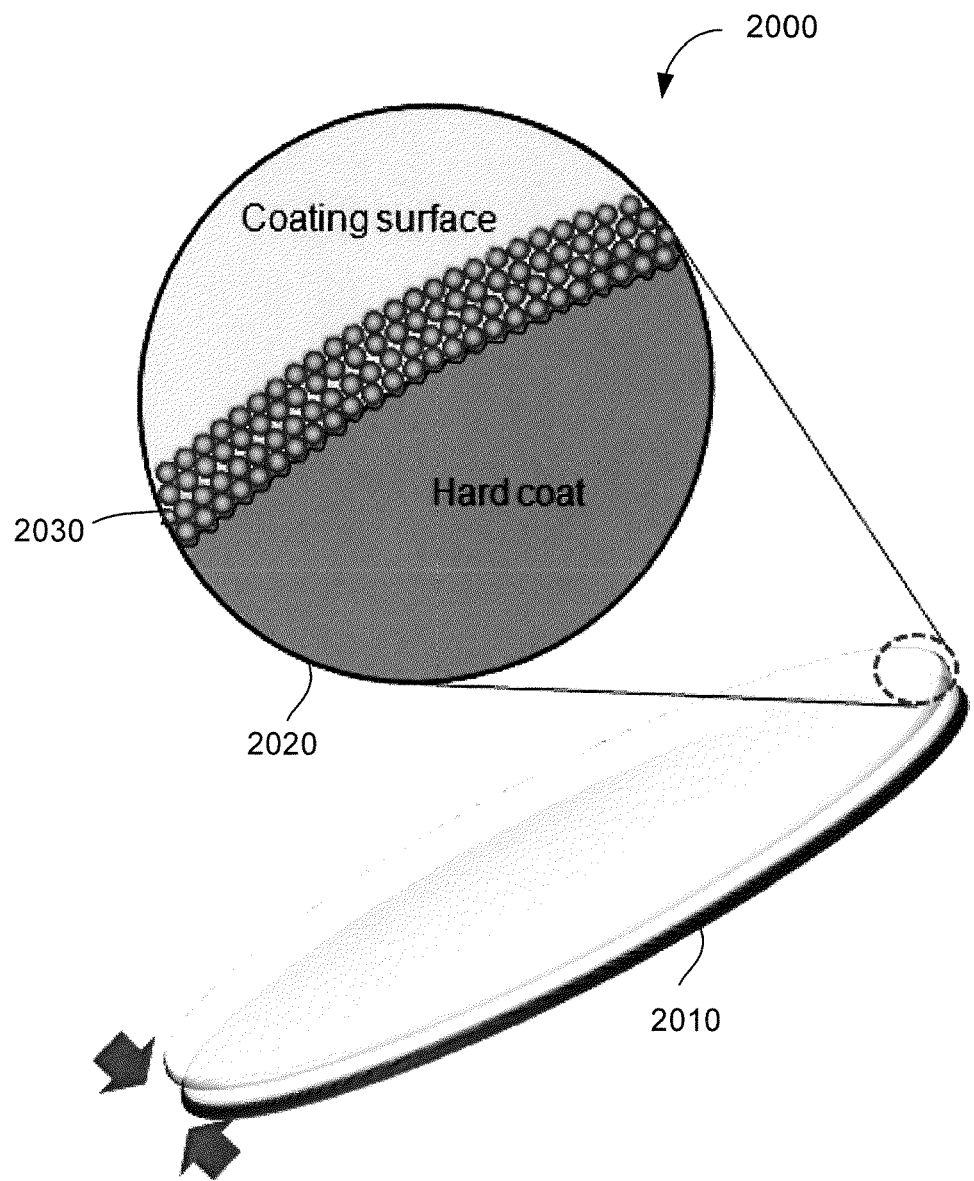
FIG. 37 is a schematic diagram of a $SiO_2$ film on a polycarbonate eyeglass lens.

FIG. 37 is a schematic diagram of a coated polycarbonate eyeglass lens 2000. Commercially available polycarbonate eyeglass lenses 2010 include a hard coat 2020. The hard coat increases the durability of the polycarbonate lens. Typically, hard coats are based on acrylic or polysiloxane chemistries. Synthesized $SiO_2$ nanoparticles are deposited onto the hard coat 2020 to form an anti-reflective coating 2030.

Figure 38:
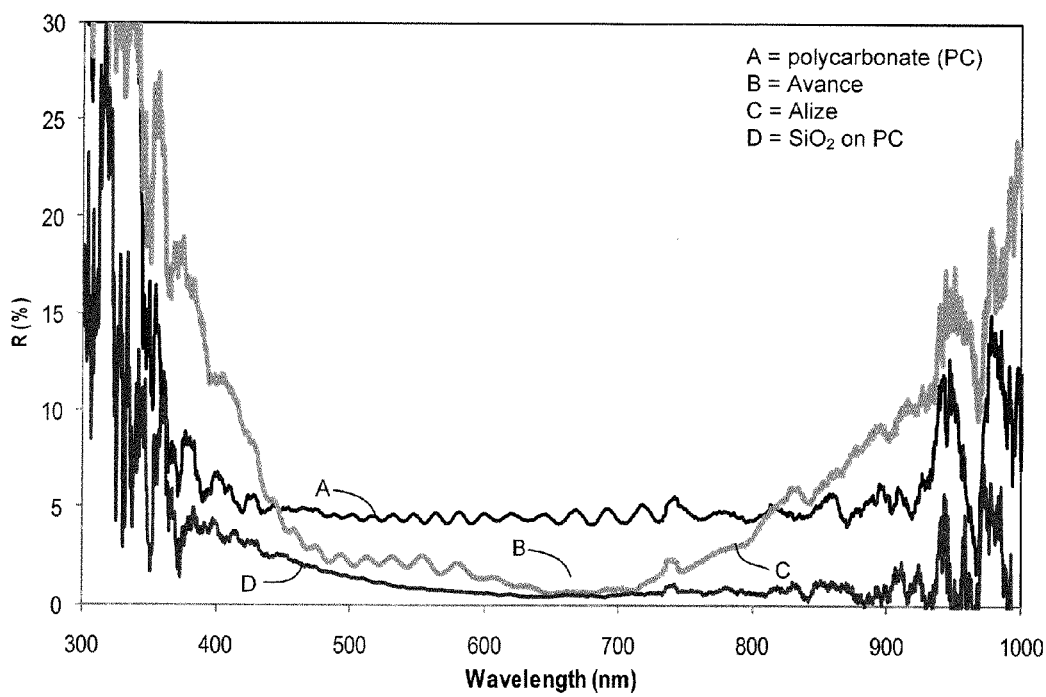
FIG. 38 is a graph of percent reflectance versus wavelength for a $SiO_2$ film on a polycarbonate lens.
Figure 39:
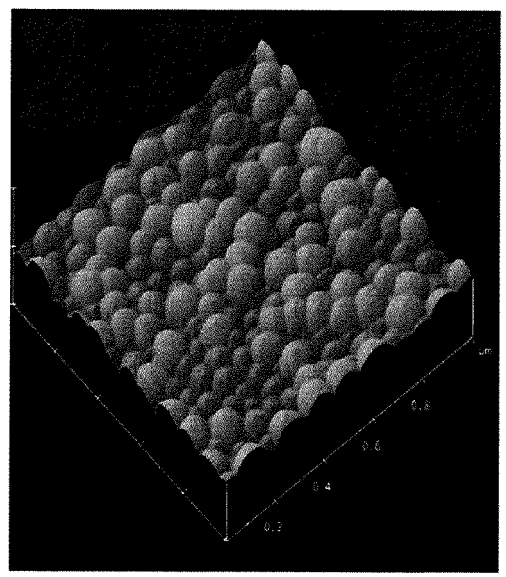
FIG. 39 is an AFM image of a $SiO_2$ film on a polycarbonate lens.
Figure 40:
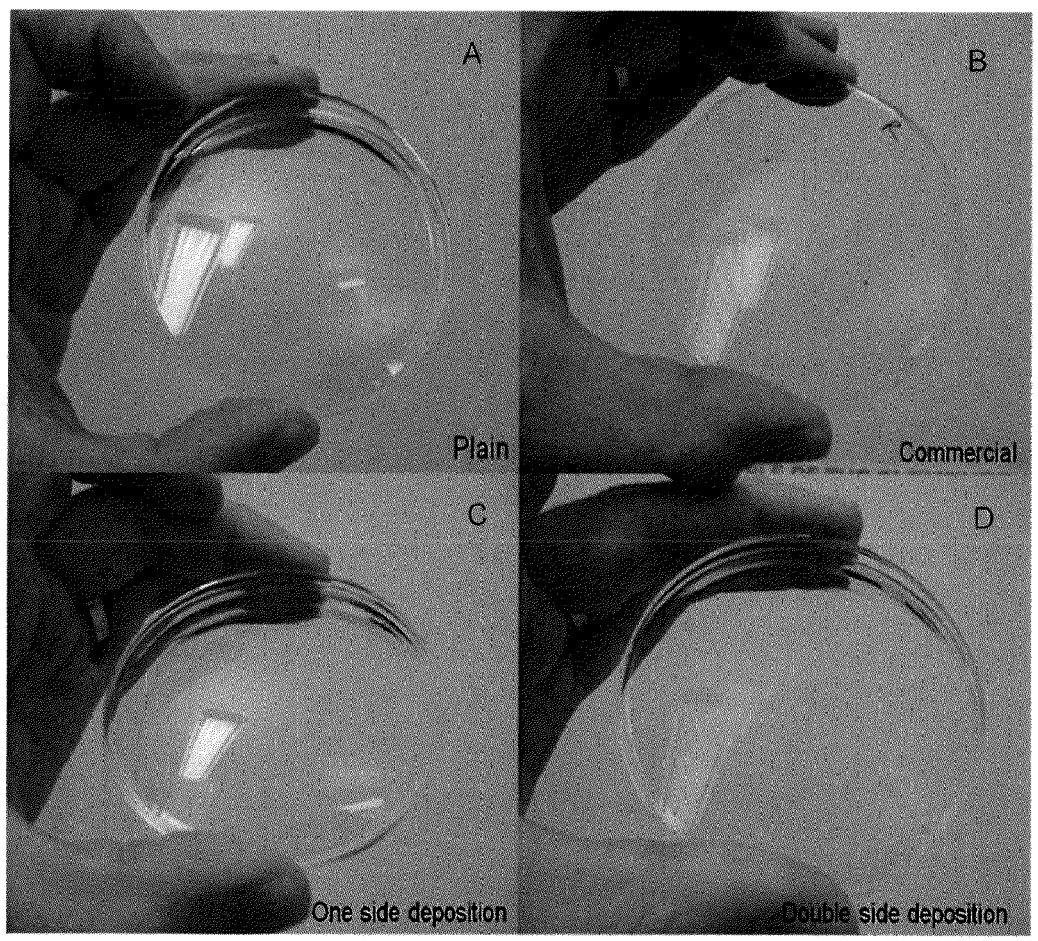
FIG. 40 is a series of photographs illustrating reflectance of visible light on coated and uncoated polycarbonate lenses.

FIG. 38 is a graph of percent reflectance versus wavelength for a polycarbonate lens (A), an Avancé™ lens (B, a commercially available lens with an anti-reflective coating, Essilor of America Inc., Dallas, Tex.), an Alizé™ lens (C, a commercially available lens with an anti-reflective coating, Essilor of America Inc.), and a nanostructured $SiO_2$ film on both upper and lower surfaces of a polycarbonate lens (D). The reflectance of the nanostructured $SiO_2$ film on a polycarbonate lens was much lower than the bare polycarbonate lens or the commercially available Avancé™ and Alizé™ lenses, with reduced reflectance over a broad range of wavelengths and a mean reflectance of about 1% in the range of 400 nm to 900 nm. FIG. 39 is an AFM image of a nanostructured $SiO_2$ film on a polycarbonate lens. FIG. 40 is a series of photographs illustrating the reflectance of visible light from a polycarbonate lens (A), a commercially available polycarbonate lens (Avancé™) with an anti-reflective coating (B), a nanostructured $SiO_2$ film on one side of a polycarbonate lens (C), and a nanostructured $SiO_2$ film on both sides of a polycarbonate lens (D).

Example 4

Synthesis of $SiO_2$ Nanoparticles in a Batch Reactor or a Microreactor $SiO_2$ nanoparticles (NPs) were synthesized by a sol-gel process following modified Stöber method mixing 49.5 ml, 1.0-5.0 ml, 1.0-3.0 ml, and 2.23 ml of ethanol, ammonium hydroxide ($NH_4OH$), DI-water, and tetraethylorthosilicate (TEOS), respectively, in 100 ml batch reactor at room temperature. The amount of $NH_4OH$ and DI-water in reaction was varied from 1.0 to 5.0 ml and 1.0 to 3.0 ml, respectively, to investigate the effect of particle size and reaction time. The mixed solution was stirred at 700 rpm for up to 6 hours at room temperature. Stirring time is inversely proportional to the amount of $NH_4OH$ and DI-water used in the mixed solution. The mixture turned a light, milky white color as the reaction proceeded and nanoparticles were formed.

Figure 41:
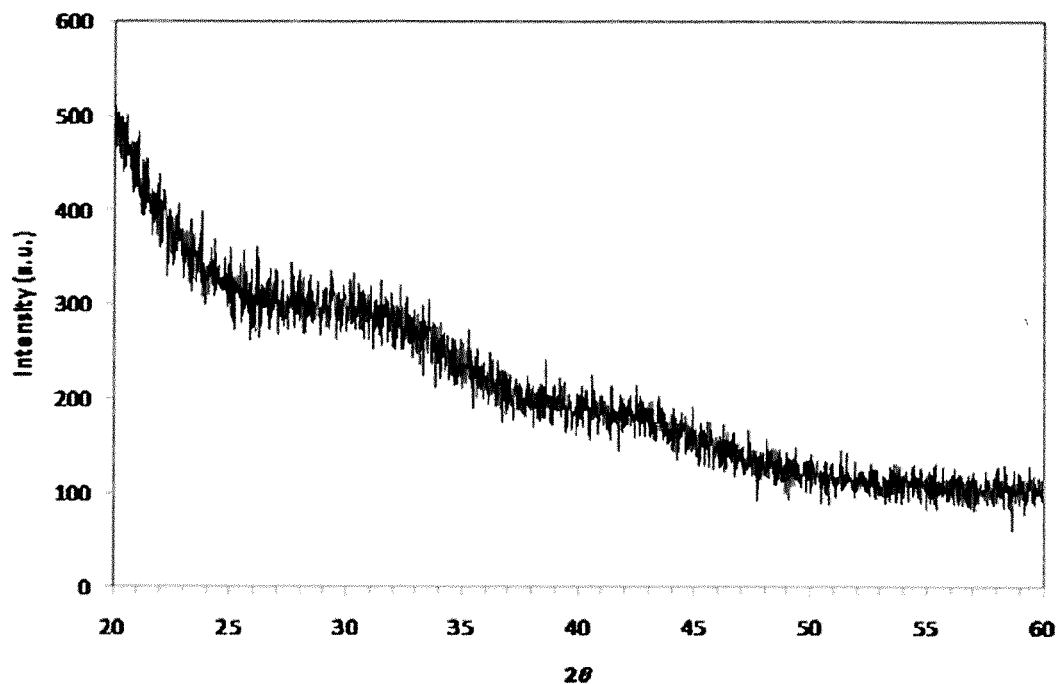
FIG. 41 is an X-ray diffraction spectrum of silica nanoparticles synthesized by a sol-gel process as discussed in Examples 4 and 5.

Structural characterization was carried out by X-ray diffraction (XRD, Bruker D8 discover). FIG. 41 is a typical XRD spectrum of silica NPs synthesized by the sol-gel process. The spectrum indicates that the NPs had a spherical shape and were amorphous in structure.

Figure 42:
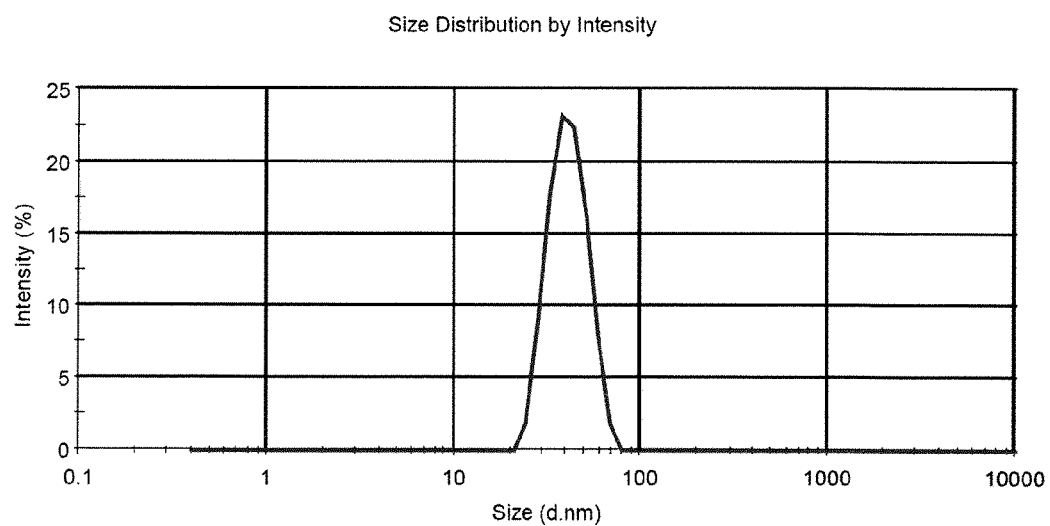
FIG. 42 is a graph of intensity versus size demonstrating the particle size distribution of silica nanoparticles as determined by photon correlation spectroscopy.

Silica NPs were prepared by combining 49.0 ml ethanol, 2.23 ml TEOS, 1.0 ml $NH_4OH$, and 1.0 ml $H_2O$ in a 100 ml batch reactor at room temperature, with stirring for 3-6 hours. Particle size distribution was determined by photon correlation spectroscopy (PCS), which indicated that the NPs had an average size of around 40 nm (FIG. 42).

Figure 43:
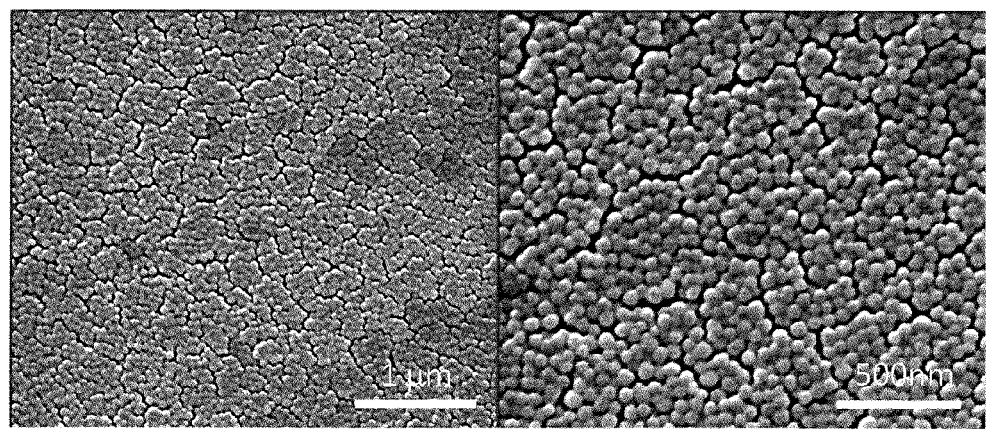
FIG. 43 is two SEM images of a silica nanoparticle film formed using microreactor-assisted nanoparticle deposition.

Silica NPs also were prepared using an embodiment of a continuous flow microreactor system (see, e.g., Example 3). The microreactor system allows precise adjustment of the residence time and residence time distribution, thereby controlling distribution of the size and size distribution of silica NPs. FIG. 43 is two SEM images of a thin silica NP film synthesized with microreactor-assisted nanoparticle deposition. The silica NPs were prepared by combining 49.0 ml ethanol, 2.23 ml TEOS, 1.0 ml $NH_4OH$, 1.0 ml $H_2O$, and 2.0 ml $H_2O_2$, with a residence time of 0.5 hour. FIG. 43 shows well-defined silica nanoparticles with a narrow size distribution.

Example 5

$SiO_2$ Thin Film Deposition

Synthesized $SiO_2$ nanoparticles dispersed in solution are stable for a while. A thin film was deposited on substrates by a spin coating process. Microscope glass slide, silicon wafer and CR-39, allyl diglycol carbonate (ADC), were used as substrates. Hydrophilic surface treatment on glass and silicon wafer substrates was conducted by using 1 M of aqueous NaOH solution for 5 minutes in an ultra sonicator followed by rinsing with DI-water. For the deposition of $SiO_2$ nanoparticles thin film, the substrate was spun at 2000 rpm for 10 seconds. This deposition process was then repeated as necessary to adjust the $SiO_2$ nanoparticles film thickness. For application of anti-reflective coating to eyeglass lenses (refractive index=1.52), $SiO_2$ nanoparticles were deposited on CR-39 (refractive index=1.499). A scratch resistant hard coat material, Rhino-Q (refractive index=1.53, Quest Optical, Inc.), was used to enhance adhesion between substrate and the anti-reflective layer. A person of ordinary skill in the art will appreciate that any other coating that does not interfere with the coated lens optical properties also can be used.

UV-vis spectroscopy (Ocean Optics Inc, USB 2000 optic spectrometer) and integrated sphere reflection measurement (USB HR 2000+, ISP-R integrating sphere) were employed to measure transmittance and reflectance. The cross-sectional and surface morphologies were characterized by scanning electron microscopy (SEM, FEI Quanta 600 FEG) and atomic force microscopy (AFM, Veeco Nanoscope digital instruments), respectively. The particle size from $SiO_2$ nanoparticles deposited on a substrate was characterized by SEM as well. Structural characterization was carried out by X-ray diffraction (XRD, Bruker D8 discover). A CSM Instruments NanoScratch Tester (S/N 01-02526) with a 10 µm in radius, SD-A32) spheroconical indenter was used to perform scratch testing. The High Load cantilever (HL-001) was used during this analysis.

Figure 44:
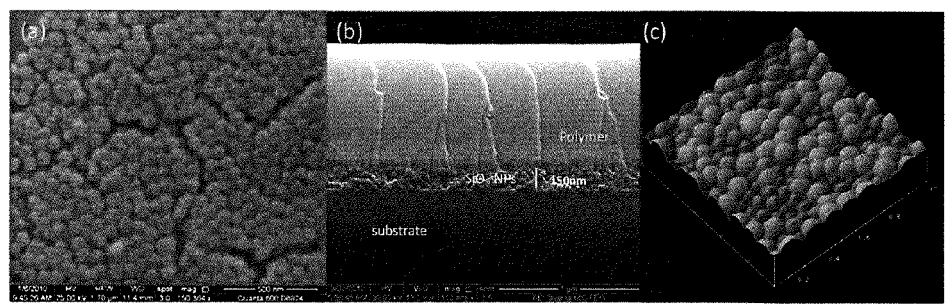
FIG. 44 provides an SEM top view and cross sectional view, and an AFM topography, of an $SiO_2$ nanoparticle thin film as deposited on a substrate as discussed in Examples 4 and 5.

FIG. 44 shows a $SiO_2$ nanoparticle thin film deposited on a silicon substrate. The $SiO_2$ nanoparticles were synthesized by a sol-gel process using 49.5 ml, 1.0 ml, 3.0 ml, and 2.23 ml of ethanol, ammonium hydroxide ($NH_4OH$), DI-water, and tetraethylorthosilicate (TEOS), respectively, in 100 ml flask reactor at room temperature. A mixture of ethanol, $NH_4OH$, DI-water and TEOS was stirred at room temperature for 3 hours at 700 rpm. The colorless solution turned to light milky white color as the reaction proceeded. The synthesized spherical $SiO_2$ nanoparticles were deposited as well dispersed nanoparticles on the substrate shown in FIG. 44. The particle size was determined from an SEM image to be about 80 nm in diameter. This is in good agreement with the hemisphere-like bump sizes in the AFM image of FIG. 44. The hemisphere-like bump surface has a similar structure to that of the moth's eye. The thickness of film was approximately 150 nm. XRD pattern indicates that the $SiO_2$ nanoparticles are amorphous (FIG. 41).

Synthesized $SiO_2$ nanoparticles using 1.0 ml of DI-water and $NH_4OH$ were deposited on a glass substrate. The transmittance and reflectance of $SiO_2$ nanoparticles thin film deposited on a glass substrate are shown in FIG. 45. Both sides of the glass substrate were coated with a $SiO_2$ nanoparticles thin film. The transmittance and reflectance of a bare glass substrate show ~92% and ~8%, respectively. The $SiO_2$ nanoparticles film deposited on both sides of a glass substrate show high transmittance, ~98.7%, and low reflectance around 1%. The transmittance of $SiO_2$ nanoparticles film deposited on a glass slide was enhanced ~7% over that of the bare glass at around the 400 nm wavelength region. The reflectance of $SiO_2$ nanoparticles thin film deposited on a glass slide was decreased ~7% lower than that of the bare glass at around 400 nm wavelength region.

Example 6

Effect of Aging on Particle Size

The effect of aging time on particle size was investigated. A mixture of ethanol, $NH_4OH$, DI-water and TEOS was stirred at room temperature for 6 hours at 700 rpm. The mixture of colorless solution turned to a light milky white color after 5 hours of stirring and was then stirred for an additional 1 hour. The solution, of light milky white color, contained within a flask was capped and stored in a lab environment after the total of 6 hours of stirring. $SiO_2$ nanoparticles thin films were deposited on silicon substrate by spin coating after aging 1, 8 and 13 days, respectively. The average size of $SiO_2$ nanoparticles with aging did not show a big change. The average size of $SiO_2$ nanoparticles synthesized with 1.0 ml of DI-water was 20±3 nm for all aging times. This indicates that synthesized $SiO_2$ nanoparticles dispersed in solution show good stability.

Example 7

Effect of Deionized Water on Particle Size

The effect of the amount of DI-water in reaction on particle size was investigated by changing the amount of DI-water. The average particle size using 1.0 ml and 3.0 ml of DI-water in reaction was measured to be about 20 and 80 nm respectively. Increasing the amount of DI-water therefore increases the average particle size.

Example 8

Effect of Ammonium Hydroxide on Particle Size

The effect of varying the amount of $NH_4OH$ in reaction, from 1.5 ml to 5 ml, on particle size was investigated using 3 ml of DI-water. Silica NPs were prepared using MAND™ techniques as described herein. See, e.g., Example 3. The average particle size increased as a function of increasing $NH_4OH$. The average particle sizes of each 1.5, 2, 3 and 5 ml of $NH_4OH$ in reaction with 3 ml of DI-water were measured as 267, 336, 638 and 817 nm, respectively (FIGS. 46A-46D, respectively).

Example 9

Lenses Coated with Single-Side Silica Nanoparticle Film and a Hard Coat

Figure 47:
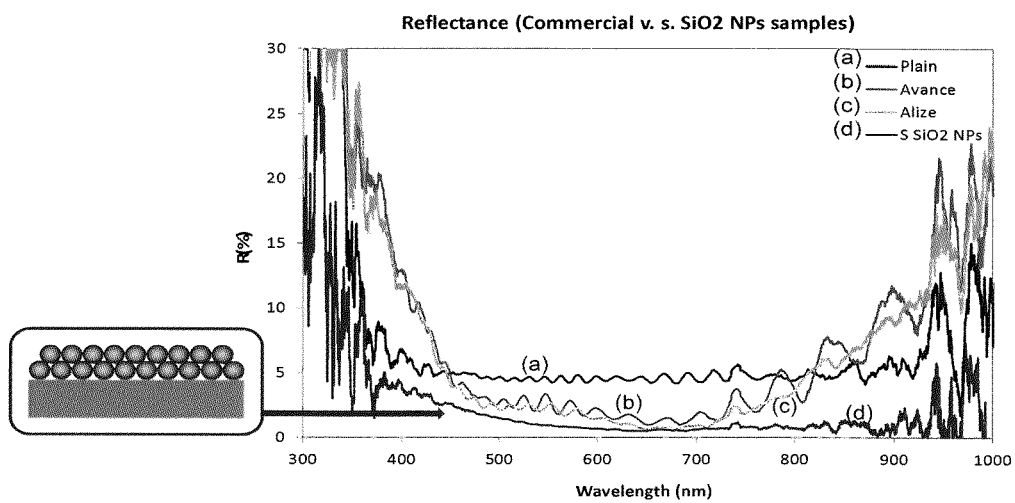
FIG. 47 is a graph of wavelength versus reflectance for various lenses for comparison to embodiments disclosed in the present application, including a non-coated lens, a commercial lens sold as Avance™, a second commercial lens sold as Crizal Alize™ having a anti-reflective coating, and synthesized $SiO_2$ nanoparticle thin film deposited on CR-39 eyeglass lens.

FIG. 47 illustrates reflectance data for plain eyeglasses, coated eyeglasses, and synthesized $SiO_2$ nanoparticle thin film deposited on CR-39 eyeglass lens. The reflectance of plain eyeglass shows ~5% and both commercial eyeglasses of Avance™ and Alize™ with AR coating show the similar results of 2~3%. The lowest reflectance of 1~3% was obtained from the film deposited with $SiO_2$ nanoparticles. Based on the comparison results, $SiO_2$ nanoparticle anti-reflective coating shows the best result with lowest reflectance. However, an $SiO_2$ nanoparticle thin film can be easily removed relatively easily. A commercial anti-reflective layer should have enough adhesion to be protected from mechanical damage. A hard coat, Rhino-Q, was employed for increasing durability of the film on eyeglass substrates. The refractive index of the hard coat used is 1.53, which is higher than $SiO_2$ nanoparticle and CR-39 substrates used. The effect of hard coat layer should be minimized for low reflectance and it should be maximized for durability. Therefore, the Rhino-Q solution was diluted by adding methanol.

Figure 48:
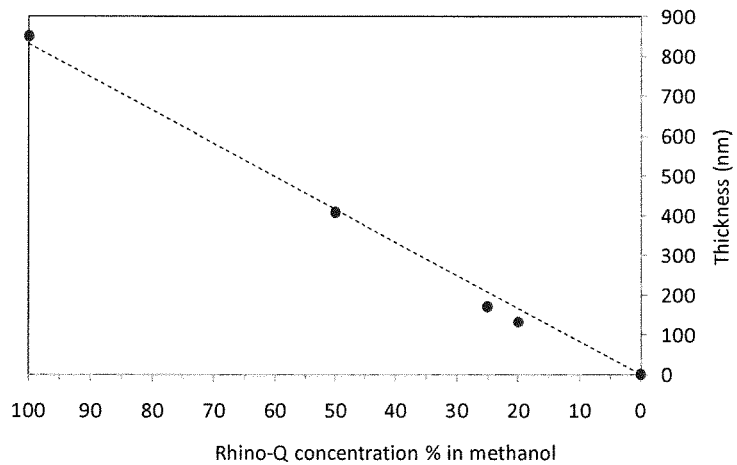
FIG. 48 is a graph of hard coat concentarion versus thickess of a coated layer.
Figure 49:
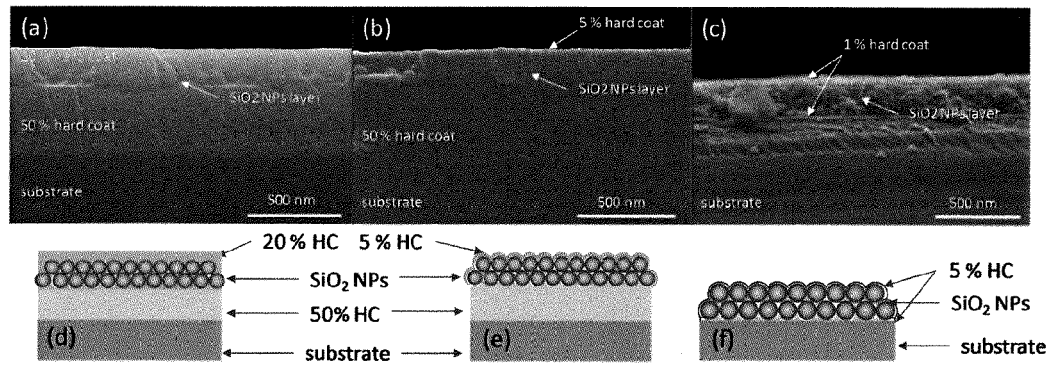
FIG. 49 provides SEM cross sectional images of different concentration of hard coat layer on $SiO_2$ nanoparticles layer: (a) 20%, (b) 5% and (c) 1% hard coat solution in methanol, where (d), (e) and (f) are schematic diagrams of (a), (b) and (c), respectively.

The thickness of the hard coat layer was demonstrated by changing the concentration of Rhino-Q, and the hard coat layer was formed by spin coating at 2000 rpm. The concentration of hard coat solution was diluted with methanol to provide 100%, 50%, 25% and 20% Rhino-Q solutions. FIG. 48 shows the concentration of hard coat solution versus the thickness of the hard coat layer applied. The thickness of the lowest concentration, 20%, of hard coat solution is approximately 120 nm. This thickness is still much thicker than the $SiO_2$ nanoparticle anti-reflective layer, which is described in FIG. 49. The effect of the moth-eye structure, of $SiO_2$ nanoparticle anti-reflective layer in a thick layer of hard coat, on reflection is indistinguishable because of the thick layer of hard coat, which already reflects light at the surface and accounts for the vast majority of reflectance of the sample. A thinner layer of hard coat on $SiO_2$ nanoparticle layer is desirable because the outermost layer dominates the reflective effect. For this reason, much lower concentrations of hard coat solution were prepared by diluting with methanol. 5% and 1% hard coat solutions were prepared and deposited on $SiO_2$ nanoparticle anti-reflective layer as presented in FIG. 49. 5% and 1% hard coat layer are too thin to measure thickness through SEM cross sectional images. The anti-reflective properties of the moth-eye surface structure $SiO_2$ nanoparticle anti-reflective layer was not affected by 5% and 1% hard coat layer, which are thin enough to maintain the structure.

Figure 50:
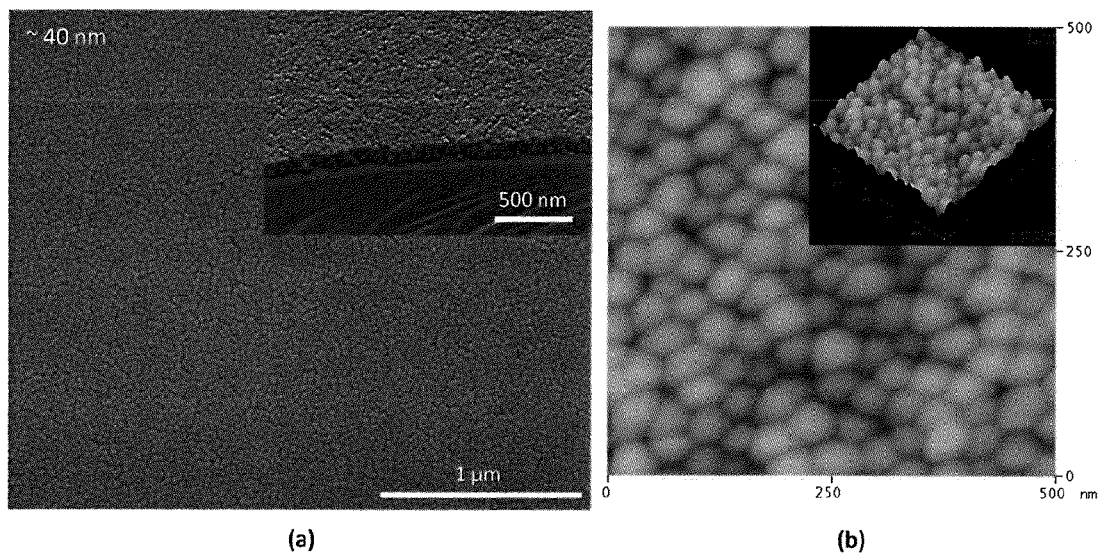
FIGS. 50A-B are SEM and AFM images, respectively, of nanostructured anti-reflective coatings including a silica nanoparticle layer and an organic-inorganic hybrid polymer layer.

Nanostructured ARCs based on silica NPs (~30 nm) and a hard coat comprising an organic-inorganic hybrid polymer (Rhino-Q from Quest Optical) were spin-coated (2,000 rpm) onto flat glass substrates obtained form Sharp Labs of America. A "sandwich" construct was prepared by sequentially depositing a layer of hard coat, a layer of silica NPs, and a second layer of hard coat. Rhino-Q was diluted to 1% (v/v) in methanol, and was spin-coated onto the substrate at 2,000 rpm for 30 seconds. The hard coat was cured at 120° C. for 30 minutes, which is much lower than the typical curing temperature (e.g., 300-600° C.) typically used to create porous silica ARC layers. After cooling, a solution of silica NPs was spin-coated onto the hard coat layer at 2,000 rpm for 30 seconds, and allowed to dry. Then, another layer of hard coat (1% (v/v) Rhino-Q in methanol) was spin-coated onto the silica NP layer at 2,000 rpm for 30 seconds. Finally, the sandwich construct was cured at 120° C. for 30 minutes. FIGS. 50A-50B show SEM and AFM images of the nanostructured ARCs on the substrate. The SEM image (FIG. 50A) shows a dense and uniform nanoARC fabricated from ~30-nm silica NPs and the organic-inorganic polymer (inset: a tilted, cross-sectional image of the nanoARC). The AFM image (FIG. 50B) is a top view AFM image of the ARC surface (insert: a 3-dimensional view). The 3-dimensional view demonstrates that the nanostructured ARCs have conical protuberances mimicking the moth-eye structure.

Example 10

Minimizing Reflectance by Double Side Deposition

Figure 51:
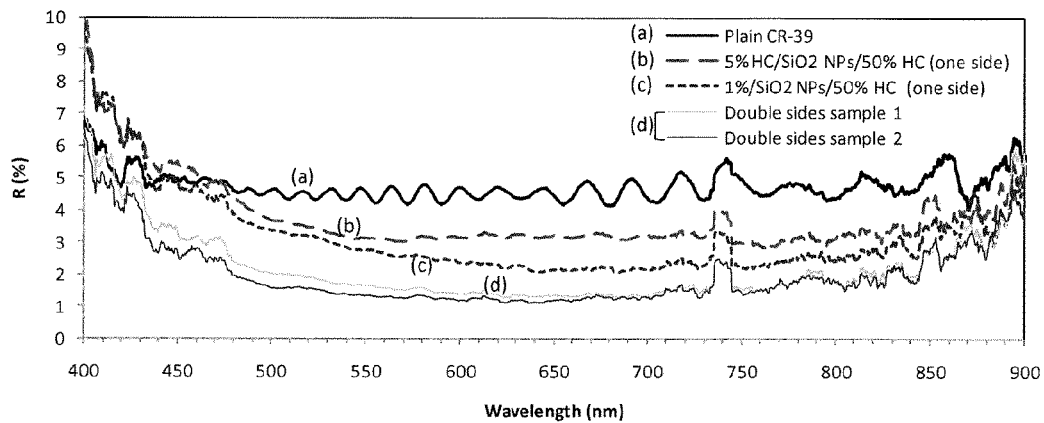
FIG. 51 provides reflectance measurement of one side coating of (a) plain CR-39, (b) 5% hard coat with $SiO_2$ nanoparticle layer, (c) 1% hard coat with $SiO_2$ nanoparticle layer, and double side coating of (d) 1% hard coat with $SiO_2$ nanoparticle layer.
Figure 52:
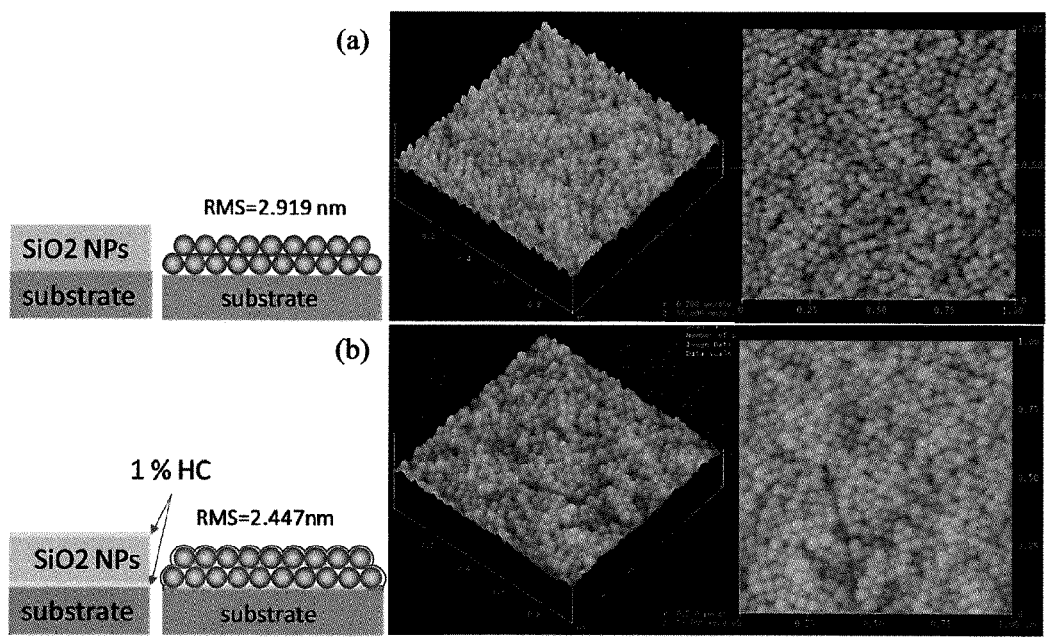
FIG. 52 provides AFM images of (a) $SiO_2$ nanoparticle layer and (b) 1% hard coat/$SiO_2$ nanoparticle layer/1% hard coat on substrates.

To minimize reflectance of the sample, a deposition was carried out on both sides. The structure of the double sided deposition consists of the following configuration: 1% hard coat layer/$SiO_2$ nanoparticle layer/1% hard coat layer/substrate/1% hard coat layer/$SiO_2$ nanoparticle/1% hard coat layer. The reflectance of the double sided deposition of hard coat and $SiO_2$ nanoparticle shows the lowest reflectance, 1~2%. The reflectance values of $SiO_2$ nanoparticle anti-reflective coating on substrate presented in FIG. 47 and $SiO_2$ nanoparticle coat with hard coat shown in FIG. 51 are consistent. The effect of 1% hard coat layer on the moth-eye structured surface was investigated by examining surface roughness by AFM described in FIG. 52. AFM was used because the surface difference is hard to distinguish between $SiO_2$ nanoparticle anti-reflective layer and the layer with hard coat through SEM images. The RMS surface value of the $SiO_2$ nanoparticle anti-reflective layer on a substrate was 2.919 nm and the RMS surface roughness of $SiO_2$ nanoparticle anti-reflective layer with hard coat was 2.447 nm. The roughness of SiO₂ nanoparticle anti-reflective layer with hard coat is smoother than that of the anti-reflective layer having only SiO₂ nanoparticles. The smoother surface of the hard coat sample confirms the deposition of 1% diluted hard coat solution on the moth-eye surface of SiO₂ nanoparticle anti-reflective layer and suggests that the hard coat solution filled the gaps between each SiO₂ nanoparticle.

Figure 53:
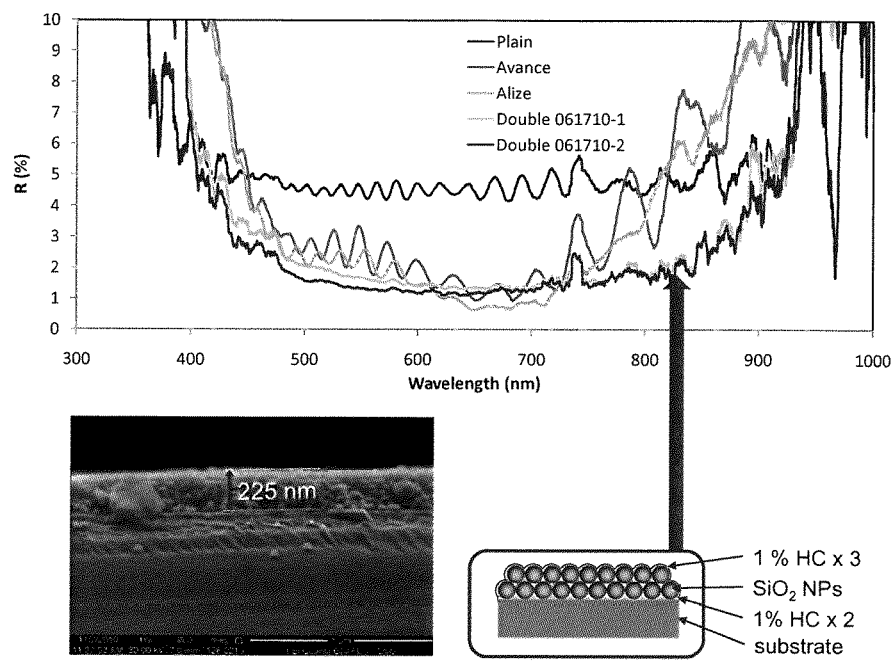
FIG. 53 is a graph of wavelength versus reflectance for various lenses for comparison to embodiments disclosed in the present application, including a non-coated lens, a commercial lens sold as Avance™, a second commercial lens sold as Crizal Alize™, and two samples of polymer coated silica nanoparticles made according to embodiments of the present application illustrating that the silica nanoparticles have a reduced reflectance relative to the lenses used for comparison purposes, where the embedded figures are (a) an SEM of a coated lenses illustrating that the coating has a thickness in this embodiment of about 250 nm, and (b) a schematic diagram of a lens made according to the present application.

A comparison of the reflectances between commercial products and SiO₂ nanoparticle antirefractive coating samples is presented in FIG. 53. The reflectivity of commercial products is low but fluctuates widely. The reflectance peaks of a thin film on a substrate from commercial products as shown in FIG. 53 act as an etalon, creating an interference pattern superimposed on the surface reflectivity. The multilayer anti-reflective coating of the commercial product fluctuates due to the interference caused by the different refractive properties of each of the layer materials in the multiple layers. On the other hand, the SiO₂ nanoparticle anti-reflective coating sample shows broadband wavelength characteristics with generally lower reflectance than the commercial products shown in FIG. 53. Broadband anti-reflectance below 1% across a wider spectrum than the commercial products was observed. This result is a clear indication that the low reflectance of disclosed embodiments of the present anti-reflective coating structure are competitive with or better than commercial products.

Figure 54:
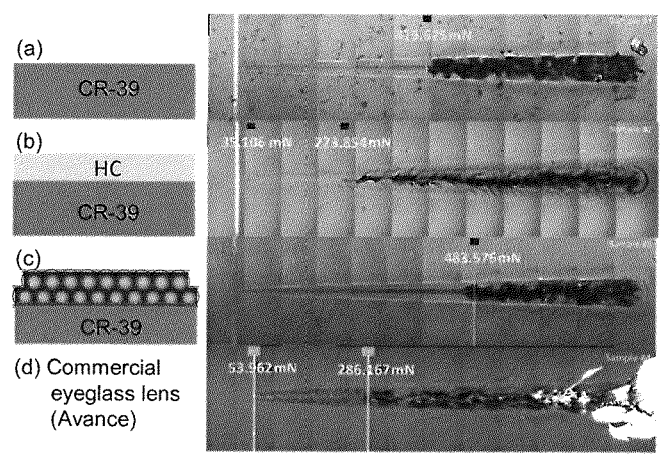
FIG. 54 provides the results of a scratch comparison of (a) sample #1: bare CR-39, (b) sample #2: hard coat on CR-39, (c) sample #3: optimized structure of silica nanoparticles anti-reflective coat on CR-39 and (d) commercial eyeglass lens from Avance (0.3-800 mN Load, 10 μm sphero-conical indenter, 1000 μm scratch length) at 200× magnification.

Scratch tests were also performed on several samples, including bare CR-39 substrate (sample #1), hard coat on CR-39 (sample #2), anti-reflective SiO₂ nanoparticle coating (sample #3), and a commercial sample from Avance™ (sample #4) (FIG. 54). One type of failure mode observed in samples #1 and #3 was identified as critical load #1 (Lc1). On sample #1, the bare CR-39, the failure mode was observed at 415.625 mN of normal load, which resulted in failure/crack in the surface of the bare CR-39. The critical load value for the same failing mechanism on sample #3, the optimized structure of SiO₂ nanoparticle anti-reflective coat on CR-39, was found to be higher than that of bare CR-39. In other words, the SiO₂ nanoparticle anti-reflective coat on CR-39 protected the CR-39 by prolonging the critical failure moment. No obvious coating cracking/delamination was observed before Lc1, which indicates excellent mechanical and adhesive film properties. There are two types of failure modes observed in samples #2 & #4. On Sample #2, hard coat on CR-39, there were two critical failing points, Lc1 at 35.106 mN & Lc2 at 223.854 mN, observed and both identified as coating failures. The Lc1 failure mode at 35.106 mN was found to be the initial crack of the hard coating while the Lc2 represents the moment of complete delamination of the hard coating from the CR-39 substrate. On sample #4, commercial anti-reflective coated eyeglass lens, there are two critical failing points, Lc1 & Lc2, at 53.962 and 286.167 mN, respectively. The two critical failures at Lc1 and Lc 2 indicate a Hertzian cracking and a more substantial rupture of the coated surface, respectively. The Hertzian cracking indicates the buildup of stress under the indenter such that pressures accumulating on the surface cause a buckling of the anti-reflective coating to relieve this stress. This appears to be a cohesive failure of the anti-reflective coating. The eventual rupture of this anti-reflective coating is caused by the significant discrepancy of mechanical properties of the anti-reflective coating and the underlying substrate and perhaps can be thought of as more of an adhesive failure of the anti-reflective coating to the substrate.

Comparing the scratch analysis for hard coat, optimized structure of SiO₂ nanoparticle anti-reflective coating on CR-39 and the commercial product, it was found that the optimized structure of SiO₂ nanoparticle anti-reflective coat on CR-39 exhibited much better scratch resistance and adhesion strength as it showed no coating failure until the bare CR-39 substrate failed, while the hard coat on CR-39 and the commercial product started to crack in a fairly early stage.

Disclosed embodiments of the present invention enabled reflectance as low as 1%, which was achieved even though the refractive index of SiO₂ is 1.46, a material that might be expected to result in a higher reflection than was demonstrated in this work. Without being bound by a theory of operation, this enhancement may be due to the tunability and minimization of reflectance through the surface morphology and thickness of the film. The optical and mechanical properties were optimized by a unique combination of the structure of SiO₂ nanoparticle and a hard coat. The optimized unique structure of durable SiO₂ nanoparticle anti-reflective coat was demonstrated on CR-39 eyeglass lens by solution process. The optical and mechanical properties from thinner SiO₂ nanoparticle anti-reflective coat show lower reflectance with broadband and much higher durability than a commerically available product.

Example 11

Anti-Reflective Coating for Solar Cell Cover Glass

Twelve cover glass samples (6 inch, Eagle 2000™, Corning) with silica nanoparticle anti-reflective coatings (nanoARCs) were prepared for testing. Each sample had a sandwich structure of organic-inorganic hybrid polymer/silica NPs/organic-inorganic hybrid polymer. The layers were deposited by spin-coating at 2,000 rpm. After the final hard coat layer was deposited, the films were cured at 120° C. for 30 minutes.

Figure 55:
FIG. 55 is a pair of photographs comparing observed reflectivities of bare flat cover glass and cover glass with a silica nanoparticle anti-reflective coating.

Optical micrographs of coated and bare glasses are shown in FIG. 55. A much clearer view was obtained from the nanoARC-coated glass. The light transmittance of silica nanoARCs deposited on flat glasses was tested to determine suitability for application as a solar cell cover. Table 1 shows the estimated transmittance of bare cover glass and the 12 samples of cover glass coated with nanoARCs. Transmittance of 89.32~92.57% was obtained from bare flat glass in the wavelength range of 300~1100 nm. The 12 coated samples showed high transmittance of over 95% in the wavelength range of 300~1100 nm, which was about 5% higher than the bare glass transmittance of 91%. In the wavelength range of 400~750 nm, the mean transmittance of the 12 coated samples was over 98%, which was about 6% higher than the bare glass transmittance of 92%. On average, the silica nanoARCs on flat glass increased the transmittance by 6% compared to the bare flat glass.

TABLE 1

| | | Estimated Transmittance (%) | | | | | | | | | | | |
|---|---|---|---|---|---|---|---|---|---|---|---|---|---|
| | | Bare | Samples | | | | | | | | | | |
| Wavelength | | Glass | 1 | 2 | 3 | 4 | 5 | 6 | 7 | 8 | 9 | 10 | 11 | 12 |
| 300-1100 nm | Mean | 91.13 | 95.90 | 95.76 | 96.10 | 95.94 | 96.03 | 96.13 | 95.58 | 95.49 | 95.58 | 95.81 | 95.83 | 95.70 |
| | Δ | | 4.78 | 4.64 | 4.97 | 4.81 | 4.91 | 5.01 | 4.45 | 4.37 | 4.45 | 4.69 | 4.71 | 4.58 |
| | Δ/2 | | 2.39 | 2.32 | 2.49 | 2.41 | 2.45 | 2.50 | 2.23 | 2.18 | 2.23 | 2.34 | 2.35 | 2.29 |

TABLE 1-continued

| | | Estimated Transmittance (%) | | | | | | | | | | | | |
|---|---|---|---|---|---|---|---|---|---|---|---|---|---|---|
| | | Bare | Samples | | | | | | | | | | | |
| Wavelength | | Glass | 1 | 2 | 3 | 4 | 5 | 6 | 7 | 8 | 9 | 10 | 11 | 12 |
| 300-750 nm | Mean | 89.32 | 95.87 | 95.61 | 95.71 | 95.58 | 95.92 | 95.84 | 95.22 | 95.32 | 95.44 | 95.61 | 95.59 | 95.49 |
| | Δ | | 6.55 | 6.29 | 6.39 | 6.26 | 6.60 | 6.52 | 5.90 | 6.00 | 6.12 | 6.29 | 6.27 | 6.16 |
| | Δ/2 | | 3.27 | 3.15 | 3.19 | 3.13 | 3.30 | 3.26 | 2.95 | 3.00 | 3.06 | 3.14 | 3.13 | 3.08 |
| 400-750 nm | Mean | 92.57 | 98.60 | 98.43 | 98.57 | 98.46 | 98.63 | 98.80 | 98.08 | 97.92 | 97.97 | 98.24 | 98.24 | 98.01 |
| | Δ | | 6.03 | 5.86 | 6.00 | 5.89 | 6.06 | 6.23 | 5.51 | 5.36 | 5.40 | 5.67 | 5.67 | 5.44 |
| | Δ/2 | | 3.02 | 2.93 | 3.00 | 2.94 | 3.03 | 3.12 | 2.76 | 2.68 | 2.70 | 2.84 | 2.84 | 2.72 |

Δ/2 shows impact of one side of coating

Example 12

Quantum Efficiency of Silicon Photovoltaic Cells with NanoARC Cover Glass

Quantum efficiency (QE) was measured and compared using multicrystalline silicon photovoltaic cell (PV), PV with bare cover glass, and PV with nanoARC cover glass. QE was measured using QEX7 Solar Cell Response equipment (PV Measurements, Inc., Boulder, Colo.).

Figure 56:
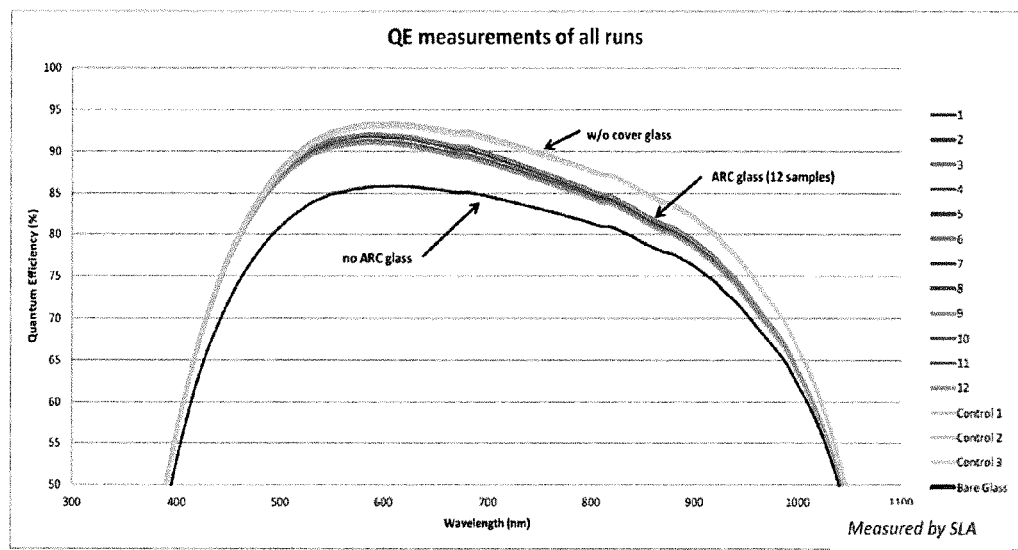
FIG. 56 is a graph of quantum efficiency versus wavelength comparing multicrystalline silicon photovoltaic cells without covers, with bare flat cover glass, and with cover glass having a silica nanoparticle anti-reflective coating.

FIG. 56 shows the QE responses of PV with and without solar cell covers (Eagle 2000™, Corning). The QE of multi-crystalline Si PV without a solar cell cover was 93.5% at a wavelength of 600 nm. The QE of Si PV with bare cover glass dropped down to 86% at the same wavelength, which was a 7.5% decrease caused by absorption and reflection of the glass cover. The nanoARC coated cover glass enhanced the QE from 86% (bare cover glass) to 90.5-92.5% (12 samples) which was a 4.5-6.5% increase. At 600 nm, the QE with any solar cell cover was 93.5%, and adding bare cover glass dropped the QE to 86. Thus, bare cover glass decreased the QE response by 7.5% compared to PV without a cover glass, which is a huge energy loss. Over the range of 400-750 nm, QE with no cover glass averaged 86.8%, with a standard deviation of 9.6%; QE with bare glass averaged 80.2%, standard deviation 8.5%; and QE with nanoARC averaged 83.5%, standard deviation 9.0%. Thus, the nanoARCs cover glass was capable of recovering 4.5-6.5% QE response from the bare cover glass. For example, the nanoARC coverglass recovered an average QE of 5.1% across a spectrum of 400-750 nm. The nanARC deposition was consistent with a QE of 85.3%±0.17% at the 95% confidence level with two separate nanoARC batches.

To test the anti-reflective properties of the nanoparticle anti-reflective coatings on photovoltaic cells, $SiO_2$ nanoparticles were deposited on cover glass and placed on top of a standard monocrystalline Si cell (SolarWorld®, Camarillo, Calif.). Efficiencies of the cell+bare cover glass and cell+ARC coated cover glass were determined using a collimated beam solar simulator with power output 1000 W/m². The results of the experiment are shown in Table 2.

TABLE 2

Open circuit voltage ($V_{OC}$), short circuit current ($I_{SC}$), measured power ($P_{MP}$), and improvement in power were found by comparing the effect of bare cover glass vs. ARC coated cover glass placed above two monocrystalline Si solar cells.

| Cell Type | Glass Type | $V_{OC}$ (V) | $I_{SC}$ (A) | $P_{MP}$ (W) | Improvement in Power |
|---|---|---|---|---|---|
| Monocrystalline Si (sample #1) | Cover Glass | 0.591 | 0.141 | 67.4 | 5.4% |
| | ARC | 0.592 | 0.148 | 71.0 | |
| Monocrystalline Si (sample #2) | Cover Glass | 0.590 | 0.197 | 93.1 | 3.7% |
| | ARC | 0.595 | 0.206 | 96.5 | |

As can be seen in Table 2, the cover glass with the nanoARC resulted in an improvement in power ranging from 3.7 to 5.4% above non-ARC coated glass.

Example 13

Scratch Analysis and Mechanical Modeling of Optical Coatings

In Example 10, the polymer-$SiO_2$-polymer (PSP) nanocomposite anti-reflective coatings (ARCs) were found to have superior properties over multi-layer CVD-deposited ARCs on polymer eyeglasses. Failure modes for thin films typically involve various types of cracking followed by delamination and spallation. Therefore, the crack strength and adhesion of the coatings are important properties influencing the mechanical performance of the films. For very thin coatings, indentation and scratch tests can be used to characterize the crack and adhesion strength of films, respectively. Indentation and scratch tests were performed on a bare CR-39 polycarbonate substrate, a commercial (Avance™) coated polycarbonate substrate, a CR-39 polycarbonate substrate coated with a Rhino-Q hard coat (applied as a 1% (v/v) solution of Rhino-Q in methanol as described in Example 9), a CR-39 polycarbonate substrate coated with a 3-layer construct (PSP), i.e., Rhino-Q-silica nanoparticles-Rhino-Q (as described in Example 9), and a glass substrate coated with the PSP film.

Scratch testing: This technique involves generating a controlled scratch by placing the tip of a stylus, made of diamond or hard metal, on a sample and drawing the tip across the surface under a progressively increasing load until the coating detaches. At certain critical loads, the material will fail under cracking, delamination and spallation. The critical loads are determined by means of optical observation, acoustic emission, and frictional force. The critical load data can be used to quantify the adhesive properties of different film-substrate combinations. Samples were tested with 0.3-800 mN load using a CSM Instruments NanoScratch Tester (S/N 01-02526) with a 10 μm in radius, SD-A32) spheroconical indenter, and 1,000 μm scratch length.

Indentation testing: In instrumented indentation testing, an indenter tip, normal to the sample surface, is driven into the sample by applying an increasing load up to some preset value. As the load is released, partial restoration of the material occurs. During both the loading and unloading cycles, the applied force and penetration depth into the material are recorded, and a load-displacement curve is produced. Using the features of this curve (e.g. slope) and testing parameters (e.g. contact area of the tip), material characteristics such as indentation hardness and Young's modulus are determined.

Figure 57:
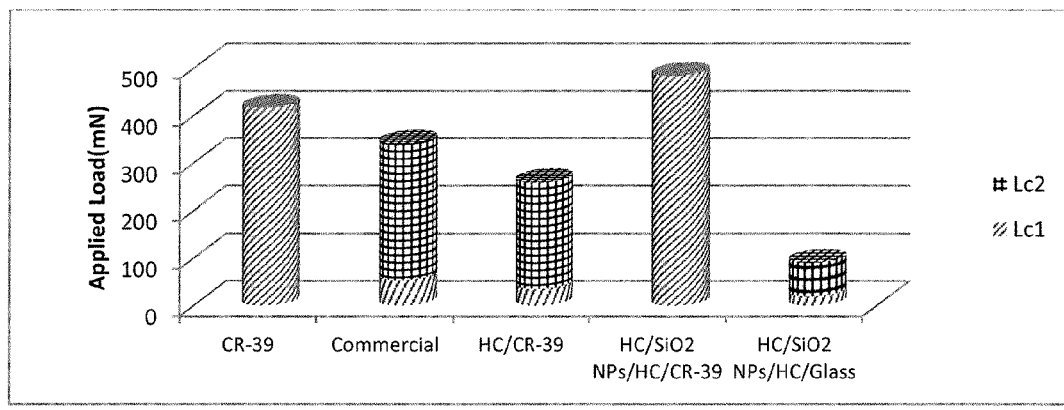
FIG. 57 is a comparison of critical loads of a commercial anti-reflective coating on polycarbonate, bare polycarbonate, polycarbonate with a hard coat, polycarbonate with a polymer-silica nanoparticle-polymer anti-reflective coating, and glass with a polymer-silica nanoparticle-polymer anti-reflective coating (HC=hard coat).

Scratch test results: FIG. 57 shows the critical loads for cracking (Lc1) and delamination (Lc2) for each of the prepared samples: bare polycarbonate (CR-39), Avance™ coated polycarbonate (commercial), Rhino-Q-coated polycarbonate (HC/CR-39), PSP-coated polycarbonate (HC/$SiO_2$ NPs/HC/Cr-39), and PSP-coated glass (HC/$SiO_2$ NPs/HC/glass). HC in these results stands for a "hardcoat" polymer, i.e., Rhino-Q. As shown in FIG. 57, the best results were obtained with the PSP ARC on polycarbonate. Notably, the PSP ARC on glass had the lowest critical loads for cracking and delamination. Without being bound by a particular theory, it is believed that polycarbonate substrates are capable of absorbing a significant percentage of the energy generated during the scratch test, whereas glass absorbs much less energy, thereby directing more energy into the PSP ARC resulting in earlier failure.

Figure 58:
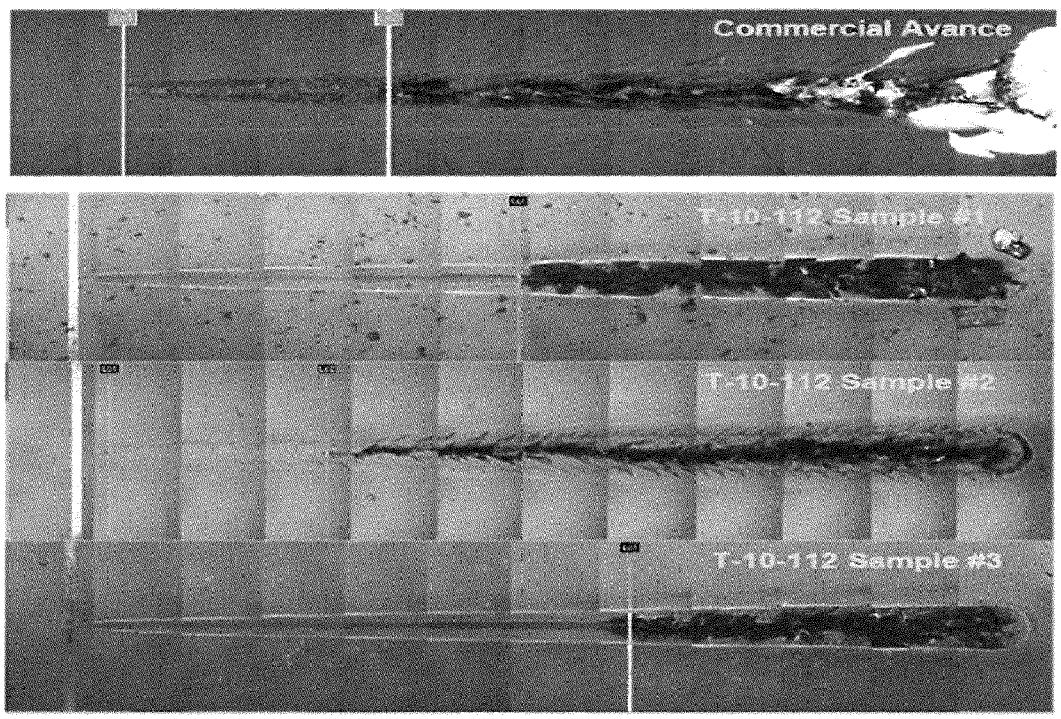
FIG. 58 is a photograph at 200× magnification showing a scratch comparison of a commercial anti-reflective coating on polycarbonate, bare polycarbonate, polycarbonate with a hard coat, and polycarbonate with a polymer-silica nanoparticle-polymer anti-reflective coating.
Figure 59:
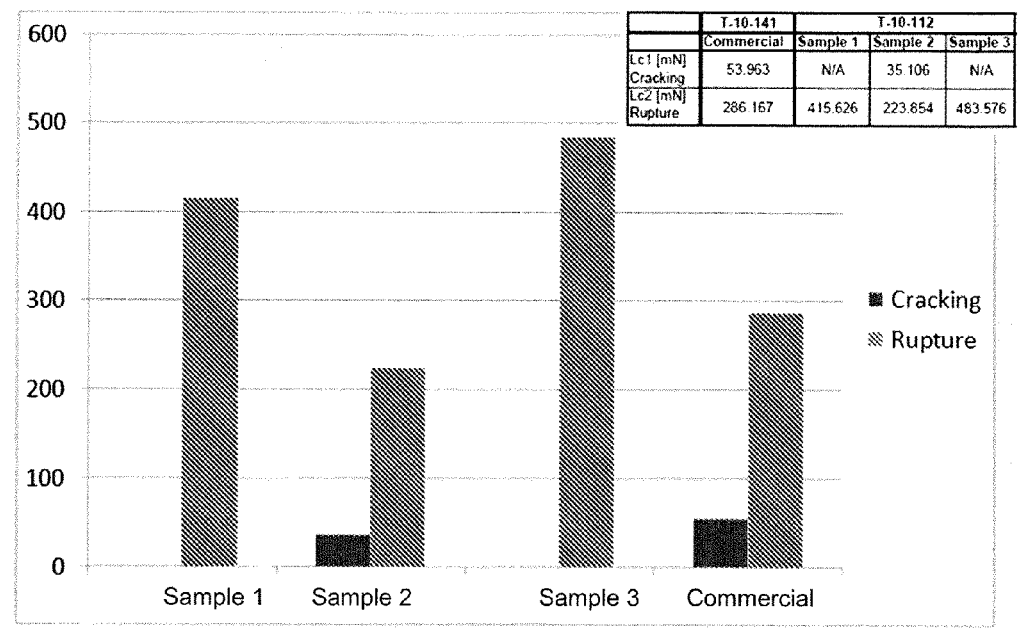
FIG. 59 is a bar graph comparing critical load #1 and critical load #2 of the samples shown in FIG. 58.
Figure 60:
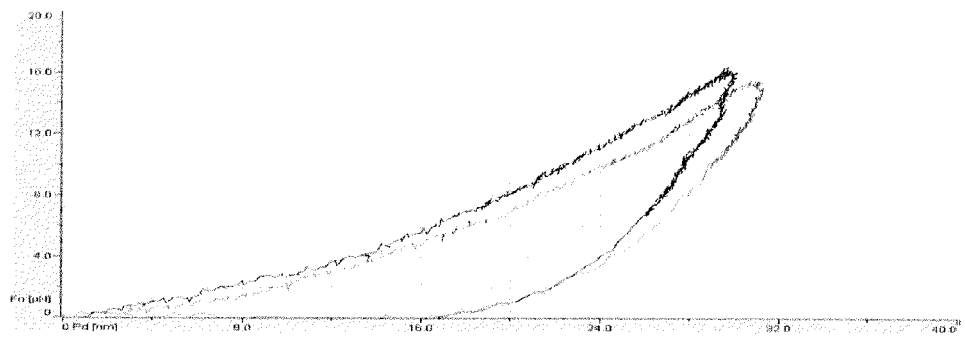
FIG. 60 is a graph of two average force-displacement curves for two samples of a polymer-silica nanoparticle-polymer anti-reflective coating on cover glass.

FIG. 58 is a photograph at 200× magnification showing the scratch test results of an Avance™ coating and three samples of the PSP ARCs. Samples 1, 2, and 3 are bare polycarbonate, Rhino-Q-coated polycarbonate, and PSP-coated polycarbonate. FIG. 58 shows the critical load #1 (Lc1) and, if applicable critical load #2 (Lc2) for each sample. For coated samples, Lc1 is the force at which cracking first occurs and Lc2 is the force at which delamination (i.e., separation of the coating from the substrate) and/or rupture of the substrate occurs. For uncoated samples, Lc1 is the force at which the substrate cracks or ruptures. The scratch length for each sample is 1,000 μm, with the force increasing from 0.3-800 nM across the sample. The commercial Avance™ sample quickly reached Lc1 and Lc2, with spalling (flakes breaking off the substrate) occurring at heavier forces. Bare polycarbonate (sample #1) began to crack before the midpoint of the scratch test, with spalling occurring at the end of the test. Rhino-Q-coated polycarbonate (sample #2) showed similar Lc1 and Lc2 values to the commercial sample. Surprisingly, the PSP-coated polycarbonate (sample #3) did not delaminate until midway through the scratch test and showed no cracking in the film. In other words, no apparent cracking occurred until sufficient force had been applied to crack or rupture the underlying polycarbonate substrate. Furthermore, the PSP-coated polycarbonate was stronger than the bare polycarbonate. Without being bound by a particular theory, it is believed that any cracking in the PSP film that may have occurred was on a nanoscale and therefore was not visible under the optical microscope. FIG. 59 is a bar graph illustrating the critical load #1 (Lc1) and critical load #2 (Lc2) of the four samples shown in FIG. 58. FIG. 59 shows that the PSP-coated polycarbonate (sample #3) has a critical load that is almost 10-fold higher than Lc1 of the commercial sample and 1.7-fold higher than Lc2 of the commercial sample.

The scratch model proposed by Benjamin and Weaver (Proc. R. Soc. London, Ser. A 254 (1960) 163) simplifies the shear stress, $\tau_s$, between the stylus and the film at the lip of the indentation during scratching as follows [1]:

$$\tau_s = \frac{H_s a}{(R^2 - a^2)^{1/2}} \quad (1)$$

where $H_s$ is the hardness of substrate, R is the tip radius, and a is the radius of contact area between the indenter and the film, which is approximately equal to half of the scratch width, d/2. Equation 1 suggests that under identical test conditions, as the hardness of the substrate increases, the shear stress within the film increases. This makes sense as a harder substrate would be expected to concentrate the kinetic energy of the stylus within the film. Therefore, all things being equal, it is expected that placing the PSP ARC on glass (versus polycarbonate) would increase the shear stress along the film/substrate boundary, which could partially explain the results in FIG. 57.

Further, Attar and Johannesson (Surf. Coat. Technol., 78 (1996) 87) proposed the following model for quantification of critical loads [2]:

$$L_c = \frac{d_C}{v_c \mu_c}(2tE_c W_a)^{1/2} \quad (2)$$

in which $d_c$ denotes the width of the scratch at the critical load, $v_c$ is the Poisson's ratio of the film, $\mu_c$ represents the friction coefficient at the critical load, t is the thickness of the coating, $E_c$ is the elastic modulus of the coating, and $W_a$ is the work of adhesion at the critical load. Equation 2 suggests that by increasing the elastic modulus and thickness of the film and the work of adhesion between the film and the substrate, the critical loads for cracking and adhesion would increase.

Indentation test results: The two load-displacement curves in FIG. 58 were captured during the indentation of two PSP ARCs on glass samples (dark gray—sample 1, light gray—sample 2).

Hertz (Miscellaneous Papers, Mac Millan, London, 1896) proposed the following model to quantify the load-displacement curve:

$$P = \frac{4}{3}R^{1/2}E_r h^{3/2} \quad (3)$$

where, R is the indenter radius, $E_r$ represents the reduction in elastic modulus, and h is penetration depth. The reduction in elastic modulus can be calculated by:

$$\frac{1}{E_r} = \frac{1-v_i}{E_i} + \frac{1-v}{E} \quad (4)$$

where, $E_i$ and $v_i$ are the elastic modulus and Poisson's ratio of indenter, respectively, and E and v are elastic modulus and Poisson's ratio of the film, respectively (Oliver et al., J. Mater. Res., 7 (1992) 1564). Using the load-displacement curve and equations 3 and 4, the elastic modulus of the specimen, E, can be determined. Table 3 shows the hardness and elastic modulus of the PSP ARCs that were deposited on cover glass.

TABLE 3

|  | HC/$SiO_2$ NPs/HC/Glass | |
| --- | --- | --- |
| Mechanical Properties | Sample #1 | Sample #2 |
| Hardness (H) [MPa] | 553.2 | 480.1 |
| Elastic Modulus (E) [GPa] | 12.78 | 11.49 |

The indentation and scratch test results indicate that polymer-$SiO_2$-polymer (PSP) nanocomposite anti-reflective coating (nanoARC) will significantly outperform industry standard eyeglass ARCs with respect to scratch resistance and, surprisingly, even increase the scratch resistance of native polycarbonate. Furthermore, the PSP nanoARCs demonstrate excellent adhesion to the polycarbonate. However, this adhesion does not appear to be due solely to the hard coat (Rhino-Q) layer adhering the film to the polycarbonate substrate as the PSP-coated polycarbonate performed significantly better than the Rhino-Q-coated polycarbonate, indicating that the PSP nanoARC may absorb energy better than the polymer alone.

Example 14

Optical Modeling

Spectroscopic ellipsometry (SE) was used to characterize the anti-reflective coatings. Several optical models were used to fit the experimental data and provide estimates of film thickness and optical properties, primarily refractive index (n). SE is a powerful technique for ARC characterization because of its sensitivity to film optical properties and structure. To characterize films, a 2" diameter wafer with 250 nm of thermal oxide was used as a base substrate. Polymer adhesive layers and SiO2 nanoparticle films were spin-coated onto the substrates as described in Example 9.

Figure 61:
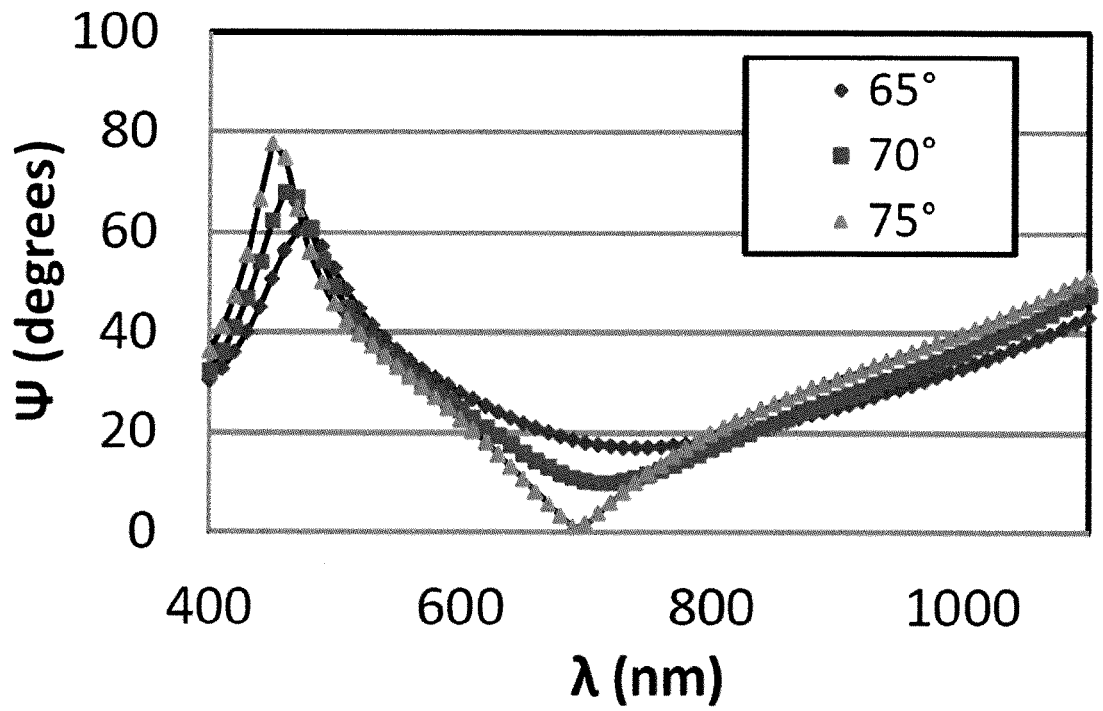
FIG. 61 is a graph of amplitude change versus wavelength for three angles of incidence.

Using SE, the polymer adhesive layer was estimated to be 7 nm thick. The SiO2 nanoARC layer was modeled using the effective medium approximation (EMA), based on the optical properties of some fraction of bulk SiO2 (n=1.5) and some fraction of void space (n=1.0). Since the size of the SiO2 nanoparticles and the resulting voids are much smaller than the wavelength of visible light, this model can be used to estimate film thickness by assuming a uniform film of bulk SiO2 with some fraction of uniformly spread void space. The resulting SE model was fit to experimental data b varying film thickness and void fraction as shown in FIG. 61, where the amplitude change of incoming light ($\Psi$) is plotted versus wavelength for three different angles of incidence. SE experimental data was collected for wavelengths of 400-1100 nm at three angles of incidence of incoming light, 65, 70, and 75°. Measured raw data is in terms of amplitude change in polarization of incoming light ($\Psi$). Models were fit to these data by varying film thickness and percent void fraction using the EMA>

As seen in FIG. 61, a very good model fit was found between experimental and simulations using the EMA. This fit corresponded to a film thickness of 78 nm with 40% void space. A second 2" silicon wafer with SiO2 nanoparticles was psi-coated under the same conditions and used for replicate analysis. The resulting best fit EMA model for the second sample corresponded to a film thickness of 76 nm with 39% void space, demonstrating the reproducibility of the deposition technique and suggesting accurate modeling using SE. To illustrate the sensitivity of SE to varying film properties, models are shown corresponding to varying film thickness and void fractions in FIGS. 62-63.

Figure 62:
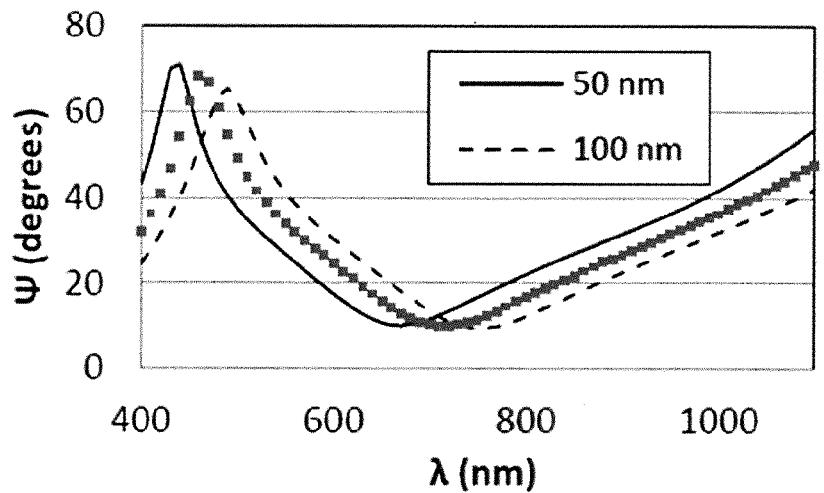
FIG. 62 is a graph of amplitude change versus wavelength comparing raw data from FIG. 61 to 50-nm and 100-nm thick films at a 70° angle of incidence.
Figure 63:
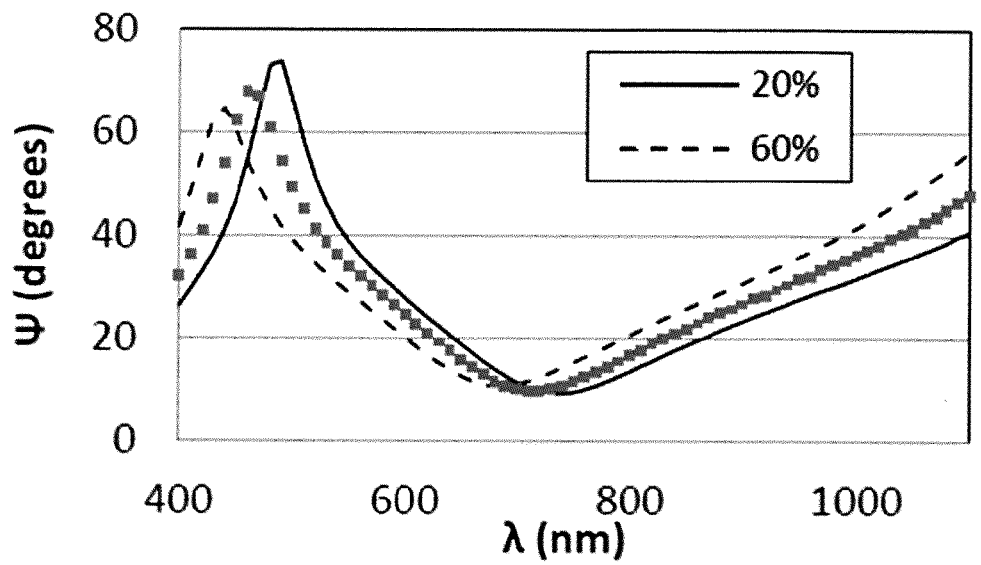
FIG. 63 is a graph of amplitude change versus wavelength comparing raw data from FIG. 61 to films with 20% and 60% void fractions at a 70° angle of incidence.

FIGS. 62-63 illustrate the effect of varying film thickness and void fraction on the resulting EMA model fit to the experimental SE data from FIG. 61 at 70° angle of incidence. The model fits deviate significantly from the experimental data as thickness or void fraction are increased/decreased from values corresponding to the best fit model in FIG. 61 (78 nm thickness and 40% void space). Thus, the models shown in FIG. 61 reasonably describe the nanoARC films.

Figure 64:
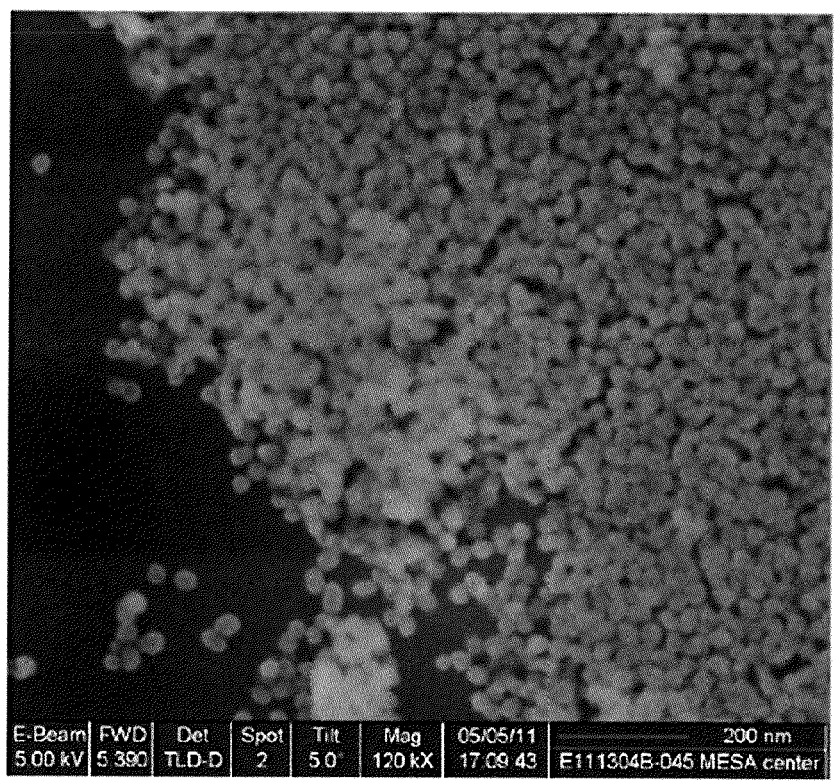
FIG. 64 is a high-resolution scanning electron microscopy (HRSEM) image of a $SiO_2$ nanoparticle surface.
Figure 65:
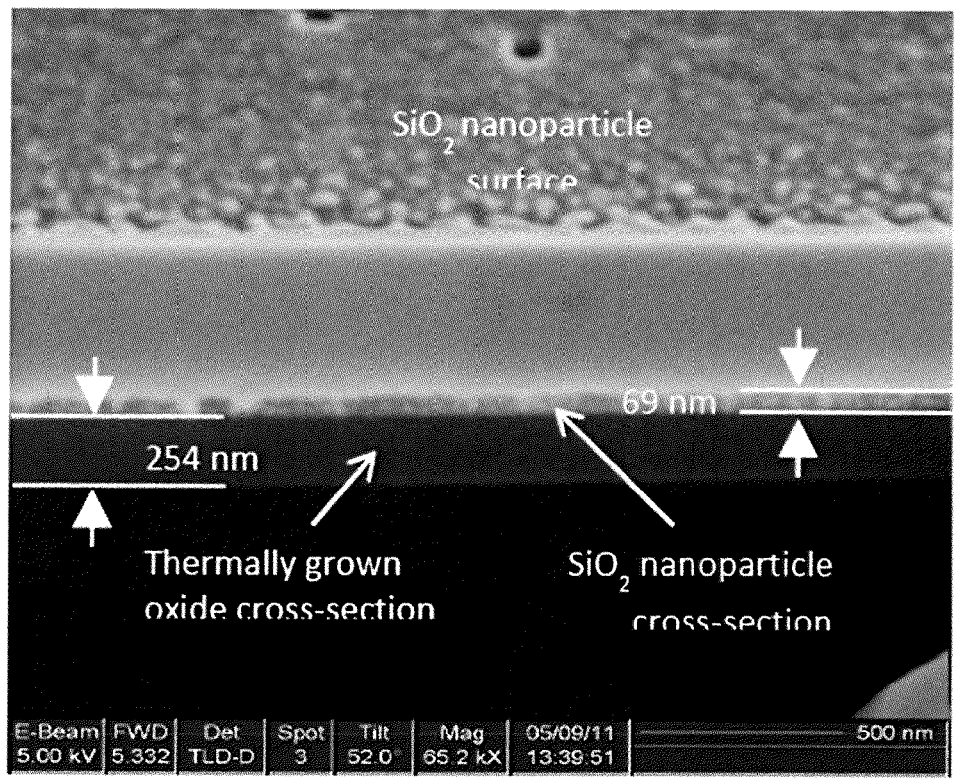
FIG. 65 is a HRSEM image of a cross-section of the film shown in FIG. 64.

To gain further insight into the film structure, the film was imaged using high-resolution scanning electron microscopy (HRSEM). The nanoparticle surface, along with a cross-section showing the nanoparticle and other layers for the 2" Si wafer form FIG. 61 is shown in FIGS. 64-65. FIG. 64 shows an apparent uniform dispersion of SiO2 nanoparticles with sizes ranging from 20-30 nm.

FIG. 65 shows the moth-eye structure of the top nanoparticle layer on one surface of the substrate. Below this layer, the polymer layer, thermally grown oxide layer, and bulk Si wafer can be seen. The approximate average thickness of the nanoparticle layer estimated from FIG. 65 is 69 nm, which is very close to that estimated using the EMA from SE (76 and 78 nm).

Figure 66:
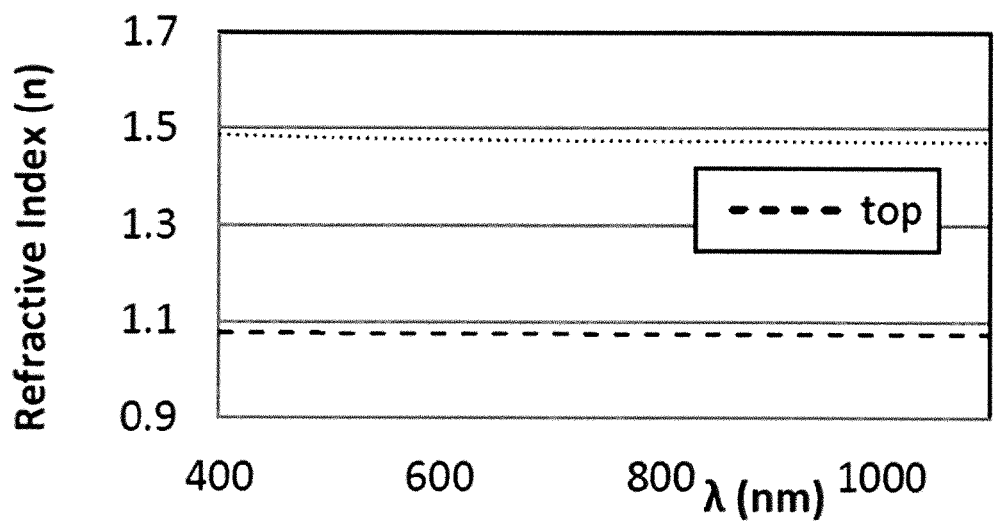
FIG. 66 is a graph of refractive index versus wavelength of the top and bottom of a $SiO_2$ nanoparticle film based on a graded index SE model.

The SE data was then fit using a graded index model. Within this model, the EMA was utilized for steps in depth of the film. The film was approximated using a single-step index with an assumed o % void at the bottom. The model was then fit by varying percent void at the surface, and overall thickness. The resulting refractive indices at the film top and bottom corresponding to the best fit void fraction as a function of wavelength are shown in FIG. 66. The resulting best fit for the model corresponded to a thickness of 80 nm and void fraction of 87% at the top of the film. This thickness is close to that approximated using the EMA and confirmed by HRSEM imaging. As shown in FIG. 66, according to the graded index model, the film is approximated by a medium with an effective refractive index varying from approximately 1.1 at the surface to 1.5 at the base, which is quite close to optimal values.

The following patents and applications are considered to be part of the disclosure of this application and are incorporated herein by reference: U.S. Pat. No. 7,507,380, issued May 24, 2009, U.S. patent application Ser. No. 11/490,966 (U.S. Publ. No. 2007/0020400), filed Jul. 21, 2006, U.S. patent application Ser. No. 11/564,759 (U.S. Publ. No. 2007/0184576), filed Nov. 29, 2006, and U.S. patent application Ser. No. 11/897,998 (U.S. Publ. No. 2008/0108122), filed Aug. 31, 2007.

The present invention has been described with reference to exemplary embodiments. The scope of the present invention is not limited to these exemplary features. For example, certain features of the invention have been exemplified by reference to the formation of ZnO and SiO$_2$ films. A person of ordinary skill in the art will appreciate that other materials can be formed using disclosed embodiments of the present method and system.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An anti-reflective product, comprising:
   a substrate; and
   a substantially homogeneous anti-reflective film adhered to at least one surface of the substrate, wherein the anti-reflective film comprises a nanoparticle layer comprising nanoparticles having an average diameter smaller than at least some wavelengths of incident light, and a substantially continuous layer comprising a polymer comprising metal alkoxides, metalloid alkoxides, or a combination thereof;
   wherein the anti-reflective product has a reflectivity of less than about 4% across a 400-nm to 900-nm spectrum.

2. The anti-reflective product of claim 1, where an average size of the nanoparticles is smaller than about 400 nm.

3. The anti-reflective product of claim 1, where the reflectivity is less than about 1% across a 400-nm to 900-nm spectrum.

4. The anti-reflective product of claim 1, where the anti-reflective film is substantially transparent.

5. The anti-reflective product of claim 1, where the substrate is flat.

6. The anti-reflective product of claim 1, where the at least one surface of the substrate is textured.

7. The anti-reflective product of claim 1, where the substrate is glass and the anti-reflective product has a percent transmittance greater than about 80% across a 400-nm to 900-nm spectrum.

8. The anti-reflective product of claim 1, further comprising an additional layer comprising the polymer.

9. The anti-reflective product of claim 8, where the additional layer forms the outer surface, and the outer surface has a root mean square surface roughness that is reduced by less than 20%, compared to the roughness without the additional layer, as determined by atomic force microscopy.

10. The anti-reflective product of claim 8, where the additional layer is 5-30% as thick as the nanoparticle layer.

11. The anti-reflective product of claim 8, wherein the nanoparticle layer is positioned between two polymer layers.

12. The anti-reflective product of claim 8, where the polymer of the additional layer comprises tetraethyl orthosilicate, tetramethyl orthosilicate, polysiloxane, or a combination thereof.

13. The anti-reflective product of claim 1, where the substrate is polycarbonate.

14. The anti-reflective product of claim 13, where the anti-reflective film comprises $SiO_2$ nanoparticles.

15. The anti-reflective product of claim 14, where the substrate is an eyeglass lens.

16. The anti-reflective product of claim 15, where the anti-reflective film is adhered to two surfaces of the eyeglass lens.

17. The anti-reflective product of claim 1, where the nanoparticles are $SiO_2$ nanoparticles.

18. The anti-reflective product of claim 17, where the silica nanoparticles have an average diameter of 20-40 nm.

19. The anti-reflective product of claim 1, where the polymer comprises tetraethyl orthosilicate, tetramethyl orthosilicate, polysiloxane, or a combination thereof.

20. The anti-reflective product of claim 19, where the substrate is polycarbonate and the nanoparticles are $SiO_2$ nanoparticles with an average diameter of 20-40 nm.

21. The anti-reflective product of claim 20, where the product has an indentation hardness of at least 400 MPa, an elastic modulus of at least 10 GPa, or both.

22. The anti-reflective product of claim 20 where the product can withstand a scratch load force of at least 400 mN without delamination of the anti-reflective film from the substrate.

23. The anti-reflective product of claim 1, where the anti-reflective film comprises heterogeneous physical attributes selected from particle size, particle morphology, and combinations thereof.

24. The anti-reflective product of claim 1, where the anti-reflective film has a substantially homogeneous chemical composition throughout a cross-section of the film.

25. The anti-reflective product of claim 1, where the substrate is aluminum and the anti-reflective film comprises ZnO nanoparticles.

26. The anti-reflective product of claim 1, where the substrate is textured silicon and the anti-reflective film comprises ZnO nanoparticles.

27. The anti-reflective product of claim 1, wherein the nanoparticle layer is interposed between the substrate and the polymer layer.

28. The anti-reflective product of claim 1, wherein the polymer layer is interposed between the substrate and the nanoparticle layer.

29. A method for preparing an anti-reflective product, comprising:
providing a substrate;
applying a deposition material to the substrate to provide a substantially homogeneous anti-reflective film adhered to the substrate, the anti-reflective film comprising nanoparticles having an average diameter smaller than at least some wavelengths of incident light; and applying a substantially continuous polymer layer to the anti-reflective film, wherein the polymer comprises metal alkoxides, metalloid alkoxides, or a combination thereof, wherein the anti-reflective product has a reflectivity of less than about 4% across a 400-nm to 900-nm spectrum.

30. The method of claim 29, where an average size of the nanoparticles is smaller than about 400 nm.

31. The method of claim 29, further comprising providing energy to the deposition material to produce reactive species, where the energy is thermal, chemical, microwave, photochemical, electrochemical, plasma, ultrasonic, or a combination thereof.

32. The method of claim 29, further comprising providing energy to the substrate to produce an activated substrate surface, where the energy is thermal, chemical, microwave, photochemical, electrochemical, plasma, ultrasonic, or a combination thereof.

33. The method of claim 29, further comprising allowing an effective period of time to elapse before applying the deposition material to the substrate, where nanoparticles form in the deposition material during the effective period of time.

34. The method of claim 29, where the substrate has a substantially continuous polymer layer on a deposition surface thereof, the polymer comprising metal alkoxides, metalloid alkoxides, or a combination thereof, prior to deposition material being applied thereto.

35. An anti-reflective product prepared by the method of claim 29.

36. A method for preparing an anti-reflective product, comprising:
providing a substrate;
applying a first polymer solution comprising a first polymer and a solvent to the substrate to provide a substantially continuous first polymer layer on a surface of the substrate, wherein the first polymer comprises metal alkoxides, metalloid alkoxides, or a combination thereof; at least partially drying the first polymer layer; and applying a nanoparticle solution comprising nanoparticles having an average diameter smaller than at least some wavelengths of incident light to the first polymer layer to provide a substantially homogeneous anti-reflective film comprising one or more nanoparticle layers, wherein the anti-reflective product has a reflectivity of less than about 4% across a 400-nm to 900-nm spectrum.

37. The method of claim 36, further comprising
applying a second polymer solution to the anti-reflective coating to provide a second polymer layer.

38. The method of claim 37, where the second polymer layer reduces the root mean square roughness of the nanoparticle layer by less than 30% as measured by atomic force microscopy.

39. The method of claim 37, where the second polymer layer is 5-30% as thick as the average diameter of the nanoparticles.

40. An anti-reflective product prepared by the method of claim 37.

* * * * *